(12) United States Patent
Broderick et al.

(10) Patent No.: US 12,491,214 B2
(45) Date of Patent: Dec. 9, 2025

(54) AMNIOTIC FLUID-DERIVED EXTRACELLULAR VESICLES AND USES THEREOF FOR WOUND HEALING

(71) Applicant: Merakris Therapeutics LLC, Hillsborough, NC (US)

(72) Inventors: Thomas Christopher Broderick, Hillsborough, NC (US); William Samuel Fagg, IV, Galveston, TX (US)

(73) Assignee: Merakris Therapeutics LLC, Hillsborough, NC (US)

( * ) Notice: Subject to any disclaimer, the term of this patent is extended or adjusted under 35 U.S.C. 154(b) by 713 days.

(21) Appl. No.: 17/434,488

(22) PCT Filed: Feb. 27, 2020

(86) PCT No.: PCT/US2020/020229
§ 371 (c)(1),
(2) Date: Aug. 27, 2021

(87) PCT Pub. No.: WO2020/176801
PCT Pub. Date: Sep. 3, 2020

(65) Prior Publication Data
US 2022/0133806 A1    May 5, 2022

Related U.S. Application Data

(60) Provisional application No. 62/812,011, filed on Feb. 28, 2019.

(51) Int. Cl.
| | | |
|---|---|---|
| A61K 35/50 | (2015.01) | |
| A61K 9/00 | (2006.01) | |
| A61K 35/28 | (2015.01) | |
| A61P 17/02 | (2006.01) | |

(52) U.S. Cl.
CPC ............ *A61K 35/50* (2013.01); *A61K 9/0014* (2013.01); *A61K 35/28* (2013.01); *A61P 17/02* (2018.01)

(58) Field of Classification Search
CPC ...... A61K 35/50; A61K 9/0014; A61K 35/28; A61K 45/06; A61P 17/02
See application file for complete search history.

(56) References Cited

U.S. PATENT DOCUMENTS

| | | |
|---|---|---|
| 4,496,086 A | 1/1985 | Duchadeau |
| 4,798,824 A | 1/1989 | Belzer et al. |
| 5,152,456 A | 10/1992 | Ross et al. |
| 5,261,601 A | 11/1993 | Ross et al. |
| 5,280,784 A | 1/1994 | Kohler |
| 5,309,900 A | 5/1994 | Knoch et al. |
| 5,312,046 A | 5/1994 | Knoch et al. |
| 5,458,136 A | 10/1995 | Jaser et al. |
| 5,461,695 A | 10/1995 | Knoch |
| 5,518,179 A | 5/1996 | Humberstone et al. |
| 5,549,102 A | 8/1996 | Lintl et al. |
| 5,552,267 A | 9/1996 | Stern et al. |
| 5,740,966 A | 4/1998 | Blaha-Schnabel |
| 5,957,389 A | 9/1999 | Wunderlich et al. |
| 6,000,394 A | 12/1999 | Blaha-Schnabel et al. |
| 6,085,741 A | 7/2000 | Becker |
| 6,106,479 A | 8/2000 | Wunderlich et al. |
| 6,176,237 B1 | 1/2001 | Wunderlich et al. |
| 6,513,519 B2 | 2/2003 | Gallem |
| 6,513,727 B1 | 2/2003 | Jaser et al. |
| 6,962,151 B1 | 11/2005 | Knoch et al. |
| 6,983,747 B2 | 1/2006 | Gallem et al. |
| 7,059,320 B2 | 6/2006 | Feiner et al. |
| 7,252,085 B2 | 8/2007 | Kunschir |
| 8,551,538 B2 | 10/2013 | Qian |
| 9,132,156 B1 | 9/2015 | Werber et al. |
| 9,220,631 B2 | 12/2015 | Sigg et al. |
| 9,579,350 B1 | 2/2017 | Harrell |
| 11,344,583 B2 | 5/2022 | Fagg, IV et al. |
| 11,590,175 B2 | 2/2023 | Broderick et al. |
| 2001/0003586 A1 | 6/2001 | Vatter et al. |
| 2003/0211604 A1 | 11/2003 | E. Brown |
| 2004/0081681 A1 | 4/2004 | Vromen |
| 2005/0118712 A1 | 6/2005 | Tsai et al. |
| 2007/0207127 A1 | 9/2007 | Kato et al. |
| 2007/0292401 A1 | 12/2007 | Harmon et al. |
| 2010/0317104 A1 | 12/2010 | Elefanty et al. |
| 2012/0141399 A1 | 6/2012 | You et al. |
| 2013/0183387 A1 | 7/2013 | Palladino et al. |

(Continued)

FOREIGN PATENT DOCUMENTS

| | | |
|---|---|---|
| CA | 2543528 A1 | 5/2005 |
| CN | 105039244 A | 11/2015 |

(Continued)

OTHER PUBLICATIONS

Jun et al. Hypoxic Conditioned Medium from Human Amniotic Fluid-Derived Mesenchymal Stem Cells Accelerates Skin Wound Healing through TGF-β/SMAD2 and PI3K/Akt Pathways. Int. J. Mol. Sci. 2014, 15, 605-628 (Year: 2014).*

Antounians et al. The Regenerative Potential of Amniotic Fluid Stem Cell Extracellular Vesicles: Lessons Learned by Comparing Different Isolation Techniques. Scientific Reports 9:1837 p. 1-11 (Year: 2019).*

PCT/US18/47818, Aug. 23, 2018, WO 2019/040790, Published.

U.S. Appl. No. 16/288,809, filed Feb. 28, 2019, US-2019-0300848-A1, Published.

U.S. Appl. No. 16/640,699, filed Feb. 20, 2020, US-2019-0300848-A1, Published.

Cook, B. et al., Apoptotic photoreceptor degeneration in experimental retinal detachment, Invest. Ohthalmol. Vis. Sci. (1995) 36(6): 990-96.

(Continued)

*Primary Examiner* — Taeyoon Kim
(74) *Attorney, Agent, or Firm* — Bochner PLLC; Beverly W. Lubit

(57) ABSTRACT

The described invention provides compositions and methods for wound healing in a subject. The methods include administering a therapeutic amount of a pharmaceutical composition comprising extracellular vesicles from amniotic fluid and a pharmaceutically acceptable carrier.

17 Claims, 15 Drawing Sheets

Specification includes a Sequence Listing.

(56) References Cited

U.S. PATENT DOCUMENTS

| | | | |
|---|---|---|---|
| 2013/0209528 A1* | 8/2013 | Levi | A61K 8/981 |
| | | | 424/520 |
| 2014/0050706 A1 | 2/2014 | Shroff | |
| 2014/0065240 A1* | 3/2014 | Mitsialis | A61P 29/00 |
| | | | 424/577 |
| 2014/0336600 A1 | 11/2014 | Harrell | |
| 2015/0050251 A1 | 2/2015 | Trumpower et al. | |
| 2015/0140114 A1 | 5/2015 | Sasko | |
| 2016/0022744 A1 | 1/2016 | Burt | |
| 2016/0184363 A1 | 6/2016 | Badiavas et al. | |
| 2016/0256500 A1 | 9/2016 | White | |
| 2016/0287752 A1 | 10/2016 | Britt | |
| 2016/0310534 A1 | 10/2016 | Chang et al. | |
| 2016/0375064 A1 | 12/2016 | Beaudry et al. | |
| 2017/0042943 A1 | 2/2017 | Namin et al. | |
| 2018/0000869 A1 | 1/2018 | Britt | |
| 2021/0060084 A1* | 3/2021 | Harrell | A61K 35/50 |
| 2022/0313743 A1 | 10/2022 | Fagg, IV et al. | |

FOREIGN PATENT DOCUMENTS

| | | |
|---|---|---|
| EP | 2046946 A2 | 4/2009 |
| WO | 2007137342 A1 | 12/2007 |
| WO | 2008036447 A2 | 3/2008 |
| WO | 2013082487 A1 | 6/2013 |
| WO | 2016197196 A1 | 12/2016 |
| WO | 2017/003954 A1 | 1/2017 |
| WO | 2017/023690 A1 | 2/2017 |
| WO | 2017165698 A1 | 9/2017 |
| WO | 2019/238693 A1 | 12/2019 |

OTHER PUBLICATIONS

Cosenza, S. et al., Mesenchymal stem cells derived exosomes and microparticles protect cartilage and bone from degradation in osteoarthritis, Sci. Rep. (2017) 7: 16214.

Cunningham F. et al., The placenta and fetal membranes, Williams Obstetrics, 20th ed. Appleton and Lange, 1997, 95-125.

Cursiefen, C. et al., Time course of angiogenesis and lymphangiogenesis after brief corneal inflammation, Cornea (2006) 25: 443-47.

Cursiefen, C., et al., Thrombospondin 1 inhibits inflammatory lymphangiogenesis by CD36 ligation on monocytes, J. Exp. Med. (2011) 208: 1083-92.

Cursiefen, C., et al., VEGF-A stimulates lymphangiogenesis and hemangiogenesis in inflammatory neovascularization via macrophage recruitment, J. Clin. Invest. (2004) 113: 1040-50.

Dancer Rca, et al., "Metalloproteinases in idiopathic pulmonary fibrosis," Eur Respir J. 2011; 38(6): 1461-67.

Dar et al., Chemokine receptor CXCR4-dependent internalization and resecretion of functional chemokine SDF-1 by bone marrow endothelial and stromal cells, 2005 Nat. Immunol. 6: 1038-46.

Davatchi, F. et al., Mesenchymal stem cell therapy for knee osteoarthritis: 5 years follow-up of three patients, Intl J. Rheum Dis. (2016) 19(3): 219-25.

De Coppi P, et al. Isolation of amniotic stem cell lines with potential for therapy. Nat Biotechnol 2007; 25: 100-106.

Del Fattore, A. et al, "Differential effects of extracellular vesicles secreted by mesenchymal stem cells from different sources on glioblastoma cells," Expert Opin. Biol. Ther. (2015) 15: 495-504.

Desando, G. et al., Intra-articular delivery of adipose derived stromal cells attenuates osteoarthritis progression in an experimental rabbit model, Arthritis Res. Ther. (2013) 15(1): R22.

Desmouliere et al., The role of the myofibroblast in wound healing and fibrocontractive diseases. In Clark, R. Ed. the molecular and cellular biology of wound repair. 2nd Ed. New York, Plenum Press, pp. 391-423 (1996).

Deuse et al., "Hepatocyte growth factor or vascular endothelial growth factor gene transfer maximizes mesenchymal stem cell-based myocardial salvage after acute myocardial infarction," Circulation, 120 (2009), pp. S247-S254.

Dickhut, A. et al., Calcification or dedifferentiation: requirement to lock mesenchymal stem cells in a desired differentiation stage, J. Cell Physiol. (2009) 219 (1): 219-26.

Doeppner TR, et al. "Extracellular vesicles improve post?stroke neuroregeneration and prevent postischemic Immunosuppression." Stem Cells Transl Med 2015; 4: 1131-1143.

Doi H, et al. Potency of umbilical cord blood- and Wharton's jelly-derived mesenchymal stem cells for scarless wound healing. Sci Rep. 2016; 6: 18844.

Domenis, R et al., Characterization of the Proinflamatory Profile of Synovial Fluid-Derived Exomes of Patients with Osteoarthritis, Mediators Inflamm. (2017) 2017: 481-498.

Duquesne, N. et al., Preoperative vitreous hemorrhage associated with rhegmatogenous retinal detachment: a risk factor for postoperative proliferative vitreoretinopathy?, Graefes Arch. Clin. Exp. Ophthalmol. (1996) 234 (11): 677-82.

Eckes B, et al., Impaired wound healing in embryonic and adult mice lacking vimentin, J Cell Sci. 2000; 113 (Pt 13): 2455-2462.

Emre, E. et al., Neuroprotective effects of intravitreally transplanted adipose tissue and bone marrow-derived mesenchymal stem cells in an experimental ocular hypertension model, Cytotherapy (2015) 17: 543-59.

Englund, J. A. et al., Respiratory syncytial virus infection in immunocompromised adults, Ann. Intern. Med. (1988) 109:203-208.

Espinosa-Heidmann, DG, et al., Macrophage depletion diminishes lesion size and severity in experimental choroidal neovascularization, Invest. Ophthalmol. Vis. Sci. (2003) 44: 3586-92.

Fahey TJ 3rd, et al., Diabetes impairs the late inflammatory response to wound healing, J Surg Res., 1991, 50: 308-13.

Falanga V., Wound healing and its impairment in the diabetic foot, Lancet, 2005, 366: 1736-43.

Falsey, A. R., et al., Viral respiratory infections in the institutionalized elderly: clinical and epidemiologic findings, J. Am. Geriatr. Soc. (1992) 40:115-119.

Falsey, AR et al., Diagnosis of respiratory syncytial virus infection: comparison of reverse transcription—PCR to viral culture and serology in adults with respiratory illness, J. Clin. Microbiol. (2002) 40(3): 817-20.

Fischer, SK et al., Intraretinal proliferation induced by retinal detachment, Invest. Ophthalmol. Vis. Sci. (1991) 32 (6): 1739-48.

Fisher, SK, Lewis, GP, Müller cell and neuronal remodeling in retinal detachment and reattachment and their potential consequences for visual recovery: a review and reconsideration of recent data, Vision Res. (2003) 43(8): 887-97.

Folkman J., et al., Blood vessel formation: what is its molecular basis?, Cell, 87, pp. 1153-1155 (1996).

Folkman, J., Angiogenesis and angiogenesis inhibition: an overview, EXS, 79, 1-8, (1997).

Forest D. et al, Cellular models and therapies for age-related macular degeneration, Dis Models Mech (2015) 8, 121-7.

Frank, HG. et al., Pathology of the human placenta. New York, Springer-Verlag, 2000, 42-46, 116, 281-297.

Franke WW, et al., Formation of cytoskeletal elements during mouse embryogenesis. III. Primary mesenchymal cells and the first appearance of vimentin filaments, Differentiation. 1982; 23: 43-59.

Franze, K. et al, "Müller cells are living optical fibers in the vertebrate retina," Proc. Natl Acad. Sci. USA (2017) 104 (20): 8287-92.

Friedlander, M., J., Fibrosis and diseases of the eye, Clin. Invest. (2007) 117 (3): 576-86.

Fujishima S, et al., "Production and activation of matrix metalloproteinase 7 (matrilysin 1) in the lungs of patients with diopathic pulmonary fibrosis," Arch Pathol Lab Med. 2010; 134(8): 1136-42.

Gabbiani, G. et al., Cytoplasmic filaments and gap junctions in epithelial cells and myofibroblasts during wound healing, J Cell Biol, 76, pp. 561-568 (1978).

Gao X et al., Effects of amniotic fluid on proteases: a possible role of amniotic fluid in fetal wound healing, Ann Plastic Surg 1994; 33: 128-134.

(56) References Cited

OTHER PUBLICATIONS

Gartry, DS, et al, Pars plana vitrectomy for the treatment of rhegmatogenous retinal detachment uncomplicated by advanced proliferative vitreoretinopathy, Br. J. Ophthalmol (1993) 77 (4): 199-203.
Geller, SF et al., FGFR1, signaling, and AP-1 expression after retinal detachment: reactive Müller and RPE cellSs, Invest. Ophthalmol. Vis. Sci. (2001) 42 (6): 1363-69.
Gershengorn MC, et al., Epithelial-to-mesenchymal transition generates proliferative human islet precursor cells, Science. 2004; 306: 2261-2264.
Girard, P., et al., Clinical risk factors for proliferative vitreoretinopathy after retinal detachment surgery, Retina (1994) 14(5): 417-24.
Gnecchi et al., "Paracrine mechanisms in adult stem cell signaling and therapy," Circ. Res. (2008), 103: 1204-1219.
Goliger, J. et al., Wounding alters epidermal connexin expression and gap junction-mediated intercellular communication, Mol Biol Cell, 6, pp. 1491-1501 (1995).
Goyal, A., et al., Evaluation of oxidative stress markers in aqueous humor of primary open angle glaucoma and primary angle closure glaucoma patients, Current Eye Res. (2014) 39: 823-29.
Gray, A. et al., A alpha and B beta chains of fibrinogen stimulate proliferation of human fibroblasts, J Cell Sci, 104, pp. 409-413 (1993).
Greiling, D. et al., Fibronectin provides a conduit for fibroblast transmigration from collagenous stroma into fibrin clot provisional matrix, J. Cell Sci, 110, pp. 861-870 (1997).
Greven, CM et al, Pseudophakic retinal detachments. Anatomic and visual results, Ophthalmology (1992) 99 (2): 257-62.
Xu, J. et al, Extracellular matrix alters PDGF regulation of fibroblast integrins, J Cell Biol, 132, pp. 239-249 (1996).
Yasukawa H, et al., IL-6 induces an anti-inflammatory response in the absence of SOCS3 in macrophages, Nat Immunol. 2003; 4: 551-556.
Youing H E, et al., Human reserve pluripotent mesenchymal stem cells are present in the connective tissues of skeletal muscle and dermis derived from fetal, adult, and geriatric donors, Anat Rec, (2001) 264, 51-62.
Yu R, et al., IL-22 mediates the oral mucosal wound healing via STAT3 in keratinocytes, Arch Oral Biol. 2016; 72: 14-20.
Yu, S. et al., Effects of bone marrow stromal cell injection in an experimental glaucoma model, Biochem. Biophys. Res. Commun. (2006) 344: 1071-79.
Zapata, JC et al., The Role of Platelet in the Pathogenesis of Viral Hemorrhagic Fevers, PLoS Negl. Trop Dis. (2014) 8: e2858.
Zeisberg M., Neilson E.G., Biomarkers for epithelial-mesenchymal transitions, J. Clin. Invest. 2009; 119: 1429-1437.
Zhang X et al., Apoptosis and cell proliferation in proliferative retinal disorders: PCNA, Ki-67, caspase-3, and PARP expression, Curr. Eye Res. (2005) 30(5): 395-403.
Zhang B et al. (2015) HucMSC-exosome mediated-Wnt4 signaling is required for cutaneous wound healing. Stem Cells 33: 2158-2168.
Zhang et al., Successful immortalization of mesenchymal progenitor cells derived from human placenta and the differentiation abilities of immortalized cells, Biochem Biophys Res Commun, 2006, 351: 853-859.
Zhang J et al. (2015) Exosomes released from human induced pluripotent stem cells-derived MSCs facilitate cutaneous wound healing by promoting collagen synthesis and angiogenesis. J Transl Med 13: 49.
Zhang J, et al. Exosomes Derived from Human Endothelial Progenitor Cells Accelerate Cutaneous Wound Healing by Promoting Angiogenesis Through Erk1/2 Signaling. Int J Biol Sci. 2016; 12: 1472-87.
Zhang, R. et al., Mesenchymal stem cell related therapies for cartilage lesions and osteoarthritis, Am. J. Trans. Res. (2019) 11(10): 6275-89.
Zhang, X., et al., Mesenchymal progenitor cells derived from chorionic villi of human placenta for cartilage tissue engineering, Biochem Biophys Res Commun, 2006, 340: 944-952.

Zhao B. et al., Exosomal MicroRNAs Derived from Human Amniotic Epithelial Cells Accelerate Wound Healing by Promoting the Proliferation and Migration of Fibroblasts, Stem Cells Int., Jul. 25, 2018: 5420463.
Zhao et al. Exosomes derived from human amniotic epithelial cells accelerate wound healing and inhibit scar formation. J Mol Histol. Apr. 2017; 48(2): 121-132.
Zhu H. et al., The role of the hyaluronan receptor CD44 in mesenchymal stem cell migration and the extracellular matrix, stem cells (2006) 24: 928-35.
Zwart, I., et al., Umbilical cord blood mesenchymal stromal cells are neuroprotective and promote regeneration in a rat optic tract model, Exp. Neurol. (2009) 216: 439-448.
Abraham J. et al., M. Modulation of Wound Repair by Members of the Fiborblast Growth Factor family. In Clark, R. Ed. The molecular and cellular biology of wound repair. 2nd Ed. New York, Plenum Press, pp. 195-248 (1996).
Agnifili, L. et al., Molecular biomarkers in primary open-angle glaucoma: from noninvasive to invasive, Progr. Brain Res. (2015) 221: 1-32.
Alonso JE et al., The management of complex orthopedic injuries, Surg Clin North Am 1996, 76: 879-903.
Alvarado, JA., et al., Monocyte modulation of aqueous outflow and recruitment to the trabecular meshwork following selective laser trabeculoplasty, Arch. Ophthalmol. (2010) 128: 731-37.
Amadeu TP, et al., Nitric oxide donor improves healing if applied on inflammatory and proliferative phase, J Surg Res. 2008; 149: 84-9.
Amini-Nik S, et al., β-Catenin-regulated myeloid cell adhesion and migration determine wound healing, J Clin Invest. 2014; 124: 2599-610.
Anderson, DH et al., The onset of pigment epithelial proliferation after retinal detachment, Invest. Ophthalmol. Vis. Sci. (1981) 21 (1 Pt 1): 10-16.
Anderson, HC et al., Role of extracellular membrane vesicles in the pathogenesis of various diseases, including cancer, renal diseases, atherosclerosis, and arthritis, Lab Investig. (2010) 90 (11): 1549.
Arias AM., Epithelial mesenchymal interactions in cancer and development, Cell. 2001; 105: 425-431.
Arno AI, et al. Human Wharton's jelly mesenchymal stem cells promote skin wound healing through paracrine signaling. Stem Cell Res Ther. 2014; 5:28, p. 1-13.
Arslan, F. et al, "Mesenchymal stem cell-derived exosomes increase ATP levels, decrease oxidative stress, and activate PI3K/Akt pathway to enhance myocardial viability and prevent adverse remodeling after myocardial ischemia/reperfusion injury," Stem Cell Res. (2013) 10: 301-12.
Attisano L. et al., The Smads, Genome Biol. (2001) 2(8): PMC138956.
Augello, A. et al., Mesenchymal stem cells: a perspective from in vitro cultures to in vivo migration and niches, Eur Cells and Materials, (2010) (2): 121-33.
Ayuso, V K. et al., Intraocular biomarker identification in uveitis associated with juvenile idiopathic arthritis, Invest. Ophthalmol. Vis. Sci. (2013) 54: 3709-20.
Bakhtyar N, et al. Acellular gelatinous material of human umbilical cord enhances wound healing: a candidate remedy for deficient wound healing. Front Physiol. 2017; 8: 200.
Bakhtyar N, et al., Exosomes from acellular Wharton's jelly of the human umbilical cord promotes skin wound healing, Stem Cell Res Ther. Jul. 13, 2018, 9(1): 193.
Balaji A. et al., The role of mesenchymal stem cells in the regnerative would healing phenotype, Adv. Wound Care (2012) 1(40): 159-65.
Balbi C, et al. First Characterization of Human Amniotic Fluid Stem Cell Extracellular Vesicles as a Powerful Paracrine Tool Endowed with Regenerative Potential. Stem Cells Transl Med. May 2017; 6(5): 1340-1355.
Benirschke, K. and Kaufmann, P. Pathology of the human placenta. New York, Springer-Verlag, 2000, 42-46, 116, 281-297.
Bian S, et al. "Extracellular vesicles derived from human bone marrow mesenchymal stem cells promote angiogenesis in a rat myocardial infarction model," J Mol Med (Berlin) 2014; 92:387-397.

(56) References Cited

OTHER PUBLICATIONS

Bielefeld KA, et al., Cutaneous wound healing: recruiting developmental pathways for regeneration, CMLS. 2013, 70: 2059-81.
Biernacka A, et al., TGF-β signaling in fibrosis, Growth Factors. 2011; 29: 196-202.
Blom al., Involvement of the Wnt signaling pathway in experimental and human osteoarthritis: prominent role of Wnt-induced signaling protein 1, Arthritis and Rheumatism (2009) 60(2):501-12.
Bollini S, et al. Amniotic fluid stem cells are cardioprotective following acute myocardial infarction. Stem Cells Dev 2011; 20: 1985-1994.
Bourne, GL, Am. J., The microscopic anatomy of the human amnion and chorion, Obstet. & Gynec. (1960) 79 (6): 1070-73.
Bowie et al., A Method to Identify Protein Squences That Fold into a Known Three-Dimensional Structure, Science 253:164 (1991).
Brooks, P. et al., Requirement of vascular integrin alpha v beta 3 for angiogenesis, Science, 264, 569-571 (1994).
Brown, E. Phagocytosis, Bioessays, 17:109-117 (1995).
Brown, L. et al., Expression of vascular permeability factor (vascular endothelial growth factor) by epidermal keratinocytes during wound healing, J Exp Med, 176, 137.5-1379 (1992).
Bugge, T. et al., Loss of fibrinogen rescues mice from the pleiotropic effects of plasminogen deficiency, Cell, 87: 709-719 (1996).
Buseman et al., Amniotic Fluid for Ex Vivo Skin Preservation, Annals of Plastic Surgery, 2013, vol. 71, No. 6, p. 645.
Campbell, J. et al., Biochemical composition of amniotic fluid and extrambryonic coelomic fluid in the first trimester of pregnancy, Br. J. Obstet. Gynaecol. (1992) 99 (7): 563-565.
Caplan, A. and Correa, D., "The MSC: an injury drugstore," Cell Stem Cell (2011) 9: 11-15.
Casey, M. et al., Interstitial collagen synthesis and processing in human amnion: a property of the mesenchymal cells, Biol Reprod, 1996, 55: 1253-1260.
Chang Y-H, Wu, K-C, et al., Exosomes and Stem Cells in Degenerative Disease Diagnosis and Therapy, Cell Transplant. (2018) 27(3): 349-63.
Chawla et al., Establishment of in vitro model of corneal scar pathophysiology, J Cell Phys (2018) 233; 3817-30.
Chen XH, et al., Protective effect of an extract from Periplaneta americana on hematopoiesis in irradiated rats, Int J Radiat Biol. 2009; 85: 607-613.
Chimenti et al., "Relative roles of direct regeneration versus paracrine effects of human cardiosphere-derived cells transplanted into infarcted mice," Circ. Res., 106 (2010), pp. 971-980.
Cho, C-K.J., et al, Proteomics Analysis of Human Amniotic Fluid, 2007 Molecular & Cellular Proteomics 6: 1406-1415.
Choi M, et al. "Therapeutic use of stem cell transplantation for cell replacement or cytoprotective effect of microvesicle released from mesenchymal stem cell," Mol Cells 2014; 37: 133-1394.
Chuansumrit, A. & Chaiyaratana, Hemostatic derangement in dengue hemorrhagic fever, W. Thromb. Res. (2014) 133: 10-16.
Clark R. et al., Fibronectin and fibrin provide a provisional matrix for epidermal cell migration during wound reepithelialization, J. Invest Dermatol, 79, pp. 264-269 (1982).
Clark R., Extracellular matrix alters PDGF regulation of fibroblast integrins, J Cell Biol, 132, pp. 239-149 (1996).
Clark R., Fibronectin matrix deposition and fibronectin receptor expression in healing and normal skin, J Invest Dermatol, 94, Suppl, pp. 128S-134S (1990).
Clark, R. et al., Collagen matrices attenuate the collagen-synthetic response of cultured fibroblasts to TGF-beta, J Cell Sci, 108, pp. 1251-1261 (1995).
Clark, R. et al., Fibronectin is produced by blood vessels in response to injury, J. Exp Med, 156, 646-651 (1982).
Clark, R. et al., Platelet isoforms of platelet-derived growth factor stimulate fibroblasts to contract collagen matrices, J Clin Invest, 84, 1036-1040 (1989).

Colter DC, et al., Identification of a subpopulation of rapidly self-renewing and multipotential adult stem cells in colonies of human marrow stromal cells, Proc Natl Acad Sci USA, (2001) 98, 78415.
Connolly KD, et al. Characterisation of adipocyte?derived extracellular vesicles released pre? and post? adipogenesis. J Extracell Vesicles 2015; 24; 4: 29159.
Eslaminejad, Mohamadreza Baghaban et al., Aniotic Fluid Stem Cells and Their Application in Cell-Based Tissue Regeneration, International Journal of Fertility & Sterility, (2012), pp. 148-150.
European Search Report, European Application No. 20762480.0, dated Nov. 7, 2022.
Lejeune D, et al., Interleukin-22 (IL-22) activates the JAK/STAT, ERK, JNK, and p38 MAP kinase pathways in a rat hepatoma cell line. Pathways that are shared with and distinct from IL-10, J Biol Chem. 2002.
Lesnik Oberstein , SY et al., Evidence that neurites in human epiretinal membranes express melanopsin, calretinin, rod opsin and neurofilament protein, Br. J. Ophthalmol. (2011) 95 (2): 266-72.
Levkovitch-Verbin, H., et al., Intravitreal injections of neurotrophic factors secreting mesenchymal stem cells are neuroprotective in rat eyes following optic nerve transection, (Invest. Ophthalmol. Vis. Sci. (2010) 51: 6394-6400.
Lewis, GP et al., Experimental retinal reattachment: a new perspective, MOI. Neurobiol. (2003) 28(2): 159-75.
Lewis, GP et al., The fate of Muller's glia following experimental retinal detachment: nuclear migration, cell division, and subretinal glial scar formation, Mol. Vis. (2010) 16: 1361-72.
Li B, et al., Evidence for mesenchymal-epithelial transition associated with mouse hepatic stem cell differentiation, PLoS One. 2011; 6(2): e17092.
Li et al., "Paracrine factors released by GATA-4 overexpressed mesenchymal stem cells increase angiogenesis and cell survival," Am. J. Physiol. Heart Circ. Physiol., 299 (2010), pp. H1772-H1781.
Li PN, et al., Molecular events underlying maggot extract promoted rat in vivo and human in vitro skin wound healing, Wound Repair Regen. 2015; 23: 65-73.
Li R, et al., A mesenchymal-to-epithelial transition initiates and is required for the nuclear reprogramming of mouse fibroblasts, Cell Stem Cell. 2010; 7: 51-63.
Li, JJ et al., Stem Cell-Derived Extracellular Vesicles for Treating Joint Injury and Osteoarthritis, Nanomaterials (Basel) (2019) 9(261): <https://doi.org/103390/nano9020261>.
Li, Y, et al, "Insulin-like growth factor 1 enhances the migratory capacity of mesenchymal stem cells," 2007 Biochem. Biophys. Res. Communic. 356(3): 780-784.
Li, Z. et al, Emerging Role of Exosomes in the Joint Diseases, Cell Physiol. Biochem. (2018) 47 (5): 2008-17.
Lopez-Verrilli et al. "Mesenchymal stem cell?derived exosomes from different sources selectively promote neuritic outgrowth," Neuroscience 2016; 320: 129-139.
Louache, F. et al., Infection of Megakaryocytes by Human Immunodeficiency Virus in Seropositive Patients with Immune Thrombocytopenic Purpura, Blood (1991) 78: 1697-1805.
Lui, F. et al., Aqueous humor cytokine profiling in patients with wet AMD, Mol. Vis. (2016) 22: 352-61.
Lutteke, N. et al., Switch to high-level virus replication and HLA class I upregulation in differentiating megakaryocytic cells after infection with pathogenic hantavirus, Virology (2010) 405: 70-80.
Lötvall J, et al. Minimal experimental requirements for definition of extracellular vesicles and their functions: A position statement from the International Society for Extracellular Vesicles. J Extracell Vesicles 2014; 3: 26913.
Ma, M. et al., Therapeutic effects of mesenchymal stem cell-derived exosomes on retinal detachment, Exp. Eye Res. (2020) 191: 107899.
Machemer, R. et al., An Inexpensive, Pressure-Regulated Air Pump for Fluid-Air Exchange During Pars Plana Vitrectomy, Arch. Ophthalmol. (1991) 109 (11): 1492-93.
Mackow, E.R., Gavrilovskaya I.N. (2001) Cellular Receptors and Hantavirus Pathogenesis. In: Schmaljohn C.S., Nichol S.T. (eds) Hantaviruses. Current Topics in Microbiology and Immunology, vol. 256. Springer, Berlin, Heidelberg. https://doi.org/10.1007/978-3-642-56753-7_6.

(56) References Cited

OTHER PUBLICATIONS

Madlener M. et al., Matrix metalloproteinases (MMPs) and their physiological inhibitors (TIMPs) are differentially expressed during excisional skin wound repair, Exp Cell Res, 242, 201-210 (1998).
Madri J. et al., Angiogenesis, edited by Clark, R., The molecular and cellular biology of wound repair. 2nd Ed. New York, Plenum Press, pp. 355-371 (1996).
Manferdini, C. et al., Adipose-derived mesenchymal stem cells exert antiinflammatory effects on chondrocytes and synoviocytes from osteoarthritis patients through prostaglandin E2, Arthritis Rheumatism (2013) 65(5): 1271-81.
Mani SA, et al., The epithelial-mesenchymal transition generates cells with properties of stem cells, Cell. 2008; 133: 704-715).
Matsuura et al., "Transplantation of cardiac progenitor cells ameliorates cardiac dysfunction after myocardial Infarction in mice," J. Clin. Invest., 119 (2009), pp. 2204-2217.
Maumus, M. et al., Mesenchymal stem cells in regenerative medicine applied to rheumatic diseases: role of secretome and exosomes, Biochimie (2013) 95 (12): 2229-34).
Mcelreavey KD, et al. Isolation, culture and characterisation of fibroblast-like cells derived from the Wharton's jelly portion of human umbilical cord. Biochem Soc Trans. 1991; 19, 29s.
Mcleod, DS., et al., Enhanced expression of intracellular adhesion molecule-1 and P-selectin in the diabetic human retina and choroid, Am. J. Pathol. (1995) 147: 642-53.
Mead, B. et al, Mesenchymal stromal cell-mediated neuroprotection and functional preservation of retinal ganglion cells in a rodent model of glaucoma, Cytotherapy (2016) 18: 487-96.
Mead, B., et al., Intravitreally transplanted dental pulp stem cells promote neuroprotection and axon regeneration of retinal ganglion cells after optic nerve injury, Invest. Ophthalmol. Vis. Sci. (2013) 54: 7544-56.
Mead, B., Tomarev, S., Bone Marrow-Derived Mesenchymal Stem Cells-Derived Exosomes Promote Survival of Retinal Ganglion Cells Through miRNA-Dependent Mechanisms, Stem Cell Translational Med. (2017) 6: 1273-85.
Mendicino, M. et al, MSC-based product characterization for clinical trials: an FDA perspective, Cell Stem Cell (2014) 14(2): 141-45.
Meyer FA, et al. Evidence for a mechanical coupling of glycoprotein microfibrils with collagen fibrils in Wharton's jelly. Biochim Biophys Acta. 1983; 755: 376-387.
Mianehsaz, E. et al., Mesenchymal stem cell-derived exosomes: a new therapeutic approach to osteoarthritis?, Stem Cell Res. & Therapy (2019) 10: 340.
Mignatti, P. et al., Proteinases and Tissue Remodeling. In Clark, R. Ed. The molecular and cellular biology of wound repair. 2nd Ed. New York, Plenum Press, 427-474 (1996).
Miki, T. et al., Amnion-derived pluripotent/multipotent stem cells, Stem Cells, 2006, 2: 133-142.
Miki, T. et al., Stem Cell Characteristics of Amniotic Epithelial Cells, Stem Cells, 2005, 23: 1549-1559.
Mimura, T. et al., MT1-MMP-mediated cleavage of decorin in corneal angiogenesis, J. Vasc. Res. (2009) 46: 541-550.
Miura, M. et al., Factors related to subretinal proliferation in patients with primary rhegmatogenous retinal detachment, Retina (2000) 20(5): 456-58.
Modern Pharmaceutics, Banker & Rhodes, Marcel Dekker, Inc. (1979).
Moertel CA, et al., Pseudomosaicism, true mosaicism, and maternal cell contamination in amniotic fluid processed with in situ culture and robotic harvesting, 1992; Prenat Diagn 12, 671-683.
Moisseiev, E. et al., Protective Effect of Intravitreal Administration of Exosomes Derived from Mesenchymal Stem Cells on Retinal Ischemia, Current Eye Res. (2017) 42 (10): 1358-67.
Monsel, A. et al, "Mesenchymal stem cell derived secretome and extracellular vesicles for acute lung injury and other inflammatory lung diseases," Expert Opin. Biol. Ther. (2016) 16: 859-71.
Montesano R. et al, Transforming growth factor beta stimulates collagen-matrix contraction by fibroblasts: Implications for wound healing, Proc Natl Acad Sci USA, 85, 4894-4897 (1988).
Moysidis S, et al., Mechanisms of inflammation in proliferative vitreoretinopathy: from bench to bedside, Mediators Inflamm. (2012) 2012.815937.
Murphy, C. et al.., Emerging role of extracellular vesicles in musculoskeletal diseases, Mol. Aspects. Med. (2018) 60: 123-28.
Murphy, JM, et all, Stem cell therapy in a caprine model of osteoarthritis, Arthritis Rheumatism (2003) 48 (12): 3464-74.
Nanney L. et al., Epidermal Growth Factor and Transforming Growth Factor-cc. In Clark, R. Ed. The molecular and cellular biology of wound repair. 2nd Ed. New York, Plenum Press, pp. 171-194 (1996).
Netto MV,et al., Wound healing in the cornea: a review of refractive surgery complications and new prospects for therapy, Cornea (2005) 24: 5009-22.
Nieminen M, et al., Vimentin function in lymphocyte adhesion and transcellular migration, Nature cell biology. 2006; 8: 156-162.
U.S. Appl. No. 16/288,809, filed Feb. 28, 2019, U.S. Pat. No. 11,344,583, Granted.
U.S. Appl. No. 16/640,699, filed Feb. 20, 2020, US-2019-0300848-A1, Allowed.
PCT/US20/020229, Feb. 20, 2020, WO2020/176801, Published.
U.S. Appl. No. 17/731,176, filed Apr. 27, 2022, US-2022-0313743-A1, Published.
International Preliminary Report on Patententability and Written Opinion for International Application No. PCT/US2020/020238, dated Jul. 20, 2020, issued by the International Searching Authority on Aug. 25, 2021 (date mailed Sep. 10, 2021).
International Preliminary Report on Patententability and (Corrected) Written Opinion for International Application No. PCT/US2020/020229, dated Sep. 8, 2020, issued by the International Searching Authority on Aug. 25, 2021 (date mailed Sep. 10, 2021).
Niknejad, H. et al, Properties of the amniotic membrane for potential use in tissue engineering, Eur. Cells and Materials (2008) 15: 88-99.
Nissen, N. et al., Vascular endothelial growth factor mediates angiogenic activity during the proliferative phase of wound healing, Am J Pathol, 152, 1445-1552 (1998).
Oikonomidi et al., "Matrix metalloproteinases in respiratory diseases: from pathogenesis to potential clinical implications," Curr Med Chem. 2009; 16(10): 1214-1228.
Olivares, AM, et al., Animal Models of Diabetic Retinopathy, Curr. Diab. Rep. (2017) 17 (10): 93.
Orczyk-Pawilowicz, et al, Metabolomics of human amniotic fluid and maternal plasma during normal pregnancy, PLos ONE (2016) 11(4): e0152740.
Oriolo AS, et al., Intermediate filaments: a role in epithelial polarity, Experimental cell research. 2007; 313: 2255-2264.
Ozgenel G Y et al., Effects of human amniotic fluid on peripheral nerve scarring and regeneration in rats, J Neurosurg 2003; 98: 371-377.
Pakyari M, et al., Critical Role of Transforming Growth Factor Beta in Different Phases of Wound Healing, Adv Wound Care (New Rochelle) 2013; 2: 215-224.
Paladini, R. et al., Onset of re-epithelialization after skin injury correlates with a reorganization of keratin filaments in wound edge keratinocytes: defining a potential role for keratin 16, J. Cell Biol, 132, pp. 381-397 (1996).
Park KH, et al., Wnt modulators in the aqueous humor are associated with outer retinal damage severity in patients with neovascular age-related macular degeneration, Invest, Ophthalmol. Vis. Sci. (2014) 55: 5522-30.
Parolini, O. et al., Concise review: isolation and characterization of cells from human term placenta: outcome of the first international Workshop on Placenta Derived Stem Cells, 2008, Stem Cell, 26: 300-311.
Penn JW, et al., The role of the TGF-β family in wound healing, burns and scarring: a review, Int J Burns Trauma. 2012; 2: 18-28.
Pennesi, ME, et al., Animal models of age related macular degeneration, Mol. Aspects Med. (2012) 33(40): 487-509.
Phinney DG, et al. "Biological activities encoded by the murine mesenchymal stem cell transcriptome provide a basis for their developmental potential and broad therapeutic efficacy," Stem Cells 2006; 24: 186-198.

(56) References Cited

OTHER PUBLICATIONS

Phinney DG, et al., MSC-derived exosomes for cell free therary such as bone, Stem Cells (2017) 35: 851-58.
Pilcher, B. et al., The activity of collagenase-1 is required for keratinocyte migration on a type I collagen matrix, J Cell Biol, 137, pp. 1445-1457 (1997).
Pintucci, G. et al., Angiogenesis and the fibrinolytic system, Semin Thromb Hemost, 22, 517-524 (1996).
Pirjali T, et al. Isolation and characterization of human mesenchymal stem cells derived from human umbilical cord Wharton's jelly and amniotic membrane. Int J Organ Transplant Med. 2013; 4: 111-116.
Pittenger MF, et al., Multilineage potential of adult human mesenchymal stem cells, Science (1999) 284, 143-7.
Plikus MV, et al., Regeneration of fat cells from myofibroblasts during wound healing, Science, 2017, 355: 748-52.
Polo JM, Hochedlinger K., When fibroblasts MET iPSCs, Cell Stem Cell. 2010; 7: 5-6.
Polyak K, Weinberg RA., Transitions between epithelial and mesenchymal states: acquisition of malignant and stem cell traits, Nat Rev Cancer. 2009; 9: 265-273.
Pozner, RG, et al., Junín virus infection of human hematopoietic progenitors impairs in vitro proplatelet formation and platelet release via a bystander effect involving type I IFN signaling, PLoS Pathog. (2010) 6: e1000847.
Pozzobon M, et al. Isolation of c-Kit+ human amniotic fluid stem cells from second trimester. Methods Mol Biol 2013; 1035: 191-198.
Qi, Y. and Qi, Y. et al, Mesenchymal stem cell-based treatment for cartilage defects in osteoarthritis, Mol. Biol. Rep (2012) 39(5): 5683-89.
Radeke, MJ et al., Restoration of mesenchymal retinal pigmented epithelial cells by TGFβ pathway inhibitors: implications for age-related macular degeneration, Genome Med. (2015) 7(1): 58.
Raposo G, Stoorvogel W., Extracellular vesicles: exosomes, microvesicles, and friends, J Cell Biol. 2013; 200: 373-83.
Rappolee, D. et al., Wound macrophages express TGF-alpha and other growth factors in vivo: analysis by mRNA phenotyping, Science, 241, pp. 708-712 (1988).
Reis LA, et al. "Bone marrow?derived mesenchymal stem cells repaired but did not prevent gentamicin?induced acute kidney injury through paracrine effects in rats," PLoS One 2012; 7: e44092.
Ren X, et al., S100a8/NF-?B signal pathway is involved in the 800-nm diode laser-induced skin collagen remodeling, Lasers Med Sci. 2016; 31: 673-678.
Ren, et al. "Global transcriptome analysis of human bone marrow stromal cells (BMSC) reveals proliferative, mobile and interactive cells that produce abundant extracellular matrix proteins, some of which may affect BMSC potency," Cytotherapy 2011; 13: 661-674.
Rennie, K. et al., Applications of amniotic membrane and fluid in stem cell biology and regenerative medicine, Stem Cells Int. (2012) article 721538.
Riches, D., R. A. F. Clark (ed), The molecular and cellular biology of wound repair, 2nd Ed. New York, Plenum Press, pp. 95-141, (1996).
Roberts A. et al., Transforming Growth Factor-1, in Clark, R. ed. The molecular and cellular biology of wound repair. 2nd Ed. New York, Plenum Press, pp. 275-308 (1996).
Robson MC et al., Wound healing: biologic features and approaches to maximize healing trajectories, Curr Probl Surg 2001, 38: 72-140.
Robson, M. et al., Platelet-derived growth factor BB for the treatment of chronic pressure ulcers, Lancet, 339, pp. 23-25 (1992).
Robson, M. et al., The safety and effect of topically applied recombinant basic fibroblast growth factor on the healing of chronic pressure sores, Ann Surg, 216, pp. 401-406 (1992).
Rosas IO, et al., "MMP1 and MMP7 as potential peripheral blood biomarkers in idiopathic pulmonary fibrosis," PLoS Med. 2008; 5(4): e93).
Roubelakis, MG, et al., Amniotic fluid and amniotic membrane stem cells: marker discovery, Stem Cells Intl (2012) article 107836.
Sadaka A & Giuliari G., Proliferative vitreoretinopathy: current and emerging treatments, clin. Ophthalmol. (2012) 6: 1325-33.
Sadiq et al., The Role of Serotonin During Skin Healing in Post-Yhermal Injury, Int. J. Mol Sci. 2018. 19.
Sakamoto T, et al. Electron microscopic histochemical studies on the localization of hyaluronic acid in Wharton's jelly of the human umbilical cord. Nihon Sanka Fujinka Gakkai zasshi. 1996; 48: 501-507.
Samavarchi-Tehrani P, et al., Functional genomics reveals a BMP-driven mesenchymal-to-epithelial transition in the initiation of somatic cell reprogramming, Cell Stem Cell. 2010; 7: 64-77.
Sano S, et al., Keratinocyte-specific ablation of Stat3 exhibits impaired skin remodeling, but does not affect skin morphogenesis, EMBO J. 1999; 18: 4657-4668.
Schiavo AA, et al. Endothelial properties of third?trimester amniotic fluid stem cells cultured in hypoxia. Stem Cell Res Ther 2015; 6: 209.
Schiro J. et al., Integrin alpha 2 beta 1 (VLA-2) mediates reorganization and contraction of collagen matrices by human cells, Cell, 67, 403-410 (1991).
Schroder,S., et al., Activated monocytes and granulocytes, capillary nonperfusion, and neovascularization in diabetic retinopathy, Am. J. Pathol. (1991) 139: 81-100.
Sephel G.C. et al., 3. Repair, Regeneration and Fibrosis, in Rubin's Pathology, Rubin, R. and Strayer, D.S. Eds; 5th Ed., Wolters Kluwyer Health, /Lippincott Williams & Wilkins, Philadelphia, PA (2008), at 71.
Serra, AM., et al., CD11b+ bone marrow-derived monocytes are the major leukocyte subset responsible for retinal capillary leukostasis in experimental diabetes in mouse and express high levels of CCR5 in the circulation, Am. J. Pathol. (2012) 181: 719-27.
Shah A, Amini-Nik S. International Journal of Drug Research and Technology. 2017;7:8.
Shah A., et al., The critical role of macrophages in the pathogenesis of hidradenitis suppurativa, S. Inflamm Res., Nov. 2017. 1966 (11): 931-945.
Shi Y, et al., Wnt and Notch signaling pathway involved in wound healing by targeting c-Myc and Hes1 separately, Stem Cell Res Ther. 2015; 6: 120.
Siddappa, R. et al., Donor variation and loss of multipotency during in vitro expansion of human mesenchymal stem cells for bone tissue engineering, J. Orthop. Res. (2007) 25(8): 1029-41.
Singer AF, et al., Cutaneous wound healing, N Engl J Med Sep. 2, 1999, 341(10): 738-746.
Sobolewski K, et al. Collagen and glycosaminoglycans of Wharton's jelly. Biol Neonate. 1997; 71: 11-21.
Soncini, M. et al., Isolation and characterization of mesenchymal cells from human fetal membranes, Tissue Eng Regen Med, 2007, 1: 296-305.
Song Q, et al., JAK/STAT3 and Smad3 activities are required for the wound healing properties of Periplaneta americana extracts, Int J Mol Med. Aug. 2017; 40(2): 465-473.
Sorensen, AL et al., Role of sialic acid for platelet life span: exposure of β-galactose results in the rapid clearance of platelets from the circulation by asialoglycoprotein receptor-expressing liver macrophages and hepatocytes, Blood (2009) 114: 1645-54.
Spaderna S, et al., Epithelial-mesenchymal and mesenchymal-epithelial transitions during cancer progression, Verh Dtsch Ges Pathol. 2007; 91: 21-28.
Speicher, MA et al., Primary vitrectomy alone for repair of retinal detachments following cataract surgery, Retina (2000) 20(5): 459-64.
Steed D., Clinical evaluation of recombinant human platelet-derived growth factor for the treatment of lower extremity diabetic ulcers. Diabetic Ulcer Study Group, J Vasc Surg, 21, pp. 71-78 (1995).
Stenberg PE et al., Neuraminidase-induced thrombocytopenia in mice: effects on thrombopoiesis, J. Cell Physiol. (1991) 147: 7-16.
Stenger AM, et al., Expression of histone H3 cell cycle-related gene, vimentin and MYC genes in pediatric brain tumors. A preliminary analysis showing the different malignant cell growth potential, Molecular Brain Research. 1992; 13: 273-275.

(56) References Cited

OTHER PUBLICATIONS

Sun, DS et al. Antiplatelet autoantibodies elicited by dengue virus non-structural protein 1cause thrombocytopenia and mortality in mice, J. Thromb. Haemost. (2007) 5: 2291-9.
Tan, H.B., et al., The therapeutic effects of bone marrow mesenchymal stem cells after optic nerve damage in the adult rat, Clin. Interv. Aging (2015) 10: 487-90.
Terada, H. et al., Interaction of influenza virus with blood platelets, Blood (1966) 28: 213-28.
Thiery JP, et al., Epithelial-mesenchymal transitions in development and disease, Cell. 2009; 139: 871-890.
Thiery JP., Epithelial-mesenchymal transitions in tumour progression, Nature Reviews Cancer. 2002; 2: 442-454.
Timmers et al., "Reduction of myocardial infarct size by human mesenchymal stem cell conditioned medium," Stem Cell Res., 1 (2007), pp. 129-137.
Tkach M, Thery C. "Communication by extracellular vesicles: Where we are and where we need to go," Cell 2016; 164: 1226-1232.
Toh, WS, et al., MSC exosome as a cell-free MSC therapy for cartilage regeneration: Implications for osteoarthritis treatment, Semin. Cell Dev. Biol. (2017) 67: 56-64.
Tokumaru S, et al., SOCS3/CIS3 negative regulation of STAT3 in HGF-induced keratinocyte migration, Biochem Biophys Res Commun. 2005; 327: 100-105.
Toupet, K. et al., Survival and biodistribution of xenogenic adipose mesenchymal stem cells is not affected by the degree of inflammation in arthritis, PLoS One (2015) 10(1): e0114962.
Tremain N, et al. MicroSAGE analysis of 2,353 expressed genes in a single cell?derived colony of undifferentiated human mesenchymal stem cells reveals mRNAs of multiple cell lineages. Stem Cells 2001; 19: 408-418.
Tsai MS, et al., Hum Reprod. <https://www.ncbi.nlm.nih.gov/pubmed/15105397/> Jun. 2004; 19(6): 1450-6.
Tsanou, E.et al., Immunohistochemical study of angiogenesis and proliferative activity in epiretinal membranes, Intl J. Clin. Pract. (2005) 59 (10): 1157-61.
US Eye Injury Registry. 2016; American Academy of Ophthalmology. 2016.
Vaalamo, M. et al., Distinct populations of stromal cells express collagenase-3 (MMP-13) and collagenase-1 (MMP-1) in chronic ulcers but not in normally healing wounds, J Invest Dermatol, 109, pp. 96-101 (1997).
Valacchi G. et. al., Emerging topics in cutaneous wound repair, Ann N Y Acad, Sci., 2012, 1259:136-144.
Van Buul, G. et al, Mesenchymal stem cells secrete factors that inhibit inflammatory processes in short-term osteoarthritic synovium and cartilage explant culture, Osteoarthr. Cartil. (2012) 20(10): 1186-96.
Vega, A., et al., Treatment of Knee Osteoarthritis With Allogeneic Bone Marrow Mesenchymal Stem Cells: A Randomized Controlled Trial, Transplantation (2015) 99(8): 1681-90.
Velnar T et al., The wound healing process: an overview of the cellular and molecular mechanisms, The Journal of International Medical Research 2009, 37: 1528-1542.
Venetainer A, et al. Cessation of cytokeratin expression in a rat hepatoma cell line lacking differentiated functions, Nature. 1983; 305: 730-733.
Venkat P, et al., Cell-Based and Exosome Therapy in Diabetic Stroke, Stem Cells Transl Med. Jun. 2018; 7(6): 451-455.
Vij R, Noth I. "Peripheral blood biomarkers in idiopathic pulmonary fibrosis," Transl Res. 2012; 159(4): 218-27.
Vijosevic, S. et al., Aqueous Humor Biomarkers of Muller Cell Activation in Diabetic Eyes, Invest. Ophthalmol. Vis. Sci. (2015) 56: 3913-18.
Vujosevic, S. et al., Proteome analysis of retinal glia cells-related inflammatory cytokines in the aqueous humour of diabetic patients, Acta Ophthalmol. (2016) 94: 56-64.
Wang H.S. et al Chen, Mesenchymal stem cells in the Wharton's jelly of the human umbilical cord, Stem Cells, 22 (2004) 1330-1337.

Wang, Q. et al., Interferon-alpha directly represses megakaryopoiesis by inhibiting thrombopoietin-induced signaling through induction of SOCS-1, Blood (2000) 96: 2093-9.
Wang, X. et al., Gene expression changes under cyclic mechanical stretching in rat retinal glial (Müller) cells, PLoS One (2013), 8(5) e63467.
Welch, M. et al., Temporal relationships of F-actin bundle formation, collagen and fibronectin matrix assembly, and fibronectin receptor expression to wound contraction, J. Cell Biol, 110, pp. 133-145 (1990).
Werner S, et al., Keratinocyte-fibroblast interactions in wound healing, J Invest Dermatol. 2007; 127: 9981008.
Werner, S. et al., The function of KGF in morphogenesis of epithelium and reepithelialization of wounds, Science, 266, pp. 819-822 (1994).
Weyrich AS, et al,, Platelets: signaling cells in the immune continuum, Trends Immunol Sep. 2004, 25(9): 489495.
Withrow J. et al., Extracellular vesicles in the pathogenesis of rheumatoid arthritis and osteoarthritis, Arthritis Res. Ther. (2016) 18(1): 286.
Wolk K, et al., Biology of interleukin-22, Semin Immunopathol. 2010; 32: 17-31.
Woodley D. et al., Collagen telopeptides (cross-linking sites) play a role in collagen gel lattice contraction, J Invest Dermatol, 97, 580-585 (1991).
World Health Organization W.H.O. (WHO), in, http://www.who.int/en/news-room/fact-sheets/detail/burns, 2018.
Wyles, CC, et al, Mesenchymal stem cell therapy for osteoarthritis: current perspectives, Stem Cells Cloning (2015) 8: 117.
Wynn et al., A small proportion of mesenchymal stem cells strongly expresses functionally active CXCR4 receptor capable of promoting migration to bone marrow, 2004 Blood 104: 2643-45.
Werber et al., A prospective study of 20 foot and ankle wounds treated with cryopreserved amniotic membrane and fluid allograft. J Foot Ankle Surg. Sep.-Oct. 2013;52(5):615-21.
Wilson et al., Acellular matrix allograft small caliber vascular prostheses. ASAIO Trans. Jul.-Sep. 1990;36(3):M340-3.
Wu et al., Comparison of the Biological Characteristics of Mesenchymal Stem Cells Derived from the Human Placenta and Umbilical Cord. Sci Rep. Mar. 22, 2018;8(1):5014, 9 pages.
Yao et al., Animal-cell culture media: History, characteristics, and current issues. Reprod Med Biol. Mar. 21, 2017;16(2):99-117.
Aggarwal, Signalling pathways of the TNF superfamily: a double-edged sword. Nat Rev Immunol. Sep. 2003;3(9):745-56.
Alcaraz et al., Autocrine TGF-beta Induces Epithelial to Mesenchymal Transition in Human Amniotic Epithelial Cells. Cell Transplantation. 2013;22:1351-1367.
Baulier et al., Amniotic fluid-derived mesenchymal stem cells prevent fibrosis and preserve renal function in a preclinical porcine model of kidney transplantation. Stem Cells Transl Med. Jul. 2014;3(7):809-20.
Bigbey et al., Amnion-Derived Fluid and Amniotic Fluid. Axolotl Biologix. MRK0001-v 1.0.0, 2 pages.
Camilli et al., Striking the target in Wnt-y conditions: intervening in Wnt signaling during cancer progression. Biochem Pharmacol. Sep. 1, 2010;80(5):702-11.
Carreira-Barbosa et al., Prickle 1 regulates cell movements during gastrulation and neuronal migration in zebrafish. Development. Sep. 2003;130(17):4037-46.
Chang et al., The dynamic properties of intermediate filaments during organelle transport. J Cell Sci. Aug. 15, 2009;122(Pt 16):2914-23.
Chen et al., Human amniotic epithelial cell feeder layers maintain iPS cell pluripotency by inhibiting endogenous DNA methyltransferase 1. Exp Ther Med. Nov. 2013;6(5):1145-1154.
Chowdhury, Guidance for Industry: Chronic Obstructive Pulmonary Disease: Developing Drugs for Treatment. Retrieved online at: http://www.fda.gov/cder/guidance/index.htm. 17 pages, Nov. 2007.
Ciubotaru et al., Ex vivo approach to treat failing organs: expanding the limits. Eur Surg Res. 2015;54(1-2):64-74.
Collins et al., Kidney preservation for transportation. Experimental analysis of optimal perfusate composition. Br J Surg. Mar. 1972;59(3):187-9.

(56) References Cited

OTHER PUBLICATIONS

Courtman et al., Development of a pericardial acellular matrix biomaterial: biochemical and mechanical effects of cell extraction. J Biomed Mater Res. Jun. 1994;28(6):655-66.
Coutinho et al., Limiting burn extension by transient inhibition of Connexin43 expression at the site of injury. Br J Plast Surg. Jul. 2005;58(5):658-67.
Davydova et al., Cell Phenotypes in Human Amniotic Fluid. Acta Naturae. 2009;1(2):98-103.
Gordon et al., Wnt signaling: multiple pathways, multiple receptors, and multiple transcription factors. J Biol Chem. Aug. 11, 2006;281(32):22429-33.
Gorentla et al., T cell Receptor Signal Transduction in T lymphocytes. J Clin Cell Immunol. Oct. 27, 2012;2012 (Suppl 12):5, 23 pages.
Grose et al., Wound-healing studies in transgenic and knockout mice. Mol Biotechnol. Oct. 2004;28(2):147-66.
Gross et al., An inexpensive, pressure-regulated air pump for fluid-air exchange during pars plana vitrectomy. Arch Ophthalmol. Nov. 1991;109(11):1492.
Guibert et al., Organ Preservation: Current Concepts and New Strategies for the Next Decade. Transfus Med Hemother. 2011;38(2):125-142.
Gulbis et al., Amniotic fluid biochemistry in second-trimester trisomic pregnancies: relationships to fetal organ maturation and dysfunction. Early Hum Dev. Oct. 1998;52(3):211-9.
Gupta et al., Amnion and Chorion Membranes: Potential Stem Cell Reservoir with Wide Applications in Periodontics. Int J Biomater. 2015;2015:274082, 9 pages.
Heidari et al., Characterization of the growth factor activity of amniotic fluid on cells from hematopoietic and lymphoid organs of different life stages. Microbiol Immunol. 1996;40(8):583-9.
Kim et al., The potential of mesenchymal stem cells derived from amniotic membrane and amniotic fluid for neuronal regenerative therapy. BMB Rep. Mar. 2014;47(3):135-40.
Koizumi et al., Growth factor mRNA and protein in preserved human amniotic membrane. Curr Eye Res. Mar. 2000;20(3):173-7.
Kumar et al., Animal Models for the Evaluation of Wound Healing Activity. International Bulletin of Drug Research. 2013;3(5):93-107.
Lichtenberger et al., Epidermal beta-catenin activation remodels the dermis via paracrine signalling to distinct fibroblast lineages. Nat Commun. Feb. 3, 2016;7:10537, 13 pages.
Malone et al., Detergent-extracted small-diameter vascular prostheses. J Vasc Surg. Jan. 1984;1(1):181-91.
Maurer et al., Comparison of UW and Collins solution for preservation of the rat heart. Transplant Proc. Apr. 1990;22(2):548-50.
Miki, Amnion-derived stem cells: in quest of clinical applications. Stem Cell Res Ther. May 19, 2011;2(3):25, 11 pages.
Mirabella et al., Amniotic liquid derived stem cells as reservoir of secreted angiogenic factors capable of stimulating neoarteriogenesis in an ischemic model. Biomaterials. May 2011;32(15):3689-99.
Miyagi et al., STAT3 noncell-autonomously controls planar cell polarity during zebrafish convergence and extension. J Cell Biol. Sep. 27, 2004;166(7):975-81.
Oliveira et al., Placental-derived stem cells: Culture, differentiation and challenges. World J Stem Cells. May 26, 2015;7(4):769-75.
Qian et al., Wnt5a functions in planar cell polarity regulation in mice. Dev Biol. Jun. 1, 2007;306(1):121-33.
Qiu et al., Targeting connexin43 expression accelerates the rate of wound repair. Curr Biol. Sep. 30, 2003;13(19):1697-703.
Rathbone et al., Effect of various concentrations of antibiotics on osteogenic cell viability and activity. J Orthop Res. Jul. 2011;29(7):1070-4.
Rosenberg, Inflammation. Fundamental Immunology, Fourth Edition. William E. Paul (Ed.). Lippincott-Raven Publishers, Philadelphia. Chapter 32, pp. 1051-1053, (1999).
Rouiller et al., A high-throughput media design approach for high performance mammalian fed-batch cultures. MAbs. May-Jun. 2013;5(3):501-11.
Semenov et al., SnapShot: Noncanonical Wnt Signaling Pathways. Cell. Dec. 28, 2007;131(7):1378.
Sephel et al., Repair, Regeneration and Fibrosis. Rubin's Pathology. Chapter 3, pp. 84-117, (2001).
Siar et al., Differential expression of canonical and non-canonical Wnt ligands in ameloblastoma. J Oral Pathol Med. Apr. 2012;41(4):332-9.
Skardal et al., Bioprinted amniotic fluid-derived stem cells accelerate healing of large skin wounds. Stem Cells Transl Med. Nov. 2012;1(11):792-802.
Southard et al., Organ preservation. Annu Rev Med. 1995;46:235-47.
Souza et al., Effect of amikacin, cephalothin, clindamycin and vancomycin on in vitro fibroblast growth. Genetics and Molecular Biology. 2004;27(3):454-459.
Sun et al., Non-canonical NF-kB signaling pathway. Cell Res. Jan. 2011;21(1):71-85.
Swanson et al., Improved heart preservation with UW preservation solution. J Heart Transplant. Nov.-Dec. 1988;7(6):456-67.
Takeuchi et al., The prickle-related gene in vertebrates is essential for gastrulation cell movements. Curr Biol. Apr. 15, 2003;13(8):674-9.
Turhan-Haktanir et al., Evaluation of amniotic fluid as a skin graft storage media compared with RPMI and saline. Burns. Jun. 2011;37(4):652-5.
Van Raemdonck et al., Machine perfusion in organ transplantation: a tool for ex-vivo graft conditioning with mesenchymal stem cells? Curr Opin Organ Transplant. Feb. 2013;18(1):24-33.
Wang, Wnt/Planar cell polarity signaling: a new paradigm for cancer therapy. Mol Cancer Ther. Aug. 2009;8(8):2103-9.
Wei et al., Connexins and cell signaling in development and disease. Annu Rev Cell Dev Biol. 2004;20:811-38.
Gryzwocz, Z. et al., Growth factors and their receptors derived from human amniotic cells in vitro, Folio Histochemica et Cytobiologica (2014) 52(3): 163-170.
Guiot, J. et al, "Blood biomarkers in idiopathic pulmonary fibrosis," Lung (2017) 195(3): 273-280.
Haasnoot, AM et al., Ocular Fluid Analysis in Children Reveals Interleukin-29/Interferon -?1 as a Biomarker for Juvenile Idiopathic Arthritis-Associated Uveitis, Arthritis Rheumatol. (2016) 68: 1769-79.
Hajrasouliha AR., et al., Exosomes from retinal astrocytes contain antiangiogenic components that inhibit laser-induced choroidal neovascularization, J. Biol. Chem. (2013) 288: 28058-067.
Ham, O. et al., Therapeutic Potential of Differentiated Mesenchymal Stem Cells for Treatment of Osteoarthritis, Intl J. Mol. Sci. (2015) 16(7): 14961-78.
Han, KY, et al., Evidence for the Involvement of MMP14 in MMP2 Processing and Recruitment in Exosomes of Corneal Fibroblasts, Invest. Ophthalmol. Vis. Sci (2015) 56: 5323-5329.
He B, et al. Therapeutic potential of umbilical cord blood cells for type 1 diabetes mellitus. J Diabetes. 2015; 7: 762-73.
Hedberg KK, Chen LB., Absence of intermediate filaments in a human adrenal cortex carcinoma-derived cell line, Experimental cell research. 1986; 163: 509-517.
Heldin C., et al., The molecular and cellular biology of wound repair, 2nd Ed. New York, Plenum Press, pp. 249-273, (1996).
Heldring, N. et al, Therapeutic Potential of Multipotent Mesenchymal Stromal Cells and Their Extracellular Vesicles, Hum. Gene Ther. (2015) 26(8): 506-17.
Hong HJ, et al., Accelerated wound healing by smad3 antisense oligonucleotides-impregnated chitosan/alginate polyelectrolyte complex, Biomaterials. 2008; 29: 4831-4837.
Hottz, Ed et al., Dengue Induces Platelet Activation, Mitochondrial Dysfunction and Cell Death through Mechanisms that Involve DC-SIGN and Caspases, J. Thromb. Haemost (2013) 11: 951-62.
Hottz, Ed et al., Platelet activation and adoptosis modulate monocyte inflammatory responses in dengue, J. Immunol. (2014) 193: 1864-72.

(56) References Cited

OTHER PUBLICATIONS

Hottz, Ed et al., Platelets mediate increased endothelium permeability in dengue through NLRP3-inflammasome activation, Blood (2013) 122: 3405-14.
Howell, GR., et al., Radiation treatment inhibits monocyte entry into the optic nerve head and prevents neuronal damage in a mouse model of glaucoma, J. Clin. Invest. (2012) 122: 1246-61.
Hu Y. et al., Exosomes from human umbilical cord blood accelerate cutaneous wound healing through miR-21-3p-mediated promotion of angiogenesis and fibroblast function, heranostics, Jan. 1, 2018, 8(1): 169-184.
Hunt, T. ed. Wound Healing and Wound Infection: Theory and Surgical Practice. New York, Appleton-Century-Crofts (1980).
Huurne, MI et al, Antiinflammatory and chondroprotective effects of intraarticular injection of adipose-derived stem cells in experimental osteoarthritis, Arthritis Rheumatism (2012) 64 (11): 3604-13.
Iannacone, M. et al., Platelets prevent IFN-alpha/beta-induced lethal hemorrhage promoting CTL-dependent clearance of lymphocytic choriomeningitis virus, Proc. Natl Acad. Sci. USA (2008) 105: 629-34.
Ilan, N. et al., Distinct signal transduction pathways are utilized during the tube formation and survival phases of in vitro angiogenesis, J Cell Sci, 111, 3621-3631 (1998).
Leibovich, S. et. al., The Role of the Macrophage in Wound Repair, Am J Pathol, 78, pp. 1-100 (1975).
Lee, WY-W, Wang, B, Cartilage repair by mesenchymal stem cells: Clinical trial update and perspectives, J. Orthop. Trans. (2017) 9: 76-88.
Jeschke MG, et al., Burns: Journal of the International Society for Burn Injuries, 2016, 42: 276-281.
Jeschke MG, et al., Pathophysiologic Response to Burns in the Elderly, EBioMedicine, 2015 2: 1536-48.
Johnson et al., In vitro models for the study of osteoarthritis, The Veterinary Journal 209 (2016) 40-49.
Johnson, TV, et al., Neuroprotective Effects of Intravitreal Mesenchymal Stem Cell Tranplantation in Experimental Glaucoma, Invest. Ophthalmol. Vis. Sci. (2010) 51: 2051-59.
Jones, et al., Isolation and characterization of bone marrow multipotential mesenchymal progenitor cells, 2002 Arthritis Rheum., 46: 3349-60.
Kalluri R, Weinberg RA., The basics of epithelial-mesenchymal transition, The Journal of clinical investigation. 2009; 119: 1420.
Kalluri R., Neilson E.G., Epithelial-mesenchymal transition and its implications for fibrosis, J. Clin. Invest. 2003;112:1776-1784.
Kalluri, R. and Weinberg, RA, The basics of epithelial-mesenchymal transition, J. Clin. Invest. (2009) 119:1420-1428.
Kang, GY et al., Exosomal proteins in the aqueous humor as novel biomarkers in patients with neovascular age-related macular degeneration, J. Proteome Res. (2014) 13: 581-95.

Karamichos et al., Human corneal fibrosis: an in vitro model, Invest Opthalamol Vis Sci (2010) 51(1382-88).
Kato, T. et al., Exosomes from IL-1β stimulated synovial fibroblasts induce osteoarthritic changes in articular chondrocytes, Arthritis Res. Ther. (2014) 16(4): 163.
Katsuda T, et al. "Human adipose tissue?derived mesenchymal stem cells secrete functional neprilysin?bound exosomes," Sci Rep (2013) 3: 1197.
Klingeborn, M. et al., Roles of exosomes in the normal and diseased eye, Prog. Retin. Eye Res. (2017) 59: 158-77.
Koch, AE., et al., Interleukin-8 as a macrophage-derived mediator of angiogenesis, Science (1992) 258: 1798-1801.
Koizumi, K. et al, Synovial mesenchymal stem cells from osteo- or rheumatoid arthritis joints exhibit good potential for cartilage repair using a scaffold-free tissue engineering approach, Osteoarthr. Cartil. (2016) 24(8): 1413-22.
Kolb H. et al., Webvision: The Organization of the Retina and Visual System [Internet]. Salt Lake City (UT): University of Utah Health Sciences Center, 1995-2005, https://pubmed.ncbi.nlm.nih.gov/21413389/.
Kolhe, R. et al., Gender-specific differential expression of exosomal miRNA in synovial fluid of patients with osteoarthritis, Sci Rep. (2017) 7(1): 20-29.
Kosuma GD, et al, "Effect of the microenvironment on mesenchymal stem cells paracrine signaling: opportunities to engineer the therapeutic effect," Stem Cells Dev. (2017) 26: 617-31.
Lai et al., "Exosome secreted by MSC reduces myocardial ischemia/reperfusion injury," Stem Cell Res., 4 (2010), pp. 214-222.
Lai et al., Derivation and characterization of human fetal MSCs: an alternative cell source for large-scale production of cardioprotective microparticles, J. Mol. Cell. Cardiol., 48 (2010), pp. 1215-1224.
Lamo-Espinosa, JM et al., Intra-articular injection of two different doses of autologous bone marrow mesenchymal stem cells versus hyaluronic acid in the treatment of knee osteoarthritis: multicenter randomized controlled clinical trial (phase I/II), J. Transl. med. (2016) 14(1): 246.
Lamparski GH, Production and characterization of clinical grade exosomes derived from dendritic cells, J Immunol Methods. 2002; 270: 211-226.
Lane EB, et al., Co-expression of vimentin and cytokeratins in parietal endoderm cells of early mouse embryo, Nature. 1983; 303: 701-704.
Lee RW., et al., Autoimmune and autoinflammatory mechanisms in uveitis, Semin. Immunopathol. (2014) 36: 581-94.
Lee Y, El Andaloussi S, Wood MJ. "Exosomes and microvesicles: Extracellular vesicles for genetic information transfer and gene therapy," Hum Mol Genet 2012;21: R15-134.
Lee, MJ et al, J., Proteomic analysis of tumor necrosis factor-alpha-induced secretome of human adipose tissue-derived mesenchymal stem cells, Proeome Res. (2010) 9(4): 1754-62.

* cited by examiner

AMNIOTIC FLUID-DERIVED EXTRACELLULAR VESICLES AND USES THEREOF FOR WOUND HEALING

CROSS-REFERENCE TO RELATED APPLICATIONS

This application is a 35 U.S.C. § 371 national stage filing of International Application No. PCT/US2020/020229, filed on Feb. 27, 2020, which in turn claims the benefit of U.S. provisional application 62/812,011 (filed 28 Feb. 2019). The entire contents of each of the foregoing applications are incorporated herein by reference.

REFERENCE TO ELECTRONIC SEQUENCE LISTING

This application contains a Sequence Listing which has been submitted electronically in. TXT format and is hereby incorporated by reference in its entirety. Said .TXT copy, created on Oct. 13, 2021, is named 130555.00202_00220_SL_37741062_1.txt, and is 3,488 bytes in size. The sequence listing contained in this .TXT file is part of the specification and is hereby incorporated by reference herein in its entirety.

FIELD OF INVENTION

The described invention generally relates to purified amniotic fluid-derived extracellular vesicles (EVs), compositions containing the EVs, and uses thereof.

BACKGROUND

Amniotic Components

The fetal adnexa (meaning connected parts), is composed of the placenta, fetal membranes, and umbilical cord. At term, the placenta is discoid in shape with a diameter of 15-20 cm and a thickness of 2-3 cm. The fetal membranes, amnion and chorion, which enclose the fetus in the amniotic cavity, and the endometrial decidua extend from the margins of the chorionic disc. The chorionic plate (fetal component of extraembryonic tissue) is a multilayered structure that faces the amniotic cavity. It consists of two different structures: the amniotic membrane (composed of epithelium, compact layer, amniotic mesoderm, and spongy layer) and the chorion (composed of mesenchyme and a region of extravillous proliferating trophoblast cells interposed in varying amounts of Langhans fibrinoid, either covered or not by syncytiotrophoblast).

Villi originate from the chorionic plate and anchor the placenta through the trophoblast of the basal plate and maternal endometrium. From the maternal side, protrusions of the basal plate within the chorionic villi produce the placental septa, which divide the parenchyma into irregular cotyledons (Parolini, O. et al., 2008, Stem Cell, 2008, 26: 300-311).

Some villi anchor the placenta to the basal plate, whereas others terminate freely in the intervillous space. Chorionic villi present with different functions and structure. In the term placenta, the stem villi show an inner core of fetal vessels with a distinct muscular wall and connective tissue consisting of fibroblasts, myofibroblasts, and dispersed tissue macrophages (Hofbauer cells). Mature intermediate villi and term villi are composed of capillary vessels and thin mesenchyme. A basement membrane separates the stromal core from an uninterrupted multinucleated layer, called the syncytiotrophoblast. Between the syncytiotrophoblast and its basement membrane are single or aggregated Langhans cytotrophoblastic cells, commonly called cytotrophoblast cells (Parolini, O. et al., 2008, Stem Cell, 2008, 26: 300-311).

The placenta contains three layers: the amnion, the chorion, both of which are derived from the embryo, and the decidua, which is maternal tissue derived. The chorion is derived from the trophoblast layer, while the amnion is derived from the epiblast, which gives rise to all of the germ layers of the embryo, as early as 8 days after fertilization.

Four regions of fetal placenta can be distinguished: an amniotic epithelial region, an amniotic mesenchymal region, a chorionic mesenchymal region, and a chorionic trophoblastic region.

The Amnion

The amnion is a thin, avascular membrane composed of an inner epithelial layer and an outer layer of connective tissue that, and is contiguous, over the umbilical cord, with the fetal skin. The outer layer comprises human amniotic mesenchymal stromal cells (hMSCs), which are surrounded by an intracellular matrix (Grzywocz, Z. et al. Folia Histochemica et Cytobiologica (2014) 52 (3): 163-170). The inner layer closest to the fetus is the amniotic epithelium (AE), which is an uninterrupted, single layer of flat, cuboidal and columnar epithelial cells and is in contact with amniotic fluid. It is attached to a distinct basal lamina that is, in turn, connected to the amniotic mesoderm (AM). In the amniotic mesoderm closest to the epithelium, an acellular compact layer is distinguishable, composed of collagens I and III and fibronectin. Deeper in the AM, a network of dispersed fibroblast-like mesenchymal cells and rare macrophages are observed. It has been reported that the mesenchymal layer of amnion contains two subfractions, one comprising a mesenchymal phenotype, also known as amniotic mesenchymal stromal cells, and the second containing monocyte-like cells. Blood vessels or nerves are absent from amniotic membrane. It derives its nutrition directly by diffusion out of the amniotic fluid.

Chorion

A spongy layer of loosely arranged collagen fibers separates the amniotic and chorionic mesoderm. The chorionic membrane (chorion leave) consists of mesodermal and trophoblastic regions. Chorionic and amniotic mesoderm are similar in composition. A large and incomplete basal lamina separates the chorionic mesoderm from the extravillous trophoblast cells. The latter, similar to trophoblast cells present in the basal plate, are dispersed within the fibrinoid layer and express immunohistochemical markers of proliferation. The Langhans fibrinoid layer usually increases during pregnancy and is composed of two different types of fibrinoid: a matrix type on the inner side (more compact) and a fibrin type on the outer side (more reticulate). At the edge of the placenta and in the basal plate, the trophoblast interdigitates extensively with the decidua (Cunningham, F. et al., The placenta and fetal membranes, Williams Obstetrics, 20th ed. Appleton and Lange, 1997, 95-125; Benirschke, K. and Kaufmann, P. Pathology of the human placenta. New York, Springer-Verlag, 2000, 42-46, 116, 281-297).

Amnion-Derived Stem Cells

The amniotic membrane itself contains multipotent cells that are able to differentiate in the various layers. Studies have reported their potential in neural and glial cells, cardiac repair and also hepatocyte cells. Studies have shown that human amniotic epithelial cells express stem cell markers and have the ability to differentiate toward all three germ layers. These properties, the ease of isolation of the cells, and the availability of placenta, make amnionic membrane a useful and noncontroversial source of cells for transplantation and regenerative medicine.

Amniotic epithelial cells can be isolated from the amniotic membrane by several methods that are known in the art. According to one such method, the aminiotic membrane is stripped from the underlying chorion and digested with trypsin or other digestive enzymes. The isolated cells readily attach to plastic or basement membrane-coated culture dishes. Culture is established commonly in a simple medium such as Dulbecco's Modified Eagle's Medium (DMEM) supplemented with 5%-10% serum and epidermal growth factor (EGF), in which the cells proliferate robustly and display typical cuboidal epithelial morphology. Normally, 2-6 passages are possible before proliferation ceases. Amniotic epithelial cells do not proliferate well at low densities.

Amniotic membrane contains epithelial cells with different surface markers, suggesting some heterogeneity of phenotype. Immediately after isolation, human amniotic epithelial cells express very low levels of human leukocyte antigen (HLA)-A, B, C; however, by passage 2, significant levels are observed. Additional cell surface antigens on human amniotic epithelial cells include, but are not limited to, ATP-binding cassette transporter G2 (ABCG2/BCRP), CD9, CD24, E-cadherin, integrins a6 and 1, c-met (hepatocyte growth factor receptor), stage-specific embryonic antigens (SSEAs) 3 and 4, and tumor rejection antigens 1-60 and 1-81. Surface markers thought to be absent on human amniotic epithelial cells include SSEA-1, CD34, and CD133, whereas other markers, such as CD117 (c-kit) and CCR4 (CC chemokine receptor), are either negative or may be expressed on some cells at very low levels. Although initial cell isolates express very low levels of CD90 (Thy-1), the expression of this antigen increases rapidly in culture (Miki, T. et al., Stem Cells, 2005, 23: 1549-1559; Miki, T. et al., Stem Cells, 2006, 2: 133-142).

In addition to surface markers, human amniotic epithelial cells express molecular markers of pluripotent stem cells, including octamer-binding protein 4 (OCT-4) SRY-related HMG-box gene 2 (SOX-2), and Nanog (Miki, T. et al., Stem Cells, 2005, 23: 1549-1559).

Human amniotic mesenchymal cells (hAMSC) and human chorionic mesenchymal cells (hCMSC) are thought to be derived from extraembryonic mesoderm. hAMSC and hCMSC can be isolated from first-, second-, and third-trimester mesoderm of amnion and chorion, respectively. For hAMSC, isolations are usually performed with term amnion dissected from the deflected part of the fetal membranes to minimize the presence of maternal cells. For example, homogenous hAMSC populations can be obtained by a two-step procedure, whereby: minced amnion tissue is treated with trypsin to remove hAEC and the remaining mesenchymal cells are then released by digestion (e.g., with collagenase or collagenase and DNase). The yield from term amnion is about 1 million hAMSC and 10-fold more hAEC per gram of tissue (Casey, M. and MacDonald P., Biol Reprod, 1996, 55: 1253-1260).

hCMSCs are isolated from both first- and third-trimester chorion after mechanical and enzymatic removal of the trophoblastic layer with dispase. Chorionic mesodermal tissue is then digested (e.g., with collagenase or collagenase plus DNase). Mesenchymal cells also have been isolated from chorionic fetal villi through explant culture, although maternal contamination is more likely (Zhang, X., et al., Biochem Biophys Res Commun, 2006, 340: 944-952; Soncini, M. et al., J Tissue Eng Regen Med, 2007, 1: 296-305; Zhang et al., Biochem Biophys Res Commun, 2006, 351: 853-859).

The surface marker profile of cultured hAMSC and hCMSC, and mesenchymal stromal cells (MSC) from adult bone marrow are similar.

Amniotic Fluid (AF)

Amniotic fluid is a complex and dynamic biological fluid that provides mechanical protection, nutrients, and other molecules required for fetal growth and well-being (Cho, C-K. J., et al, "Proteomics Analysis of Human Amniotic Fluid," 2007 Molecular & Cellular Proteomics 6: 1406-1415). Both the quantitative and qualitative integrity of AF are essential for normal development of the human fetus during pregnancy.

During embryogenesis, the amniotic cavity first appears at 7-8 days after fertilization and in early gestation the amniotic fluid originates mostly from maternal plasma that crosses the fetal membranes (Rennie, K. et al., "Applications of amniotic membrane and fluid in stem cell biology and regenerative medicine," Stem Cells Intl. (2012) article 721538). Fetal urine first enters the amniotic space at 8-11 weeks gestation, and in the second half of pregnancy, fetal urine becomes the major contributor to amniotic fluid (Id.). At this time, fetal skin keratinization is compete, leading to reduced water transport across the skin and a decrase in AF osmolality (Id.). For the remainder of gestation, fluid volume is determined by diferent mechanisms, including fetal urine production, oral, nasal, tracheal and pulmonary fluid secretion, fetal swallowing, and the contributions of the intramembranous pathway (Id.).

AF contains water, amino acids, peptides, proteins, carbohydrates, lipids, lactate, pyruvate, enzymes, growth factors, hormones, and electrolytes (Cho, C-K. J., et al, "Proteomics Analysis of Human Amniotic Fluid," Molecular & Cellular Proteomics (2007) 6: 1406-1415; Rennie, K. et al., "Applications of amniotic membrane and fluid in stem cell biology and regenerative medicine," Stem Cells Intl. (2012) article 721538). While the major component of AF is water, its overall composition varies throughout pregnancy (Roubelakis, M G, et al., "Amniotic fluid and amniotic membrane stem cells: marker discovery,' Stem Cells Intl (2012) article 107836). In addition, fluid secretions from the fetus into the AF carry a variety of fetal cells, resulting in a heterogeneous population of cells derived from fetal skin, gastrointestinal, respiratory and urinary tracts, and the amniotic membrane (Rennie, K. et al., "Applications of amniotic membrane and fluid in stem cell biology and regenerative medicine," Stem Cells Intl. (2012) article 721538). As the fetus develops, the volume and composition of the amniotic fluid change drastically, and the complement of cells detected in amniotic fluid samples taken at different gestational ages varies considerably.

Amniotic fluid cells (AFCs) represent a heterogeneous population derived from the three germ layers. These cells have an epithelial origin and are derived from either the developing embryo or the inner surface of the amniotic membrane, which are characterized as amniotic membrane stem cells (Roubelakis, M G, et al., "Amniotic fluid and amniotic membrane stem cells: marker discovery," Stem Cells Intl (2012) article 107836). The AFCs are mainly composed of three groups of adherent cells categorized based on their morphological, growth and biochemical characteristics: epitheliod (E-type) cells, which are cuboidal to columnar cells derived from the fetal skin and urine; amniotic fluid (AF-type) cells originating from fetal membranes, and fibroblastic (F-type) cells generated mainly from fibrous connective tissue. The dominant cell type appears to be the AF type, coexpressing keratins and vimentins. Several studies have documented that human amniotic fluid stem cells (AFSCs) can be obtained from a small amount of second trimester AF collected during routine amniocenteses. The isolation of AFSCs can be categorized as follows: (i) a single step cultivation protocol, where the primary culture is left undisturbed for 7 days or more until the first colonies appear; (ii) a two-step cultivation protocol, where amniocytes, not attached after 5 days in culture, were collected and futher expanded; (iii) cell surface marker selection for CD117 (c-kit receptor); (iv) mechanical isolation of the initial mesenchymal progenitor cell colonies formed in the initial cultures; and (v) short term cultures to isolate fibroblastoid colones. The majority of the AFSCs isolated following these steps shared a multipotent mesenchymal phenotype, and exhibited higher proliferation potential and a wider differentiation potential compared to adult MSCs (Roubelakis, M G, et al., "Amniotic fluid and amniotic membrane stem cells: marker discovery," Stem Cells Intl (2012) article 107836).

A detailed analysis of AFSC-conditioned media revealed the presence of proangiogenic and antiangiogenic factors using Liminex' MAP Technology. Vascular endothelial growth factor (VEGF), stromal cell-derived factor 1 (SDF-1), interleukin 8 (IL-8), monocyte chemotactic protein 1 (MCP-1), and two angiogenesis inhibitors, interferon-gamma (IFNγ) and interferon gamma-induced protein 10 (IP-10) have been identified as secreted proteins (Id.). A relatively small number of AFSCs was shown to be enough to secrete a detectable maount of proangiogenic growth factors and cytokines (Id.).

Human Amniotic Fluid Proteome

Analysis of human AF samples from women at 16-18 weeks of gestation showed that albumin comprises nearly 70% of the protein content of AF, with immunoglobulins being the second most abundant fraction (Cho, C-K. J., et al, "Proteomics Analysis of Human Amniotic Fluid," 2007, Molecular & Cellular Proteomics 6: 1406-1415). Cho et al. identified 842 proteins from 754 distinct genes and 88 proteins from uncharacterized genes in amniotic fluid. The proteins were sorted by the number of unique peptides identified from strong anion exchange (SAX) and strong cation exchange (SCX) methods, which is generally accepted as a semiquantitative measure of protein abundance. The top 15 proteins in amniotic fluid with the largest number of unique peptides were, in descending order, albumin, immunoglobulins, fibronectin, serotransferrin, complement C3, α1-antitrypsin, ceruloplasmin, afetoprotein, vitamin D-binding protein, periostin, apolipoprotein A-1, antithrombin III, transforming growth factor β-induced protein ig-h3 precursor, α1-microglobulin, and plasminogen. By comparison, the top 15 proteins in plasma in descending order are albumin, immunoglobulins, serotransferrin, fibrinogen, α1-microglobulin, α1-antitrypsin, complement C3, haptoglobin, apolipoprotein A-1, apolipoprotien B, α1-acid glycoprotein, lipoprotein, factor H, ceruloplasmin, and complement C4.

Metabolomics

Standard biochemical variables were measured in pure samples of amniotic fluid and extraembryonic coelomic fluid obtained from women with a normal pregnancy between 7 and 12 weeks gestation having termination of pregnancy by transvaginal ultrasound guided amniocentesis. In the first trimester of pregnancy, levels of sodium, potassium and bicarbonate were significantly higher in amniotic fluid, while chloride, urea, bilirubin, protein, albumin, glucose, creatinine, calcium and phosphate were present in higher concentrations in extraembyonic coelomic fluid (Campbell, J. et al., "Biochemical composition of amniotic fluid and extrambryonic coelomic fluid in the first trimester of pregnancy," Br. J. Obstet. Gynaecol. (1992) 99 (7): 563-565).

$^1$H-NMR-based metabolic profiling was applied to track metabolic changes occurring in amniotic fluid and plasma of healthy mothers over the course of pregnancy (Orczyk-Pawilowicz, et al, "Metabolomics of human amniotic fluid and maternal plasma during normal pregnancy," PLos ONE (2016) 11(4): e0152740). It is established that during the first two-thirds of gestation, the mother is in an anabolic condition. During the third trimester, intensive anabolic processes are occurring in the fetus, while maternal metabolism is switched towards catabolic activity. In AF, the transition from second to third trimester was associated with decreasing levels of glucose, carnitine, amino acides (valine, leucine, isoleucine, alanine, methionine, tyrosine, and phenylalanine) and increasing levels of creatinine, succinate, pyruvate, choline, N,N-dimethylglycine, and urocanate. In plasma, the progression from second trimester to third trimester was releated to increasing levels of glycerol, choline and ketone bodies (3-hydroxybutyrate and acetoacetate), while pyruvate concentration was significantly decreased. Lactate to pyruvate ratio was decreased in AF and increased in plasma. The investigators concluded that these results are most likely related to the change in fetal growth dynamics, namely transition into a fast weight-gain phase, which requires considerably higher rates of anabolic processes. In contrast to plasma, the significant decrease in the levels of amino acids in AF is likely associated with fetal maturation and the increased demand for elementary building blocks necessary for protein synthesis.

Amniotic fluid and amniotic tissues contain numerous active biological molecules including proteins, lipids, carbohydrates, and electrolytes; some of which may function as enzymes, hormones, and growth factors. Growth factors are typically proteins that can have diverse biological effects but are characterized as trophic factors that can activate pro-growth cell signaling cascades. Several biologically relevant growth factors found in amniotic fluid include epidermal growth factor (EGF), transforming growth factor alpha (TGF-α), transforming growth factor beta (TGF-β), insulin-like growth factors (IGFs), and erythropoietin (EPO). Amniotic fluid also reduces scarring (Ozgenel G Y et al., J Neurosurg 2003; 98: 371-377), in part due to the presence of hyaluronic acid (Gao X et al., Ann Plastic Surg 1994; 33: 128-134).

Growth Factor Activity of Amniotic Fluid

One of the functions of amniotic cells is the release of growth factors and cytokines, which regulate different processes during development of the embryo (Grzywocz, Z. et al. Folia Histochemica et Cytobiologica (2014) 52 (3): 163-170). During fetal development, VEGF increases permeability of the human amnion. In vitro studies have shown that amnion-produced growth factors participate in angiogenesis, re-epithelialization, and immunomodulation. Some factors (e.g., macrophage colony-stimulating factor (M-CSF) stimulate cell differentiation and proliferation. Other factors, like IGF-2, may promote proliferation.

Growth factors produced by amnion cell fractions and by whole amnion tissue have been determined using an in vitro cytokine assay (Id.). The assay detected in supernatants epidermal and fibroblast growth factors (HB-EGF, EGF-2, EGF-R, bFGF, FGF-4, FGF-6, FGF-7), neural and glial growth factors (bNGF, GDNF, NT-3, NT-4), angiogenic growth factors (VEGF, VEGF-D, VEGF-R2, VEGF-R3, PLGF), hematopoietic growth factors (G-CSG, GM-CSF, M-CSF, M-CSF-R, SCF, SCF-R), insulin-like growth factors (IFG-1, IGF-2, IGF-ISR, IGFBP-1, IGFBP-2, IGFBP-3, IGFBP-4, IGFBP-6), platelet derived growth factors (PDGF-AA, PDGF-AB, PDGF-BB, PDGFRa, PDGFRb), transforming growth factors (TGF-a, TGF-b, TGF-b2, TGF-b3) and other proteins (HGF, AR) (Id.). The study focused on statistically significant changes over time in the level of growth factors and their receptors over time, measured at 3 hr, 6 hr, 24 hr, and 48 hr (Id.). Cell fractions were isolated as described by Soncini et al. (J. Tissue Eng. Regen. Med. (2007) 1: 296-305), with minor modifications. Whole human amniotic membranes comprised of equal amounts of hAMSCs and hAECs released EGF-R, IGF-2, IGFBP-2, IGFBP-2, and IGFBP6 into conditioned media. Amniotic cell fraction 1, which stained positively for mesenchymal cell markers CD73 (86%), CD90 (19.3%) and CD105 (2.2%), released only NT-4, the concentration of which increased statistically during the study period, suggesting that NT4 played a local role in the function of the amnion epithelium, possibly related to apoptosis (Id.). Amniotic cell fraction 2, which stained positively for epithelial cell markers, cytokeratins 4/5/6/8/10/13/18, and which contained mainly amnion epithelial cells, released hematopoietic growth factors including G-CSF, M-CSF, PDGF, and the angiogenesis regulator, PLGF into conditioned media (Id.).

Thus, amniotic tissue and amniotic fluid are a source of biological components that stimulate tissue repair and promote skin and connective tissue homeostasis. However, there is significant donor-to-donor variation in the molecular composition of amniotic tissue and fluid. In addition, it is unclear whether many important amniotic factors survive the various processes used in the recovery and storage of amniotic fluid. Therefore, the inherent variability in amniotic tissue as well as the different collection and storage conditions is a challenge for standardizing and reproducing the efficacy of these products in a variety of therapeutic applications.

Wound Healing

A wound results from damage or disruption to normal anatomical structure and function (Robson M C et al., Curr Probl Surg 2001, 38: 72-140; Velnar T et al., The Journal of International Medical Research 2009, 37: 1528-1542). This can range from a simple break in the epithelial integrity of the skin to deeper, subcutaneous tissue with damage to to other structures such as tendons, muscles, vessels, nerves, parenchymal organs and even bone (Alonso J E et al., Surg Clin North Am 1996, 76: 879-903). Irrespective of the cause and form, wounding damages and disrupts the local tissue environment.

Wound healing is a dynamic, interactive process involving soluble mediators, blood cells, extracellular matrix, and parenchymal cells. The wound repair process can be divided into four (4) temporally and spatially overlapping phases: (1) a coagulation phase, (2) an inflammatory phase, (3) a proliferative phase, and (4) a remodeling phase. Much of what is known is based on wound healing of human skin.

Coagulation Phase

Immediately after injury, platelets adhere to damaged blood vessels, initiate a release reaction, and begin a hemostatic reaction, giving rise to a blood-clotting cascade that prevents excessive bleeding and provides provisional protection for the wounded area. Blood platelets release well over a dozen growth factors, cytokines, and other survival or apoptosis-inducing agents (Weyrich A S and Zimmerman G A, Trends Immunol 2004 September, 25(9): 489-495). Key components of the platelet release reaction include platelet-derived growth factor (PDGF) and transforming growth factors A1 and 2 (TGF-A1 and TGF-2), which attract inflammatory cells, such as leukocytes, neutrophils, and macrophages (Singer A F and Clark R A, N Engl J Med 1999 Sep. 2, 341(10): 738-746).

Inflammatory Phase

Tissue injury causes the disruption of blood vessels and extravasation of blood constituents. The blood clot re-establishes hemostasis and provides a provisional extracellular matrix for cell migration. Platelets not only facilitate the formation of a hemostatic plug but also secrete several mediators of wound healing, such as platelet-derived growth factor, which attract and activate macrophages and fibroblasts (Heldin, C. and Westermark B., In: Clark R., ed. The molecular and cellular biology of wound repair, 2nd Ed. New York, Plenum Press, pp. 249-273, (1996)). It was suggested, however, that, in the absence of hemorrhage, platelets are not essential to wound healing; numerous vasoactive mediators and chemotactic factors are generated by the coagulation and activated-complement pathways and by injured or activated parenchymal cells that were shown to recruit inflammatory leukocytes to the site of injury (Id.).

Ingress of cells into a wound and activation of local cells are initiated by mediators that are either released de novo by resident cells or from reserves stored in the granules of platelets and basophils (Sephel, G. C. and Woodward, S. C., 3. Repair, Regeneration and Fibrosis," in Rubin's Pathology, Rubin, R. and Strayer, D. S. Eds; $5^{th}$ Ed., Wolters Kluwer Health, /Lippincott Williams & Wilkins, Philadelphia, PA (2008), at 71). Cell migration uses the response of cells to cytokines and insoluble substrates of the extracellular matrix (Id., at 72).

Infiltrating neutrophils cleanse the wounded area of foreign particles and bacteria and then are extruded with the eschar (a dead tissue that falls off (sheds) from healthy skin or is phagocytosed by macrophages). In response to specific chemoattractants, such as fragments of extracellular-matrix protein, transforming growth factor β (TGF-β), and monocyte chemoattractant protein-1 (MCP-1), monocytes also infiltrate the wound site and become activated macrophages that release growth factors (such as platelet-derived growth factor and vascular endothelial growth factor), which initiate the formation of granulation tissue. Macrophages bind to specific proteins of the extracellular matrix by their integrin receptors, an action that stimulates phagocytosis of microorganisms and fragments of extracellular matrix by the macrophages (Brown, E. Phagocytosis, Bioessays, 17:109-117 (1995)). Studies have reported that adherence to the extracellular matrix also stimulates monocytes to undergo metamorphosis into inflammatory or reparative macrophages. These macrophages play an important role in the transition between inflammation and repair (Riches, D., In Clark R., Ed. The molecular and cellular biology of wound repair, 2nd Ed. New York, Plenum Press, pp. 95-141). For example, adherence induces monocytes and macrophages to express Colony-Stimulating Factor-1 (CSF-1), a cytokine necessary for the survival of monocytes and macrophages; Tumor Necrosis Factor-α (TNF-α), a potent inflammatory cytokine; and Platelet-Derived Growth Factor (PDGF), a potent chemoattractant and mitogen for fibroblasts. Other cytokines shown to be expressed by monocytes and macrophages include Transforming Growth Factor (TGF-α), Interleukin-1 (IL-1), Transforming Growth Factor β (TGF-β), and Insulin-like Growth Factor-I (IGF-I) (Rappolee, D. et al., Science, 241, pp. 708-712 (1988)). The monocyte- and macrophage-derived growth factors have been suggested to be necessary for the initiation and propagation of new tissue formation in wounds, because macrophage depleted animals have defective wound repair (Leibovich, S, and Ross, R., Am J Pathol, 78, pp 1-100 (1975)).

Proliferative Phase

The inflammatory phase is followed by a proliferative phase, in which active angiogenesis creates new capillaries, allowing nutrient delivery to the wound site, notably to support fibroblast proliferation. Fibroblasts present in granulation tissue are activated and acquire a smooth muscle cell-like phenotype. Myofibroblastic differentiation of fibroblastic cells begins with the appearance of the protomyofibroblast, whose stress fibers contain only β- and γ-cytoplasmic actins. Protomyofibroblasts can evolve into differentiated myofibroblasts whose stress fibers contain α-smooth muscle actin.Myofibroblasts synthesize and deposit extracellular matrix (ECM) components that replace the provisional matrix. They also have contractile properties mediated by α-smooth muscle actin organized in microfilament bundles or stress fibers.

Neovascularization

The formation of new blood vessels (neovascularization) is necessary to sustain the newly formed granulation tissue. Angiogenesis is a complex process that relies on extracellular matrix in the wound bed as well as migration and mitogenic stimulation of endothelial cells (Madri, J. et al., Angiogenesis in Clark, R. Ed. The molecular and cellular biology of wound repair. 2nd Ed. New York, Plenum Press, pp. 355-371 (1996)). The induction of angiogenesis was initially attributed to acidic or basic Fibroblast Growth Factor. Subsequently, many other molecules have also been found to have angiogenic activity, including vascular endothelial growth factor (VEGF), Transforming Growth Factor-β (TGF-β), angiogenin, angiotropin, angiopoietin-1, and thrombospondin (Folkman, J. and D'Amore, P, Cell, 87, pp. 1153-1155 (1996)).

Low oxygen tension and elevated lactic acid were suggested also to stimulate angiogenesis. These molecules induce angiogenesis by stimulating the production of basic Fibroblast Growth Factor (FGF) and Vascular Endothelial Growth Factor (VEGF) by macrophages and endothelial cells. For example, it was reported that activated epidermal cells of the wound secrete large quantities of Vascular Endothelial cell Growth Factor (VEGF) (Brown, L. et al., J Exp Med, 176, 1375-1379 (1992)).

Basic fibroblast growth factor was hypothesized to set the stage for angiogenesis during the first three days of wound repair, whereas vascular endothelial-cell growth factor is critical for angiogenesis during the formation of granulation tissue on days 4 through 7 (Nissen, N. et al., Am J Pathol, 152, 1445-1552 (1998)).

In addition to angiogenesis factors, it was shown that appropriate extracellular matrix and endothelial receptors for the provisional matrix are necessary for angiogenesis. Proliferating microvascular endothelial cells adjacent to and within wounds transiently deposit increased amounts of fibronectin within the vessel wall (Clark, R. et al., J. Exp Med, 156, 646-651 (1982)). Since angiogenesis requires the expression of functional fibronectin receptors by endothelial cells (Brooks, P. et al., Science, 264, 569-571 (1994)), it was suggested that perivascular fibronectin acts as a conduit for the movement of endothelial cells into the wound. In addition, protease expression and activity were shown to also be necessary for angiogenesis (Pintucci, G. et al., Semin Thromb Hemost, 22, 517-524 (1996)).

The series of events leading to angiogenesis has been proposed as follows. Injury causes destruction of tissue and hypoxia. Angiogenesis factors, such as acidic and basic Fibroblast Growth Factor (FGF), are released immediately from macrophages after cell disruption, and the production of vascular endothelial-cell growth factor by epidermal cells is stimulated by hypoxia. Proteolytic enzymes released into the connective tissue degrade extracellular-matrix proteins. Fragments of these proteins recruit peripheral-blood monocytes to the site of injury, where they become activated macrophages and release angiogenesis factors. Certain macrophage angiogenesis factors, such as basic fibroblast growth factor (bFGF), stimulate endothelial cells to release plasminogen activator and procollagenase. Plasminogen activator converts plasminogen to plasmin and procollagenase to active collagenase, and in concert these two proteases digest basement membranes. The fragmentation of the basement membrane allows endothelial cells stimulated by angiogenesis factors to migrate and form new blood vessels at the injured site. Once the wound is filled with new granulation tissue, angiogenesis ceases and many of the new blood vessels disintegrate as a result of apoptosis (Ilan, N. et al., J Cell Sci, 111, 3621-3631 (1998)). This programmed cell death has been suggested to be regulated by a variety of matrix molecules, such as thrombospondins 1 and 2, and anti-angiogenesis factors, such as angiostatin, endostatin, and angiopoietin 2 (Folkman, J., Angiogenesis and angiogenesis inhibition: an overview, EXS, 79, 1-8, (1997)).

Remodeling Phase

The fourth healing phase involves gradual remodeling of the granulation tissue and reepithelialization. This remodeling process is mediated largely by proteolytic enzymes, especially matrix metalloproteinases (MMPs) and their inhibitors (TIMPs, tissue inhibitors of metalloproteinases). During the reepithelialization, Type III collagen, the main component of granulation tissue, is replaced gradually by type I collagen, the main structural component of the dermis. Elastin, which contributes to skin elasticity and is absent from granulation tissue, also reappears. Cell density normalizes through apoptosis of vascular cells and myofibroblasts (resolution).

Epithelialization

Reepithelialization of wounds begins within hours after injury. Epidermal cells from skin appendages, such as hair follicles, quickly remove clotted blood and damaged stroma from the wound space. At the same time, the cells undergo phenotypic alteration that includes retraction of intracellular tonofilaments (Paladini, R. et al., J. Cell Biol, 132, pp. 381-397 (1996)); dissolution of most inter-cellular desmosomes, which provide physical connections between the cells; and formation of peripheral cytoplasmic actin filaments, which allow cell movement and migration (Goliger, J. and Paul, D. Mol Biol Cell, 6, pp. 1491-1501 (1995); Gabbiani, G. et al., J Cell Biol, 76, PP. 561-568 (1978)). Furthermore, epidermal and dermal cells no longer adhere to one another, because of the dissolution of hemidesmosomal links between the epidermis and the basement membrane, which allows the lateral movement of epidermal cells. The expression of integrin receptors on epidermal cells allows them to interact with a variety of extracellular-matrix proteins (e.g., fibronectin and vitronectin) that are interspersed with stromal type I collagen at the margin of the wound and interwoven with the fibrin clot in the wound space (Clark, R., J Invest Dermatol, 94, Suppl, pp. 128S-134S (1990)). The migrating epidermal cells dissect the wound, separating desiccated eschar from viable tissue. The path of dissection appears to be determined by the array of integrins that the migrating epidermal cells express on their cell membranes.

The degradation of the extracellular matrix, which is required if the epidermal cells are to migrate between the collagenous dermis and the fibrin eschar, depends on the production of collagenase by epidermal cells (Pilcher, B. et al., J Cell Biol, 137, pp. 1445-1457 (1997)), as well as the activation of plasmin by plasminogen activator produced by the epidermal cells (Bugge, T. et al., Cell, 87: 709-719 (1996)). Plasminogen activator also activates collagenase (matrix metalloproteinase-1) (Mignatti, P. et al., Proteinases and Tissue Remodeling. In Clark, R. Ed. The molecular and cellular biology of wound repair. 2nd Ed. New York, Plenum Press, 427-474 (1996)) and facilitates the degradation of collagen and extracellular-matrix proteins.

One to two days after injury, epidermal cells at the wound margin begin to proliferate behind the actively migrating cells. The stimuli for the migration and proliferation of epidermal cells during reepithelialization have not been determined, but several possibilities have been suggested. The absence of neighbor cells at the margin of the wound (the "free edge" effect) may signal both migration and proliferation of epidermal cells. Local release of growth factors and increased expression of growth-factor receptors may also stimulate these processes. Leading contenders include Epidermal Growth Factor (EGF), Transforming Growth Factor-α (TGF-α), and Keratinocyte Growth Factor (KGF) (Nanney, L. and King, L. Epidermal Growth Factor and Transforming Growth Factor-a. In Clark, R. Ed. The molecular and cellular biology of wound repair. 2nd Ed. New York, Plenum Press, pp. 171-194 (1996); Werner, S. et al., Science, 266, pp. 819-822 (1994); Abraham, J. and Klagsburn, M. Modulation of Wound Repair by Members of the Fiborblast Growth Factor family. In Clark, R. Ed. The molecular and cellular biology of wound repair. 2nd Ed. New York, Plenum Press, pp. 195-248 (1996)). As re-epithelialization ensues, basement-membrane proteins reappear in a very ordered sequence from the margin of the wound inward, in a zipper-like fashion (Clark R. et al., J. Invest Dermatol, 79, pp. 264-269 (1982)). Epidermal cells revert to their normal phenotype, once again firmly attaching to the reestablished basement membrane and underlying dermis.

Formation of Granulation Tissue

New stroma, often called granulation tissue, begins to invade the wound space approximately four days after injury. Numerous new capillaries endow the new stroma with its granular appearance. Macrophages, fibroblasts, and blood vessels move into the wound space at the same time (Hunt, T. ed. Wound Healing and Wound Infection: Theory and Surgical Practice. New York, Appleton-Century-Crofts (1980)). The macrophages provide a continuing source of growth factors necessary to stimulate fibroplasia and angiogenesis; the fibroblasts produce the new extracellular matrix necessary to support cell ingrowth; and blood vessels carry oxygen and nutrients necessary to sustain cell metabolism.

Growth factors, especially Platelet-Derived Growth Factor-4 (PDGF-4) and Transforming Growth Factor β-1 (TGF-β1) (Roberts, A. and Sporn, M, Transforming Growth Factor-1, In Clark, R. ed. The molecular and cellular biology of wound repair. 2nd Ed. New York, Plenum Press, pp. 275-308 (1996)) in concert with the extracellular-matrix molecules (Gray, A. et al., J Cell Sci, 104, pp. 409-413 (1993); Xu, J. and Clark, R., J Cell Biol, 132, pp. 239-149 (1996)), were shown to stimulate fibroblasts of the tissue around the wound to proliferate, express appropriate integrin receptors, and migrate into the wound space. It was reported that platelet-derived growth factor accelerates the healing of chronic pressure sores (Robson, M. et al., Lancet, 339, pp. 23-25 (1992) and diabetic ulcers (Steed, D., J Vasc Surg, 21, pp. 71-78 (1995)). In some other cases, basic Fibroblast Growth Factor (bFGF) was effective for treating chronic pressure sores (Robson, M. et al., Ann Surg, 216, pp. 401-406 (1992).

The structural molecules of newly formed extracellular matrix, termed the provisional matrix (Clark, R. et al., J. Invest Dermatol, 79, pp. 264-269, 1982), contribute to the formation of granulation tissue by providing a scaffold or conduit for cell migration. These molecules include fibrin, fibronectin, and hyaluronic acid (Greiling, D. and Clark R., J. Cell Sci, 110, pp. 861-870 (1997)). The appearance of fibronectin and the appropriate integrin receptors that bind fibronectin, fibrin, or both on fibroblasts was suggested to be the rate-limiting step in the formation of granulation tissue. While the fibroblasts are responsible for the synthesis, deposition, and remodeling of the extracellular matrix, the extracellular matrix itself can have a positive or negative effect on the ability of fibroblasts to perform these tasks, and to generally interact with their environment (Xu, J. and Clark, R., J Cell Sci, 132, pp. 239-249 (1996); Clark, R. et al., J Cell Sci, 108, pp. 1251-1261).

Cell movement into a blood clot of cross-linked fibrin or into tightly woven extracellular matrix requires an active proteolytic system that can cleave a path for cell migration. A variety of fibroblast-derived enzymes, in addition to serum-derived plasmin, are suggested to be potential candidates for this task, including plasminogen activator, collagenases, gelatinase A, and stromelysin (Mignatti, P. et al., Proteinases and Tissue Remodeling. In Clark, R. Ed. The molecular and cellular biology of wound repair. 2nd Ed. New York, Plenum Press, 427-474 (1996); Vaalamo, M. et al., J Invest Dermatol, 109, pp. 96-101 (1997)). After migrating into wounds, fibroblasts commence the synthesis of extracellular matrix. The provisional extracellular matrix is replaced gradually with a collagenous matrix, perhaps in response to Transforming Growth Factor-β1 (TGF-β1) signaling (Clark, R. et al., J Cell Sci, 108, pp. 1251-1261 (1995); Welch, M. et al., J. Cell Biol, 110, pp. 133-145 (1990))

Once an abundant collagen matrix has been deposited in the wound, the fibroblasts stop producing collagen, and the fibroblast-rich granulation tissue is replaced by a relatively acellular scar. Cells in the wound undergo apoptosis triggered by unknown signals. It was reported that dysregulation of these processes occurs in fibrotic disorders, such as keloid formation, hypertrophic scars, morphea, and scleroderma.

Wound Contraction and Extracellular Matrix Reorganization

Wound contraction involves a complex and orchestrated interaction of cells, extracellular matrix, and cytokines During the second week of healing, fibroblasts assume a myofibroblast phenotype characterized by large bundles of actin-containing microfilaments disposed along the cytoplasmic face of the plasma membrane of the cells and by cell-cell and cell-matrix linkages (Welch, M. et al., J Cell Biol, 110, 133-145 (1990); Desmouliere, A. and Gabbiani, G. The role of the myofibroblast in wound healing and fibrocontractive diseases. In Clark, R. Ed. The molecular and cellular biology of wound repair. 2nd Ed. New York, Plenum Press, pp. 391-423 (1996)). The appearance of the myofibroblasts corresponds to the commencement of connective-tissue compaction and the contraction of the wound. This contraction was suggested to require stimulation by Transforming Growth Factor (TGF)-β1 or β2 and Platelet-Derived Growth Factor (PDGF), attachment of fibroblasts to the collagen matrix through integrin receptors, and cross-links between individual bundles of collagen. (Montesano, R. and Orci, Proc Natl Acad Sci USA, 85, 4894-4897 (1988); Clark, R.

et al., J Clin Invest, 84, 1036-1040 (1989); Schiro, J. et al., Cell, 67, 403-410 (1991); Woodley, D. et al., J Invest Dermatol, 97, 580-585 (1991)).

Collagen remodeling during the transition from granulation tissue to scar is dependent on continued synthesis and catabolism of collagen at a low rate. The degradation of collagen in the wound is controlled by several proteolytic enzymes, termed matrix metalloproteinases (MMP), which are secreted by macrophages, epidermal cells, and endothelial cells, as well as fibroblasts (Mignatti, P. et al., Proteinases and Tissue Remodeling. In Clark, R. Ed. The molecular and cellular biology of wound repair. 2nd Ed. New York, Plenum Press, 427-474 (1996)). Various phases of wound repair have been suggested to rely on distinct combinations of matrix metalloproteinases and tissue inhibitors of metalloproteinases (Madlener, M. et al, Exp Cell Res, 242, 201-210 (1998)).

Wounds gain only about 20 percent of their final strength in the first three weeks, during which fibrillar collagen has accumulated relatively rapidly and has been remodeled by contraction of the wound. Thereafter, the rate at which wounds gain tensile strength is slow, reflecting a much slower rate of accumulation of collagen and collagen remodeling with the formation of larger collagen bundles and an increase in the number of intermolecular cross-links.

Signaling Pathways Involved in Wound Healing

Wound healing is a complex process of cell proliferation, migration, matrix synthesis and contraction, and involves various types of cells and regulatory mechanisms. Resident cells (keratinocytes, fibroblasts and endothelial cells) and inflammatory cells participate in wound healing (Song, Q, et al. Int J Mol Med. 2017 August; 40(2): 465-473, citing Chen X H, et al. Int J Radiat Biol. 2009; 85: 607-613; Amadeu T P, et al. J Surg Res. 2008; 149: 84-9). Evidence has revealed that several signaling pathways are associated with wound healing via triggering their target gene expression, such as the Janus-activated kinase/signal transducer and activator of transcription 3 (JAK/STAT3) signaling (Id., citing Li P N, et al. Wound Repair Regen. 2015; 23: 65-73; Pakyari M, et al. Adv Wound Care (New Rochelle) 2013; 2: 215-224; Ren X, et al. Lasers Med Sci. 2016; 31: 673-678; Shi Y, et al. Stem Cell Res Ther. 2015; 6: 120). In wound healing, cytokines contribute to activate STATs and the activated JAKIISTAT3 pathway controls the proliferation and differentiation necessary for wound healing (Id., citing Tokumaru S, et al. Biochem Biophys Res Commun. 2005; 327: 100-105; Yasukawa H, et al. Nat Immunol. 2003; 4: 551-556). Furthermore, through activation of JAK/STAT3 signaling cascades, the cytokine induces anti-apoptotic pathways and anti-microbial molecules to help prevent tissue damage and aid in their repair (Id., citing Lejeune D, et al. J Biol Chem. 2002; 277: 33676-33682; Wolk K, et al. Semin Immunopathol. 2010; 32: 17-31; Yu R, et al. Arch Oral Biol. 2016; 72: 14-20). In addition, a study demonstrated a critical role for STAT3 in the migration but not proliferation of keratinocytes in wound healing (Id., citing Sano S, et al. EMBO J. 1999; 18: 4657-4668). The pivotal roles of Smad3 signaling in cutaneous wound healing have been well documented (Id., citing Li P N, et al. Wound Repair Regen. 2015; 23: 65-73; Pakyari M, et al. Adv Wound Care (New Rochelle) 2013; 2: 215-224). Smad3 binds with a Smad mediator (SMAD4) to form a complex, moving into the nucleus and regulates the expression of genes including those involved in keratinocyte migration, fibroblast infiltration and extracellular matrix construction (Id., citing Penn J W, et al. Int J Burns Trauma. 2012; 2: 18-28; Hong H J, et al. Biomaterials. 2008; 29: 4831-4837). Additionally, Smad3 could balance the reepithelialization and fibrogenesis of the repaired tissues (Id., citing Biernacka A, et al. Growth Factors. 2011; 29: 196-202; Werner S, et al. J Invest Dermatol. 2007; 127: 998-1008).

Clinical Wound Healing

One of the most important functions of the skin is to be a barrier against the environment (Bakhtyar N, et al., Stem Cell Res Ther. 2018 Jul. 13, 9(1): 193, citing Bielefeld K A, et al. CMLS. 2013, 70: 2059-81). Insults such as burns, chronic skin ulcers as a result of pressure, venous stasis, or diabetes mellitus represent some of the conditions in which the tissue integrity is disrupted and a wound is created (Id., citing Bielefeld K A, et al. CMLS. 2013, 70: 2059-81; Singer A J, Clark R A F. N Engl J Med. 1999, 341: 738-46). According to the World Health Organization (WHO), burns are a global problem which account for approximately 180,000 deaths per year and, in 2004, nearly 11 million people around the world were burned severely enough to require medical care (Id., citing W.H.O. (WHO), in, http://www.who.int/en/news-room/fact-sheets/detail/burns, 2018). The high mortality in burn patients results from the loss of skin which increases metabolic demand, fluid loss, and enhances the risk of infection. Therefore, wound closure is imperative (Id., citing Sadiq A, et al. Int J Mol Sci. 2018, 19). Furthermore, approximately 1.5 billion people suffer from inadequate wound healing due to a combination of progressive aging and the lack of adequate healthcare (Id., citing Sadiq A, et al. Int J Mol Sci. 2018, 19; Jeschke M G, et al. EBioMedicine. 2015, 2: 1536-48; Jeschke M G, et al. Burns: journal of the International Society for Burn Injuries. 2016, 42: 276-81; Valacchi G, et al. Ann N Y Acad Sci. 2012, 1259: 136-44). Diabetes, for example, is another prevalent condition that can lead to severe wounds. Diabetes can result in diabetic ulcers due to prolonged inflammation, a lack of neovascularization, reduced collagen production, high levels of proteinases and synthesis of collagen, and malfunctioning macrophages (Id., citing Fahey T J 3rd, et al. J Surg Res. 1991, 50: 308-13; Singer A J, Clark R A. N Engl J Med. 1999, 341: 738-46; Shah A, et al. Inflamm Res. 2017 November, 66(11): 931-945; Shah A, Amini-Nik S. International Journal of Drug Research and Technology. 2017; 7:8).

If the wound healing steps do not occur in a coordinated and timely manner, abnormal wound healing can result, and an open wound can lead to infection and inadequate thermal and fluid management. In some pathological disorders, the normal wound healing process is disturbed and prolonged, which can lead to chronic non-healing wounds such as diabetic ulcers or pathological scarring such as keloid scars (Hu Y, et al. Theranostics. 2018 Jan. 1; 8(1): 169-184, citing Falanga V. Lancet. 2005; 366: 1736-43; Plikus M V, et al. Science. 2017; 355: 748-52). Thus, shortening healing time and inhibiting scar formation after skin/soft tissue trauma represent urgent clinical needs. Although various therapeutic attempts have been made to promote wound healing, optimal treatment strategies are still being developed.

Over the past few years, stem cells have emerged as powerful tools to improve skin wound healing. Sources of stem cells such as human umbilical cord and umbilical cord blood (UCB), amniotic cells, and Wharton's jelly (a mucous connective tissue in umbilical cord) have shown promising results in wound healing (Hu Y, et al. Theranostics. 2018 Jan. 1; 8(1): 169-184; Bakhtyar N, et al., Stem Cell Res Ther. 2018 Jul. 13, 9(1): 193; Zhao B, et al. Stem Cells Int. 2018 Jul. 25; 2018: 5420463).

Mesenchymal Stem Cells (MSCs)

Mesenchymal stem cells (MSCs) (also known as stromal stem cells) are non-blood adult stem cells found in a variety of tissues. They are characterized by their spindle-shape morphologically, by the expression of specific markers on their cell surface, and by their ability, under appropriate conditions, to differentiate along a minimum of three lineages (osteogenic, chondrogenic, and adipogenic).

No single marker that definitely delineates MSCs in vivo has been identified due to a lack of consensus regarding the MSC phenotype, but it generally is considered that MSCs are positive for cell surface markers CD105, CD166, CD90, and CD44, and that MSCs are negative for typical hematopoietic antigens, such as CD45, CD34, and CD14. As for the differentiation potential of MSCs, studies have reported that populations of bone marrow-derived MSCs have the capacity to develop into terminally differentiated mesenchymal phenotypes both in vitro and in vivo, including bone, cartilage, tendon, muscle, adipose tissue, and hematopoietic-supporting stroma. Studies using transgenic and knockout mice and human musculoskeletal disorders have reported that MSC differentiate into multiple lineages during embryonic development and adult homeostasis.

Analyses of the in vitro differentiation of MSCs under appropriate conditions that recapitulate the in vivo process have led to the identification of various factors essential for stem cell commitment. Among them, secreted molecules and their receptors (e.g., transforming growth factor-β), extracellular matrix molecules (e.g., collagens and proteoglycans), the actin cytoskeleton, and intracellular transcription factors (e.g., Cbfa1/Runx2, PPARγ, Sox9, and MEF2) have been shown to play important roles in driving the commitment of multipotent MSCs into specific lineages, and maintaining their differentiated phenotypes.

MSCs are known to undergo phenotypic rearrangements during ex vivo manipulations, losing expression of some markers while also acquiring new ones (Augello, A. et al, "Mesenchymal stem cells: a perspective from in vitro cultures to in vivo migration and niches." Eur. Cells and Materials (2010) (20):121-33, citing Jones, et al. 2002 Arthritis Rheum. 46: 3349-60).

Role of MSCs in Wound Healing

MSCs are thought to orchestrate wound repair by: (1) structural repair via cellular differentiation; (2) immune-modulation; (3) secretion of growth factors that drive neovascularization and re-epithelialization; and (4) mobilization of resident stem cells. (Balaji, S. et al, "The role of mesenchymal stem cells in the regenerative wound healing phenotype," Adv. Wound Care (2012) 1(40): 159-65).

MSC Migration in Vivo

Results indicate that MSCs play several simultaneous roles: limiting inflammation through releasing cytokines; aiding healing by expressing growth factors; altering host immune responses by secreting immuno-modulatory proteins; enhancing responses from endogenous repair cells; and serving as mature functional cells in some tissues such as bone (Phinney, D G and Pittenger, M F. MSC-derived exosomes for cell free therapy. Stem Cells (2017) 35: 851-58). When labeled and delivered in vivo, MSCs will migrate to sites of tissue injury (Id.). CD44-HA interaction is involved in MSC migratory activities (Zhu, H. et al, "The role of the hyaluronan receptor CD44 in mesenchymal stem cell migration in the extracellular matrix," Stem Cells (2006) 24: 928-35).

Several reports indicate that the SDF-1/CXCR4 axis is present and functional in MSC populations (Augello, A. et al, "Mesenchymal stem cells: a perspective from in vitro cultures to in vivo migration and niches." Eur. Cells and Materials (2010) (20): 121-33, citing Wynn et al. 2004 Blood 104: 2643-45; Dar et al. 2005 Nat. Immunol. 6: 1038-46). MSCs also can respond to chemotactic signaling molecules acting on pathways other than the SDF-1/CXCR-4 axis, including monocyte chemotactic protein-3 (MCP-3) (Id.).

MSCs have been proposed to possess the capacity to secrete a broad range of bioactive molecules, such as growth factors, cytokines, and chemokines (Id., citing Monsel, A. et al, "Mesenchymal stem cell derived secretome and extracellular vesicles for acute lung injury and other inflammatory lung diseases," Expert Opin. Biol. Ther. (2016) 16: 859-71; Caplan, A. and Correa, D., "The MSC: an injury drugstore," Cell Stem Cell (2011) 9: 11-15; Kosuma, G D, et al, "Effect of the microenvironment on mesenchymal stem cells paracrine signaling: opportunities to engineer the therapeutic effect," Stem Cells Dev. (2017) 26: 617-31). These bioactive molecules regulate local immune response to establish a regenerative microenvironment and subsequently inhibit inflammation and repair the injured tissues (Id.).

Therapeutic Effects of MSCs Mediated by Stem Cell Secretion

A 'paracrine hypothesis' that the observed therapeutic effects of MSCs are partly mediated by stem cell secretion has gained much attention and is supported by experimental data (Arlan, F. et al, "Mesenchymal stem cell-derived exosomes increase ATP levels, decrease oxidative stress, and activate PI3K/Akt pathway to enhance myocardial viability and prevent adverse remodeling after myocardial ischemia/reperfusion injury," Stem Cell Res. (2013) 10: 301-12, citing Gnecchi et al., "Paracrine mechanisms in adult stem cell signaling and therapy," Circ. Res. (2008), 103: 1204-1219). It has been shown that MSC-CM enhanced cardiomyocyte and/or progenitor survival after hypoxia-induced injury (Id., citing Chimenti et al., "Relative roles of direct regeneration versus paracrine effects of human cardiosphere-derived cells transplanted into infarcted mice," Circ. Res. (2010), 106: 971-980; Deuse et al., 2009; Gnecchi et al., "Paracrine mechanisms in adult stem cell signaling and therapy," Circ. Res. (2008), 103: 1204-1219; Matsuura et al., "Transplantation of cardiac progenitor cells ameliorates cardiac dysfunction after myocardial infarction in mice," J. Clin. Invest., 119 (2009), pp. 2204-2217; Rogers et al., 2011). Furthermore, MSC-CM induces angiogenesis in infarcted myocardium (Id., citing Chimenti et al., "Relative roles of direct regeneration versus paracrine effects of human cardiosphere-derived cells transplanted into infarcted mice," Circ. Res., 106 (2010), pp. 971-980; Deuse et al., "Hepatocyte growth factor or vascular endothelial growth factor gene transfer maximizes mesenchymal stem cell-based myocardial salvage after acute myocardial infarction," Circulation, 120 (2009), pp. S247-S254; Li et al., "Paracrine factors released by GATA-4 overexpressed mesenchymal stem cells increase angiogenesis and cell survival," Am. J. Physiol. Heart Circ. Physiol., 299 (2010), pp. H1772-H1781). In both murine and porcine models of myocardial ischemia/reperfusion (I/R) injury it has been shown that MSC-CM reduces infarct size (Id., citing Timmers et al., "Reduction of myocardial infarct size by human mesenchymal stem cell conditioned medium," Stem Cell Res., 1 (2007), pp. 129-137).

High performance liquid chromatography (HPLC) and dynamic light scatter (DLS) analyses revealed that MSCs secrete cardioprotective microparticles with a hydrodynamic radius ranging from 50 to 65 nm (Id., citing Chen et al., 2011; Lai et al., "Derivation and characterization of human fetal MSCs: an alternative cell source for large-scale production of cardioprotective microparticles," J. Mol. Cell. Cardiol., 48 (2010), pp. 1215-1224). The therapeutic efficacy of MSC-derived extracellular vesicles (EVs) was independent of the tissue source of the MSCs. For example, exosomes from human embryonic stem cell-derived MSCs were similar to those derived from other fetal tissue sources (e.g. limb, kidney). This suggested that secretion of therapeutic EVs may be a general property of all MSCs (Id., citing Lai et al., "Exosome secreted by MSC reduces myocardial ischemia/reperfusion injury," Stem Cell Res., 4 (2010), pp. 214-222).

MSC-Derived EVs Comprising Exosomes and Microvesicles

During wound healing, cell to cell communication is crucial (Bakhtyar N, et al., Stem Cell Res Ther. 2018 Jul. 13, 9(1): 193, citing Amini-Nik S, et al. J Clin Invest. 2014; 124: 2599-610; Raposo G, Stoorvogel W. J Cell Biol. 2013; 200: 373-83). Multicellular organisms rely heavily on intercellular communication, which can be accomplished through both direct cell-cell contact and transfer of secreted molecules (Id., citing Raposo G, Stoorvogel W. J Cell Biol. 2013; 200: 373-83; Venkat P, et al. Stem Cells Transl Med. 2018 June; 7(6): 451-455).

MSC-derived EVs, which include exosomes and microvesicles (MV), are involved in cell-to-cell communication, cell signaling, and altering cell or tissue metabolism at short or long distances in the body, and can influence tissue responses to injury, infection, and disease (Phinney, D G and Pittenger, M F, "MSC-derived exosomes for cell free therapy," Stem Cells (2017) 35: 851-58). Their content includes cytokines and growth factors, signaling lipids, mRNAs, and regulatory miRNAs (Id.). The content of MSC EVs is not static; they are a product of the MSC tissue origin, its activities, and the immediate intercellular neighbors of the MSCs (Id.).

MSCs secrete a plethora of biologically active proteins. (Id., citing Tremain N, et al. MicroSAGE analysis of 2,353 expressed genes in a single cell-derived colony of undifferentiated human mesenchymal stem cells reveals mRNAs of multiple cell lineages. Stem Cells 2001; 19: 408-418; Phinney D G, et al. "Biological activities encoded by the murine mesenchymal stem cell transcriptome provide a basis for their developmental potential and broad therapeutic efficacy," Stem Cells 2006; 24: 186-198; Ren J, et al. "Global transcriptome analysis of human bone marrow stromal cells (BMSC) reveals proliferative, mobile and interactive cells that produce abundant extracellular matrix proteins, some of which may affect BMSC potency," Cytotherapy 2011; 13: 661-674).

Most cells produce EVs as a consequence of intracellular vesicle sorting, including both microvesicles of >200 nm, and exosomes of 50-200 nm diameter. The microvesicles are shed from the plasma membrane, whereas exosomes originate from early endosomes and, as they mature into late endosomes/multivesicular bodies, acquire increasing numbers of intraluminal vesicles, which are released as exosomes upon fusion of the endosome with the cell surface (Id., citing Lee Y, El Andaloussi S, Wood M J. "Exosomes and microvesicles: Extracellular vesicles for genetic information transfer and gene therapy," Hum Mol Genet 2012; 21: R15-134; Tkach M, Thery C. "Communication by extracellular vesicles: Where we are and where we need to go," Cell 2016; 164: 1226-1232).

Although MSC-derived EVs recapitulate to a large extent the immensely broad therapeutic effects previously attributed to MSCs, most studies fall short of rigorously validating this hypothesis (Id.). For example, various groups have compared the potency of MSCs versus MSC-derived EVs, and in some cases MSC-conditioned media, in animal models of myocardial infarction (Id., citing Bian S, et al. "Extracellular vesicles derived from human bone marrow mesenchymal stem cells promote angiogenesis in a rat myocardial infarction model," J Mol Med (Berlin) 2014; 92:387-397), focal cerebral ischemia (Doeppner T R, et al. "Extracellular vesicles improve post-stroke neuroregeneration and prevent postischemic immunosuppression." Stem Cells Transl Med 2015; 4: 1131-1143), gentamicin-induced kidney injury (Reis L A, et al. "Bone marrow-derived mesenchymal stem cells repaired but did not prevent gentamicin-induced acute kidney injury through paracrine effects in rats," PLoS One 2012; 7: e44092), and silicosis (Choi M, et al. "Therapeutic use of stem cell transplantation for cell replacement or cytoprotective effect of microvesicle released from mesenchymal stem cell," Mol Cells 2014; 37: 133-1394). While most studies report that MSC-derived EVs are equally effective as MSCs in sparing tissue and/or promoting functional recovery from injury, this desired outcome is compromised by lack of appropriate controls, comparable dosing, evaluation of the different disease endpoints, variations in frequency and timing of dosage, and absence of dose-dependent effects, thereby making it difficult to draw reliable conclusions about comparable efficacy and potency (Id.).

Amniotic EVs

Umbilical Cord Blood EVs

Human umbilical cord blood (UCB) is an attractive source of transplantable stem cells for wound repair, and posesses several distinct advantages of no risk to donors, easy accessibility, and a low incidence of graft-versus-host disease (Hu Y, et al. Exosomes from human umbilical cord blood accelerate cutaneous wound healing through miR-21-3p-mediated promotion of angiogenesis and fibroblast function. Theranostics. 2018 Jan. 1; 8(1): 169-184, citing Doi H, et al. Potency of umbilical cord blood- and Wharton's jelly-derived mesenchymal stem cells for scarless wound healing. Sci Rep. 2016; 6: 18844; He B, et al. Therapeutic potential of umbilical cord blood cells for type 1 diabetes mellitus. J Diabetes. 2015; 7: 762-73). Studies have reported that the local injection of exosomes secreted by human UCB-derived stem cells can promote skin cell proliferation and migration, angiogenesis, and wound closure in diabetic or burn wound animal models (Id., citing Zhang J, et al. Exosomes Derived from Human Endothelial Progenitor Cells Accelerate Cutaneous Wound Healing by Promoting Angiogenesis Through Erk1/2 Signaling. Int J Biol Sci. 2016; 12: 1472-87; Zhang B, et al. HucMSC-Exosome Mediated-Wnt4 Signaling Is Required for Cutaneous Wound Healing. Stem cells. 2015; 33: 2158-68). Local injection of UCB exosomes into skin wounds in mice resulted in accelerated re-epithelialization, reduced scar widths, and enhanced new blood vessel formation (Id.). UCB exosomes also promoted the proliferation and migration of fibroblasts, and enhanced the angiogenic activities of endothelial cells in vitro (Id.).

Wharton's Jelly EVs

The umbilical cord contains two arteries and one vein which are enveloped by a mucous connective tissue called Wharton's jelly (WJ) (Bakhtyar N, et al. Exosomes from acellular Wharton's jelly of the human umbilical cord promotes skin wound healing. Stem Cell Res Ther. 2018; 9: 193, citing Meyer F A, et al. Evidence for a mechanical coupling of glycoprotein microfibrils with collagen fibrils in Wharton's jelly. Biochim Biophys Acta. 1983; 755: 376-

387). In the Wharton's jelly, the glycosaminoglycan hyaluronic acid is highly prevalent and forms a gel around fibroblasts and collagen fibrils which protects the tissue from pressure and maintains tissue architecture (Id., citing Sakamoto T, et al. Electron microscopic histochemical studies on the localization of hyaluronic acid in Wharton's jelly of the human umbilical cord. Nihon Sanka Fujinka Gakkai zasshi. 1996; 48: 501-507; Sobolewski K, et al. Collagen and glycosaminoglycans of Wharton's jelly. Biol Neonate. 1997; 71: 11-21). Many laboratories have identified MSC markers on cells from Wharton's jelly and studied their properties as both embryonic and adult stem cells (Id., citing McElreavey K D, et al. Isolation, culture and characterisation of fibroblast-like cells derived from the Wharton's jelly portion of human umbilical cord. Biochem Soc Trans. 1991; 19, 29s; Pirjali T, et al. Isolation and characterization of human mesenchymal stem cells derived from human umbilical cord Wharton's jelly and amniotic membrane. Int J Organ Transplant Med. 2013; 4: 111-116; H. S. Wang, et al Chen, Mesenchymal stem cells in the Wharton's jelly of the human umbilical cord, Stem Cells, 22 (2004) 1330-1337). WJ-MSC conditioned medium with its secretory factors has also been reported to have positive effects on wound healing in vitro (Id., citing Arno A I, et al. Human Wharton's jelly mesenchymal stem cells promote skin wound healing through paracrine signaling. Stem Cell Res Ther. 2014; 5: 28). Acellular gelatinous Wharton's jelly (AGWJ) has beneficial wound healing properties in vivo in a murine model by allowing for wound healing at an earlier time point concomitant with a significant reduction in wound length after AGWJ treatment. AGWJ also increased cell migration in vitro, and led to the expression of alpha-smooth muscle actin (αSMA), a marker of myofibroblasts (Id., citing Bakhtyar N, et al. Acellular gelatinous material of human umbilical cord enhances wound healing: a candidate remedy for deficient wound healing. Front Physiol. 2017; 8: 200). Exosomes isolated from AGWJ enhanced cell viability and cell migration in vitro and enhanced skin wound healing in the punch biopsy wound model in mice. These exosomes contained a large amount of alpha-2-macroglobulin (α2M) (Id.).

Amniotic Epithelium EVs

Human amniotic epithelial cells (hAECs) are multipotent progenitor cells derived from epiblast (Zhao et al. Exosomes derived from human amniotic epithelial cells accelerate wound healing and inhibit scar formation. J Mol Histol. 2017 April; 48(2): 121-132). hAECs have been confirmed to play an effective role in promoting wound healing with fewer scars (Id., citing Zhang B et al. (2015a) HucMSC-exosome mediated-Wnt4 signaling is required for cutaneous wound healing. Stem Cells 33: 2158-2168; Zhang J et al. (2015b) Exosomes released from human induced pluripotent stem cells-derived MSCs facilitate cutaneous wound healing by promoting collagen synthesis and angiogenesis. J Transl Med 13: 49). In vitro studies demonstrated that hAEC exosomes had a smooth, spherical shape structure and were positive for exosomal markers of CD9, CD63, CD81, Alix, TSG101 and HLA-G (Id.). Internalization of fluorescently labeled hAECs exosomes by human fibroblasts enhanced the ability of proliferation and migration in a dose-dependent fashion (Id.). Moreover, extracellular matrix (ECM) deposition, especially collagen-I and III, were down-regulated by treatment with high concentrations of hAECs exosomes, through stimulating the expression of MMP-1. In vivo wound assays also showed that local injection of hAECs exosomes into rat skin wounds facilitated the wound healing process with well-arranged collagen fibers.

Not all MSC-derived EVs are equivalent. For example, it has been reported that exosomes isolated from adipose-derived MSCs contain up to fourfold higher levels of enzymatically active neprilysin, as compared to bone marrow-derived MSCs. (Id., citing Katsuda T, et al. "Human adipose tissue-derived mesenchymal stem cells secrete functional neprilysin-bound exosomes," Sci Rep (2013) 3: 1197). EVs from marrow and umbilical cord-derived MSCs were shown to inhibit the growth and to induce apoptosis of U87MG glioblastoma cells in vitro whereas those from adipose-derived MSCs promoted cell growth but had no effect on U87MG survival. (Id., citing Del Fattore, A. et al, "Differential effects of extracellular vesicles secreted by mesenchymal stem cells from different sources on glioblastoma cells," Expert Opin. Biol. Ther. (2015) 15: 495-504). Moreover, it has been shown that exosomes prepared from different tissue-specific MSCs have measurably different effects on neurite outgrowth in primary cortical neurons and dorsal root ganglia explant cultures. (Id., citing Lopez-Verrilli et al. "Mesenchymal stem cell-derived exosomes from different sources selectively promote neuritic outgrowth," Neuroscience 2016; 320: 129-139).

Amniotic Fluid EVs

Human amniotic fluid-derived stem cells (hAFS) are broadly characterized as multipotent mesenchymal progenitors expressing pluripotency markers and high self-renewal potential similar to embryonic stem cells, without being tumorigenic or causing any ethical concern (Balbi C, et al. First Characterization of Human Amniotic Fluid Stem Cell Extracellular Vesicles as a Powerful Paracrine Tool Endowed with Regenerative Potential. Stem Cells Transl Med. 2017 May; 6(5): 1340-1355, citing De Coppi P, et al. Isolation of amniotic stem cell lines with potential for therapy. Nat Biotechnol 2007; 25: 100-106). Because of their fetal, but non-embryonic origin, hAFS overcome many ethical concerns and can be easily obtained upon the expression of the stem marker c-KIT from leftover or discarded amniotic fluid samples collected during either amniocentesis or eligible cesarean delivery (Id., citing De Coppi P, et al. Isolation of amniotic stem cell lines with potential for therapy. Nat Biotechnol 2007; 25: 100-106; Pozzobon M, et al. Isolation of c-Kit$^+$ human amniotic fluid stem cells from second trimester. Methods Mol Biol 2013; 1035: 191-198; Schiavo A A, et al. Endothelial properties of third-trimester amniotic fluid stem cells cultured in hypoxia. Stem Cell Res Ther 2015; 6: 209). c-KIT$^+$ hAFS have been shown to exert cardioprotective paracrine effects reducing the infarct size in a rat acute model of myocardial infarction (MI) (Id., citing Bollini S, et al. Amniotic fluid stem cells are cardioprotective following acute myocardial infarction. Stem Cells Dev 2011; 20: 1985-1994). hAFS actively secrete EVs ranging in size from 50 to 1,000 nm (Id.). These include nanosized exosomal particles identified by the expression of TSG101, ALIX, CD81, CD9, AnnV, and CD63, along with cell specific markers such as CD105 (Id., citing Lötvall J, et al. Minimal experimental requirements for definition of extracellular vesicles and their functions: A position statement from the International Society for Extracellular Vesicles. J Extracell Vesicles 2014; 3: 26913; Connolly K D, et al. Characterisation of adipocyte-derived extracellular vesicles released pre- and post-adipogenesis. J Extracell Vesicles 2015; 24; 4: 29159).

The presently disclosed subject matter provides EV compositions for improved wound healing, and methods for their preparation.

SUMMARY OF THE INVENTION

According to one aspect, the described invention provides a method for promoting wound healing in a subject in need thereof comprising contacting a wounded tissue of the subject with a first composition comprising a therapeutic amount of extracellular vesicles (EVs) derived from human amniotic fluid (AF), wherein the therapeutic amount is effective to reduce wound area and to promote repair of the wounded tissue. According to one embodiment, the composition is effective to promote wound healing by activating epithelial cells to transition to a mesenchymal cell phenotype (EMT). According to another embodiment, the EVs are derived from amniotic fluid mesenchymal stem cells (MSCs). According to another embodiment, the EVs are characterized by: sedimentation at about 100,000×g, a buoyant density in sucrose of about 1.10-1.21 g/ml, and an average diameter of from about 50 nm to about 200 nm. According to another embodiment, the contacting is topically or subcutaneously. According to another embodiment, the first composition is effective to increase mRNA levels of one or more of Vimentin, N-cadherin, Col1a1, Acta2, or TGFbr2. According to another embodiment, the method further comprises the step of contacting the wounded tissue of the subject with a second composition comprising a therapeutic amount of EV-depleted AF, wherein the therapeutic amount of the second composition is effective to activate mesenchymal-to-epithelial transition (MET) and to promote repair of the wounded tissue. According to another embodiment, a length of time between contacting the tissue with the first composition and the second composition is from about 4 to about 24 hours. According to another embodiment, the second composition is effective to increase mRNA levels of Stat3. According to another embodiment, the wound is a chronic wound. According to another embodiment, the wound is a diabetic ulcer, a pressure ulcer, or a venous ulcer. According to another embodiment, the wound is a burn. According to another embodiment, the composition further comprises a pharmaceutically acceptable carrier. According to another embodiment, the EVs are purified from amniotic fluid by one or more of: a) ultracentrifugation; b) sucrose density gradient centrifugation; c) column chromatography; d) size exclusion; or e) filtration through a device containing an affinity matrix selective towards the EVs. According to another embodiment, the method further comprises the step of filtering the EVs by size. According to another embodiment, the EVs are characterized by an average diameter of from about 50 nm to about 200 nm.

According to another aspect, the described invention provides a two-stage method of promoting wound healing in a subject in need thereof comprising, in order: contacting the wound with a composition comprising extracellular vesicles (EVs) derived from amniotic fluid (AF) to promote early-stage wound healing in the subject; and contacting the wound with a composition comprising EV-depleted AF to promote late-stage wound healing in the subject. According to one embodiment, the early stage wound healing is characterized by activating epithelial-to-mesenchymal transition (EMT) and inducing cell migration, and the late stage wound healing is characterized by activating mesenchymal-to-epithelial transition (MET) and re-epithelialization of the wound. According to another embodiment, the EVs are derived from amniotic fluid mesenchymal stem cells (MSCs). According to another embodiment, the EVs are characterized by: sedimentation at about 100,000×g, a buoyant density in sucrose of about 1.10-1.21 g/ml, and an average diameter of from about 50 nm to about 200 nm. According to another embodiment, the contacting is topically or subcutaneously.

According to another aspect, the described invention provides a method for regulating a skin condition in a subject in need thereof comprising contacting skin of the subject with a composition comprising a therapeutic amount of extracellular vesicles (EVs) derived from human amniotic fluid (AF), wherein the therapeutic amount is effective to improve skin texture, reduce wrinkles, or both, thereby regulating the skin condition. According to one embodiment, the method further comprises microneedling of the skin prior to contacting with the composition. According to another embodiment, the composition is effective to regulate the skin condition by activating epithelial-to-mesenchymal transition (EMT).

DETAILED DESCRIPTION OF THE INVENTION

Figure 1:
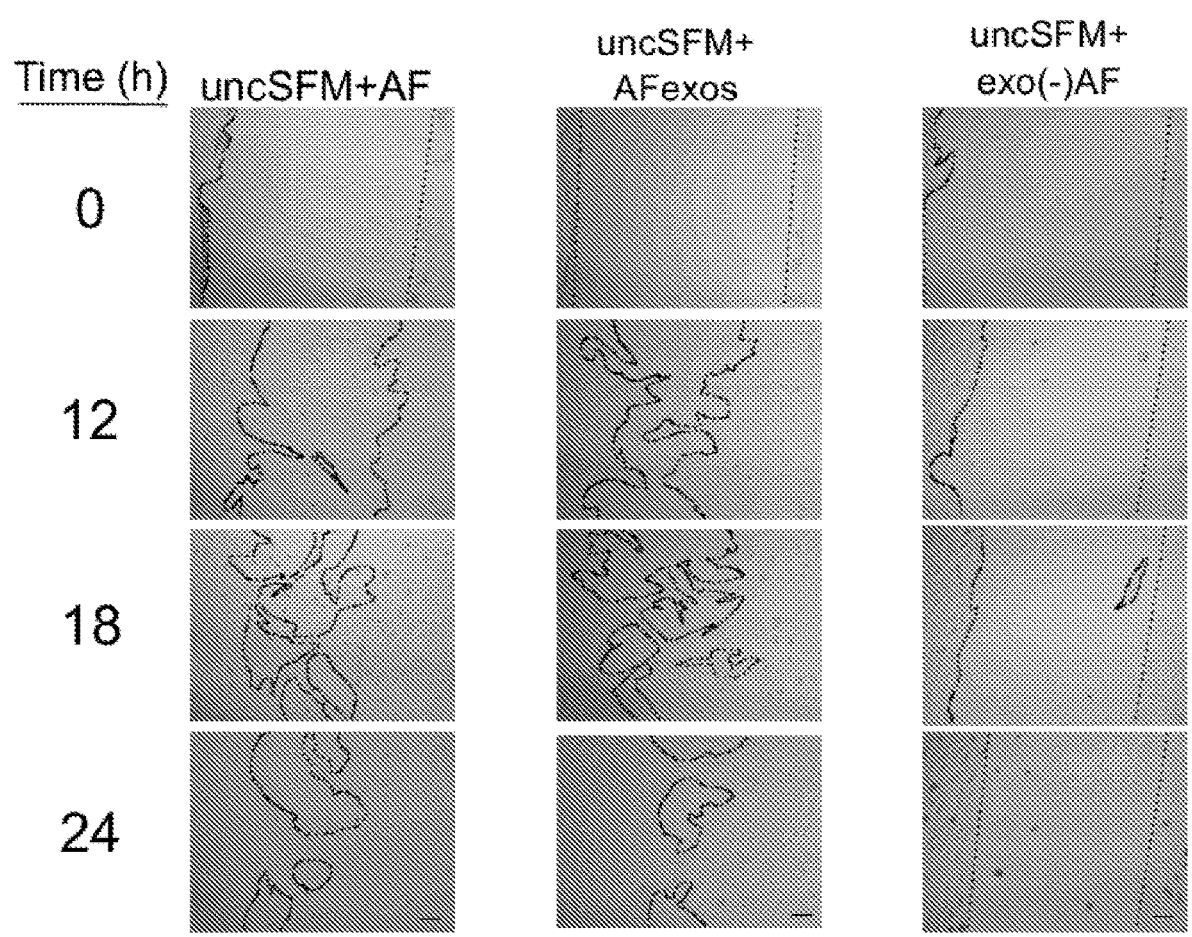
FIG. 1 is a series of representative images showing brightfield microscopy (20× objective) of C2C12 myoblasts during scratch test wound healing assay at time 0, 12, 18, and 24 hours, incubated with unconditioned serum-free media+10% amniotic fluid (uncSFM+AF), uncSFM with an equal amount of exosomes derived from amniotic fluid as that in uncSFM+10% AF (uncSFM+AFexos), or uncSFM plus 10% exosome-depleted amniotic fluid (uncSFM+exo(−)AF). Dotted lines outline area not occupied by cells; scale bar denotes 50 μm.

As used herein and in the appended claims, the singular forms "a", "an", and "the" include plural reference unless the context clearly dictates otherwise. Thus, for example, reference to a "peptide" is a reference to one or more peptides and equivalents thereof known to those skilled in the art, and so forth.

As used herein, the term "about" means plus or minus 20% of the numerical value of the number with which it is being used. Therefore, about 50% means in the range of 40%-60%.

"Administering" when used in conjunction with a therapeutic means to give or apply a therapeutic directly into or onto a target organ, tissue or cell, or to administer a therapeutic to a subject, whereby the therapeutic positively impacts the organ, tissue, cell, or subject to which it is targeted. Thus, as used herein, the term "administering", when used in conjunction with EVs or compositions thereof, can include, but is not limited to, providing EVs into or onto the target organ, tissue or cell; or providing EVs systemically to a patient by, e.g., intravenous injection, whereby the therapeutic reaches the target organ, tissue or cell. "Administering" may be accomplished by parenteral, oral, subcutaneous, or topical administration, by inhalation, or by such methods in combination with other known techniques.

The term "allogeneic" as used herein refers to being genetically different although belonging to or obtained from the same species.

The term "amino acid" is used to refer to an organic molecule containing both an amino group and a carboxyl group; those that serve as the building blocks of naturally occurring proteins are alpha amino acids, in which both the amino and carboxyl groups are linked to the same carbon atom. The terms "amino acid residue" or "residue" are used interchangeably to refer to an amino acid that is incorporated into a protein, a polypeptide, or a peptide, including, but not limited to, a naturally occurring amino acid and known analogs of natural amino acids that can function in a similar manner as naturally occurring amino acids.

The abbreviations used herein for amino acids are those abbreviations which are conventionally used: A=Ala=Alanine; R=Arg=Arginine; N=Asn=Asparagine; D=Asp=Aspartic acid; C=Cys=Cysteine; Q=Gln=Glutamine; E=Glu=Glutamic acid; G=Gly=Glycine; H=His=Histidine; I=Ile=Isoleucine; L=Leu=Leucine; K=Lys=Lysine; M=Met=Methionine; F=Phe=Phenylalanine; P=Pro=Proline; S=Ser=Serine; T=Thr=Threonine; W=Trp=Tryptophan; Y=Tyr=Tyrosine; V=Val=Valine. The amino acids may be L- or D-amino acids. An amino acid may be replaced by a synthetic amino acid which is altered so as to increase the half-life of the peptide or to increase the potency of the peptide, or to increase the bioavailability of the peptide.

The following represent groups of amino acids that are conservative substitutions for one another:
Alanine (A), Serine (S), Threonine (T);
Aspartic Acid (D), Glutamic Acid (E);
Asparagine (N), Glutamine (Q);
Arginine (R), Lysine (K);
Isoleucine (I), Leucine (L), Methionine (M), Valine (V); and
Phenylalanine (F), Tyrosine (Y), Tryptophan (W).

Amnionic Membranes.

Amniotic membranes develop from extra-embryonic tissue and consist of a fetal component (the chorionic plate) and a maternal component (the decidua, meaning the lining of the pregnant uterus), which are held together by the chorionic villi and connect the cytotrophoblastic shell of the chorionic sac to the decidua basalis. The fetal component, which includes the amniotic and chorionic fetal membranes, separates the fetus from the endometrium. The amniochorionic membrane forms the outer limits of the sac that encloses the fetus, while the innermost layer of the sac is the amniotic membrane.

From within outward, the amniotic membrane (AM) consists of (A) an epithelial monolayer, (B) a thick basement membrane, (C) a compact layer, (D) a fibroblast layer, and (E) a spongy layer. The amniotic epithelium, the innermost layer nearest to the fetus, and in contact with the amniotic fluid, consists of a single layer of cells uniformly arranged on the basement membrane. The epithelial layer can be removed while the basement membrane and stromal surfaces remain morphologically intact. The basement membrane is composed of a network of reticular fibers. The compact layer of stromal matrix adjacent to the basement membrane forms the main fibrous skeleton of the AM. The collagens of the compact layer are secreted by mesenchymal cells situated in the fibroblast layer. Interstitial collagens (types I and III) predominate and form parallel bundles that maintain the mechanical integrity of the AM. Collagens type V and VI form filamentous connections between interstitial collagens and the epithelial basement membrane. The fibroblast layer is composed of a loose fibroblast network embedded in a mass of reticulum. The spongy layer of the stromal matrix sits adjacent to the chorionic membrane, and represents the tissue of the extraembryonic coelom, which is compressed between the amnion and the chorion. It contains a nonfibrillar meshwork of mostly type III collagen. The spongy layer is loosely connected to the chorionic membrane; hence the AM is easily separated from the chorion by means of blunt dissection (Niknejad, H. et al, Eur. Cells and Materials (2008) 15: 88-99).

Throughout this specification and the claims, the phrase "amniotic membrane (AM) cells" is used interchangeably with the phrase "amniotic epithelial cells (AEC)" and is intended to include all cell types derived from amniotic membrane of which the vast majority consists of amniotic epithelial cells.

The term "amniotic stem cells" as used herein refers to pluripotent stem cells, multipotent stem cells, and progenitor cells derived from amniotic membrane, which can give rise to a limited number of cell types in vitro and/or in vivo under an appropriate condition, and expressly includes both amniotic epithelial cells and amniotic stromal cells.

The terms "animal," "patient," and "subject" as used herein include, but are not limited to, humans and non-human vertebrates such as wild, domestic and farm animals. According to some embodiments, the terms "animal," "patient," and "subject" may refer to humans. According to some embodiments, the terms "animal," "patient," and "subject" may refer to non-human mammals.

As used herein, the phrase "subject in need" of treatment for a particular condition is a subject having that condition, diagnosed as having that condition, or at risk of developing that condition. According to some embodiments, the phrase "subject in need" of such treatment also is used to refer to a patient who (i) will be administered a composition of the described invention; (ii) is receiving a composition of the described invention; or (iii) has received at least one a composition of the described invention, unless the context and usage of the phrase indicates otherwise.

The term "antibody" as used herein refers to a polypeptide or group of polypeptides comprised of at least one binding domain that is formed from the folding of polypeptide chains having three-dimensional binding spaces with internal surface shapes and charge distributions complementary to the features of an antigenic determinant of an antigen. An antibody typically has a tetrameric form, comprising two identical pairs of polypeptide chains, each pair having one "light" and one "heavy" chain. The variable regions of each light/heavy chain pair form an antibody binding site. As used herein, a "targeted binding agent" is an antibody, or binding fragment thereof, that preferentially binds to a target site. According to some embodiments, the targeted binding agent is specific for only one target site. According to some embodiments, the targeted binding agent is specific for more than one target site. According to some embodiments, the targeted binding agent may be a monoclonal antibody and the target site may be an epitope. The term "epitope" as used herein refers to that portion of an antigen or other macromolecule capable of forming a binding interaction that interacts with the variable region binding pocket of an antibody. "Binding fragments" of an antibody are produced by recombinant DNA techniques, or by enzymatic or chemical cleavage of intact antibodies. Binding fragments include Fab, Fab', F(ab')2, Fv, and single-chain antibodies. An antibody other than a "bispecific" or "bifunctional" antibody is understood to have each of its binding sites identical. An antibody substantially inhibits adhesion of a receptor to a counter-receptor when an excess of antibody reduces the quantity of receptor bound to counter-receptor by at least about 20%, 40%, 60% or 80%, and more usually greater than about 85% (as measured in an in vitro competitive binding assay). An antibody may be an oligoclonal antibody, a polyclonal antibody, a monoclonal antibody, a chimeric antibody, a CDR-grafted antibody, a multi-specific antibody, a bi-specific antibody, a catalytic antibody, a chimeric antibody, a humanized antibody, a fully human antibody, an anti-idiotypic antibody, and an antibody that can be labeled in soluble or bound form, as well as fragments, variants or derivatives thereof, either alone or in combination with other amino acid sequences provided by known techniques. An antibody may be from any species. The term antibody also includes binding fragments of the antibodies of the invention; exemplary fragments include Fv, Fab, Fab', single stranded antibody (svFC), dimeric variable region (Diabody) and di-sulphide stabilized variable region (dsFv). As discussed herein, minor variations in the amino acid sequences of antibodies or immunoglobulin molecules are contemplated as being encompassed by the described invention, providing that the variations in the amino acid sequence maintain at least about 75%, and in some embodiments, at least about 80%, about 90%, about 95%, and about 99% sequence identity to the antibodies or immunoglobulin molecules described herein. Conservative amino acid replacements are contemplated. For example, it is reasonable to expect that an isolated replacement of a leucine with an isoleucine or valine, an aspartate with a glutamate, a threonine with a serine, or a similar replacement of an amino acid with a structurally related amino acid will not have a major effect on the binding function or properties of the resulting molecule, especially if the replacement does not involve an amino acid within a framework site. Whether an amino acid change results in a functional peptide can readily be determined by assaying the specific activity of the polypeptide derivative. Assays are described in detail herein. Fragments or analogs of antibodies or immunoglobulin molecules can be readily prepared by those of ordinary skill in the art. According to some embodiments, amino- and carboxy-termini of fragments or analogs occur near boundaries of functional domains. Structural and functional domains can be identified by comparison of the nucleotide and/or amino acid sequence data to public or proprietary sequence databases. For example, computerized comparison methods can be used to identify sequence motifs or predicted protein conformation domains that occur in other proteins of known structure and/or function. Methods to identify protein sequences that fold into a known three-dimensional structure are known. See, for example, Bowie et al. *Science* 253:164 (1991), which is incorporated by reference in its entirety.

As used herein, the term "antigen" refers to a molecule, e.g., a peptide, polypeptide, protein, fragment, or other biological moiety, which elicits an antibody response in a subject, or is recognized and bound by an antibody.

The terms "apoptosis" or "programmed cell death" refer to a highly regulated and active process that contributes to biologic homeostasis comprised of a series of biochemical events that lead to a variety of morphological changes, including blebbing, changes to the cell membrane, such as loss of membrane asymmetry and attachment, cell shrinkage, nuclear fragmentation, chromatin condensation, and chromosomal DNA fragmentation, without damaging the organism.

The term "autocrine signaling" as used herein refers to a type of cell signaling in which a cell secretes signal molecules that act on itself or on other adjacent cells of the same type.

The terms "autologous" or "autogeneic" as used interchangeably herein mean derived from the same organism.

The terms "base media" or "serum-free media (SFM)" is intended to mean a media that does not contain added serum (i.e., is essentially free of serum). Examples of base media include, but are not limited to, DMEM/F12, DMEM, F12, and IMDM.

The term "binding" and its other grammatical forms as used herein means a lasting attraction between chemical substances. Binding specificity involves both binding to a specific partner and not binding to other molecules. Functionally important binding may occur at a range of affinities from low to high, and design elements may suppress undesired cross-interactions. Post-translational modifications also can alter the chemistry and structure of interactions. "Promiscuous binding" may involve degrees of structural plasticity, which may result in different subsets of residues being important for binding to different partners. "Relative binding specificity" is a characteristic whereby in a biochemical system a molecule interacts with its targets or partners differentially, thereby impacting them distinctively depending on the identity of individual targets or partners.

The terms "biomarker" or "marker" as used herein refers to a peptide, a protein, a nucleic acid, an antibody, a gene, a metabolite, or any other substance used as an indicator of a biologic state. It is a characteristic that is measured objectively and evaluated as a cellular or molecular indicator of normal biologic processes, pathogenic processes, or pharmacologic responses to a therapeutic intervention. The term "indicator" as used herein refers to any substance, number or ratio derived from a series of observed facts that may reveal relative changes as a function of time; or a signal, sign, mark, note or symptom that is visible or evidence of the existence or presence thereof. Once a proposed biomarker has been validated, it may be used to diagnose disease risk, presence of disease in an individual, or to tailor treatments for the disease in an individual (choices of drug treatment or administration regimes). In evaluating potential drug therapies, a biomarker may be used as a surrogate for a natural endpoint, such as survival or irreversible morbidity. If a treatment alters the biomarker, and that alteration has a direct connection to improved health, the biomarker may serve as a surrogate endpoint for evaluating clinical benefit. Clinical endpoints are variables that can be used to measure how patients feel, function or survive. Surrogate endpoints are biomarkers that are intended to substitute for a clinical endpoint; these biomarkers are demonstrated to predict a clinical endpoint with a confidence level acceptable to regulators and the clinical community.

The term "carrier" as used herein describes a material that does not cause significant irritation to an organism and does not abrogate the biological activity and properties of the compound of the composition of the described invention. Carriers must be of sufficiently high purity and of sufficiently low toxicity to render them suitable for administration to the mammal being treated. The carrier can be inert, or it can possess pharmaceutical benefits. The terms "excipient", "carrier", or "vehicle" are used interchangeably to refer to carrier materials suitable for formulation and administration of pharmaceutically acceptable compositions described herein. Carriers and vehicles useful herein include any such materials know in the art which are nontoxic and do not interact with other components.

The term "chorion" as used herein refers to the outer fetal membrane that surrounds the amnion, the embryo, and other membranes and entities in the womb. A spongy layer of loosely arranged collagen fibers separates the amniotic and chorionic mesoderm. The chorionic membrane consists of mesodermal and trophoblastic regions. Chorionic and amniotic mesoderm are similar in composition. A large and incomplete basal lamina separates the chorionic mesoderm from the extravillous trophoblast cells. The latter, similar to trophoblast cells present in the basal plate, are dispersed within the fibrinoid layer and express immunohistochemical markers of proliferation. The Langhans fibrinoid layer usually increases during pregnancy and is composed of two different types of fibrinoid: a matrix type on the inner side (more compact) and a fibrin type on the outer side (more reticulate). At the edge of the placenta and in the basal plate, the trophoblast interdigitates extensively with the decidua (Cunningham, F. et al., The placenta and fetal membranes, Williams Obstetrics, 20th ed. Appleton and Lange, 1997, 95-125; Benirschke, K. and Kaufmann, P. Pathology of the human placenta. New York, Springer-Verlag, 2000, 42-46, 116, 281-297). The chorion, which interfaces maternal tisues, consists of four layers. These are, from within outward: (F) the cellular layer, a thin layer consisting of an interlacing fibroblast network, which is frequently imperfect or completely absent; (G) a reticular layer, which consists of a reticular network, the fibers of which tend to be parallel, along with a few fibroblasts and many Hofbauer cells; (H) a pseudo-basement membrane, which is a layer of dense connective tissue firmly adherent to the reticular layer above, and which sends anchoring and branching fibers down into the trophoblast; and (I) a trophoblast layer, which is the deepest layer of the chorion consisting of from two to 10 layers of trophoblast cells in contact, on their deeper aspect, with maternal decidua. This layer contains the chorionic villi (Bourne, G L, Am. J. Obstet. & Gynec. (1960) 79 (6): 1070-73).

"Cluster of Differentiation" or "cluster of designation" (CD) molecules are utilized in cell sorting using various methods, including flow cytometry. Cell populations usually are defined using a "+" or a "−" symbol to indicate whether a certain cell fraction expresses or lacks a particular CD molecule.

The term "conditioned medium" (or plural, media), as used herein refers to spent culture medium harvested from cultured cells containing metabolites, growth factors, RNA and proteins released into the medium by the cultured cells.

The term "contact" and its various grammatical forms as used herein refers to a state or condition of touching or of immediate or local proximity.

The term "culture medium" (or plural, media), as used herein refers to a substance containing nutrients in which cells or tissues are cultivated for controlled growth.

The term "cytokine" as used herein refers to small soluble protein substances secreted by cells, which have a variety of effects on other cells. Cytokines mediate many important physiological functions, including growth, development, wound healing, and the immune response. They act by binding to their cell-specific receptors located in the cell membrane, which allows a distinct signal transduction cascade to start in the cell, which eventually will lead to biochemical and phenotypic changes in target cells. Generally, cytokines act locally. They include type I cytokines, which encompass many of the interleukins, as well as several hematopoietic growth factors; type II cytokines, including the interferons and interleukin-10; tumor necrosis factor (TNF)-related molecules, including TNFα and lymphotoxin; immunoglobulin super-family members, including interleukin 1 (IL-1); and the chemokines, a family of molecules that play a critical role in a wide variety of immune and inflammatory functions. The same cytokine can have different effects on a cell depending on the state of the cell. Cytokines often regulate the expression of, and trigger cascades of, other cytokines.

As used herein, the term "derived from" is meant to encompass any method for receiving, obtaining, or modifying something from a source of origin.

As used herein, the terms "detecting", "determining", and their other grammatical forms, are used to refer to methods performed for the identification or quantification of a biomarker, such as, for example, the presence or level of miRNA, or for the presence or absence of a condition in a biological sample. The amount of biomarker expression or activity detected in the sample can be none or below the level of detection of the assay or method.

The term "differentiation" as used herein refers to a process of development with an increase in the level of organization or complexity of a cell or tissue, accompanied by a more specialized function.

The terms "disease" or "disorder" as used herein refer to an impairment of health or a condition of abnormal functioning.

The phrase "early stage" as used herein refers to the early aspects of wound healing, such as coagulation/hemostasis and inflammation. The phrase "late stage" as used herein refers to later aspects of wound healing, such as proliferation and remodeling/maturation.

The term "endogenous" as used herein refers to that which is naturally occurring, incorporated within, housed within, adherent to, attached to, or resident in. The term "exogenous" as used herein refers to that which is non-naturally occurring, or that is originating or produced outside of a specific EV, cell, organism, or species.

As used herein, the term "enrich" is meant to refer to increasing the proportion of a desired substance, for example, to increase the relative frequency of a subtype of cell or cell component compared to its natural frequency in a cell population. Positive selection, negative selection, or both are generally considered necessary to any enrichment scheme. Selection methods include, without limitation, magnetic separation and fluorescence-activated cell sorting (FACS).

The phrase "epithelial-to-mesenchymal" or "EMT" as used herein refers to the process by which epithelial cells lose their cell polarity and cell-cell adhesion, and gain migratory and invasive properties to become mesenchymal stem cells. The phrase "mesenchymal-to-epithelial" or "MET" as used herein refers to the reverse process.

The term "exacerbation" as used herein refers to an increase in the severity of a disease or any of its signs or symptoms.

The term "expand" and its various grammatical forms as used herein refers to a process by which dispersed living cells propagate in vitro in a culture medium that results in an increase in the number or amount of viable cells.

As used herein, the term "expression" and its various grammatical forms refers to the process by which a polynucleotide is transcribed from a DNA template (such as into an mRNA or other RNA transcript) and/or the process by which a transcribed mRNA is subsequently translated into peptides, polypeptides, or proteins. Transcripts and encoded polypeptides may be collectively referred to as "gene product." If the polynucleotide is derived from genomic DNA, expression may include splicing of the mRNA in a eukaryotic cell. Expression may also refer to the post-translational modification of a polypeptide or protein.

The term "extracellular vesicles" or "EVs" as used herein includes exosomes and microvesicles that carry bioactive molecules, such as proteins, RNAs and microRNAs, that may be released into and influence the extracellular environment. Microvesicles are small membrane-enclosed sacs thought to be generated by the outward budding and fission of membrane vesicles from the cell surface. Exosomes originate predominantly from preformed multivesicular bodies that are released upon fusion with the plasma membrane. The term "EV-depleted" means essentially free or substantially free of extracellular vesicles.

The term "growth factor" as used herein refers to extracellular polypeptide molecules that bind to a cell-surface receptor triggering an intracellular signaling pathway, leading to proliferation, differentiation, or other cellular response. These pathways stimulate the accumulation of proteins and other macromolecules, e.g., by increasing their rate of synthesis, decreasing their rate of degradation, or both. Exemplary growth factors include, without limitation: Fibroblast Growth Factor (FGF).

The fibroblast growth factor (FGF) family currently has over a dozen structurally related members. FGF1 is also known as acidic FGF; FGF2 is sometimes called basic FGF (bFGF); and FGF7 sometimes goes by the name keratinocyte growth factor. Over a dozen distinct FGF genes are known in vertebrates; they can generate hundreds of protein isoforms by varying their RNA splicing or initiation codons in different tissues. FGFs can activate a set of receptor tyrosine kinases called the fibroblast growth factor receptors (FGFRs). Receptor tyrosine kinases are proteins that extend through the cell membrane. The portion of the protein that binds the paracrine factor is on the extracellular side, while a dormant tyrosine kinase (i.e., a protein that can phosphorylate another protein by splitting ATP) is on the intracellular side. When the FGF receptor binds an FGF (and only when it binds an FGF), the dormant kinase is activated, and phosphorylates certain proteins within the responding cell, activating those proteins.

FGFs are associated with several developmental functions, including angiogenesis (blood vessel formation), mesoderm formation, and axon extension. While FGFs often can substitute for one another, their expression patterns give them separate functions. For example, FGF2 is especially important in angiogenesis, whereas FGF8 is involved in the development of the midbrain and limbs.

Insulin-Like Growth Factor (IGF-1).

IGF-1, a hormone similar in molecular structure to insulin, has growth-promoting effects on almost every cell in the body, especially skeletal muscle, cartilage, bone, liver, kidney, nerves, skin, hematopoietic cell, and lungs. It plays an important role in childhood growth and continues to have anabolic effects in adults. IGF-1 is produced primarily by the liver as an endocrine hormone as well as in target tissues in a paracrine/autocrine fashion. Production is stimulated by growth hormone (GH) and can be retarded by undernutrition, growth hormone insensitivity, lack of growth hormone receptors, or failures of the downstream signaling molecules, including tyrosine-protein phosphatase non-receptor type 11 (also known as SHP2, which is encoded by the PTPN11 gene in humans) and signal transducer and activator of transcription 5B (STAT5B), a member of the STAT family of transcription factors. Its primary action is mediated by binding to its specific receptor, the Insulin-like growth factor 1 receptor (IGF1R), present on many cell types in many tissues. Binding to the IGF1R, a receptor tyrosine kinase, initiates intracellular signaling; IGF-1 is one of the most potent natural activators of the AKT signaling pathway, a stimulator of cell growth and proliferation, and a potent inhibitor of programmed cell death. IGF-1 is a primary mediator of the effects of growth hormone (GH). Growth hormone is made in the pituitary gland, released into the blood stream, and then stimulates the liver to produce IGF-1. IGF-1 then stimulates systemic body growth. In addition to its insulin-like effects, IGF-1 also can regulate cell growth and development, especially in nerve cells, as well as cellular DNA synthesis.

IGF-1 was shown to increase the expression levels of the chemokine receptor CXCR4 (receptor for stromal cell-derived factor-1, SDF-1) and to markedly increase the migratory response of MSCs to SDF-1 (Li, Y, et al, "Insulin-like growth factor 1 enhances the migratory capacity of mesenchymal stem cells," 2007 Biochem. Biophys. Res. Communic. 356(3): 780-784). The IGF-1-induced increase in MSC migration in response to SDF-1 was attenuated by PI3 kinase inhibitor (LY294002 and wortmannin) but not by mitogen-activated protein/ERK kinase inhibitor PD98059. Without being limited by any particular theory, the data indicate that IGF-1 increases MSC migratory responses via CXCR4 chemokine receptor signaling which is PI3/Akt dependent.

Transforming Growth Factor Beta (TGF-β).

There are over 30 structurally related members of the TGF-β superfamily, and they regulate some of the most important interactions in development. The proteins encoded by TGF-β superfamily genes are processed such that the carboxy-terminal region contains the mature peptide. These peptides are dimerized into homodimers (with themselves) or heterodimers (with other TGF-β peptides) and are secreted from the cell. The TGF-β superfamily includes the TGF-β family, the activin family, the bone morphogenetic proteins (BMPs), the Vg-1 family, and other proteins, including glial-derived neurotrophic factor (GDNF, necessary for kidney and enteric neuron differentiation) and Müllerian inhibitory factor, which is involved in mammalian sex determination. TGF-β family members TGF-β1, 2, 3, and 5 are important in regulating the formation of the extracellular matrix between cells and for regulating cell division (both positively and negatively). TGF-β1 increases the amount of extracellular matrix epithelial cells make both by stimulating collagen and fibronectin synthesis and by inhibiting matrix degradation. TGF-βs may be critical in controlling where and when epithelia can branch to form the ducts of kidneys, lungs, and salivary glands.

Vascular Endothelial Growth Factor (VEGF).

VEGFs are growth factors that mediate numerous functions of endothelial cells including proliferation, migration, invasion, survival, and permeability. The VEGFs and their corresponding receptors are key regulators in a cascade of molecular and cellular events that ultimately lead to the development of the vascular system, either by vasculogenesis, angiogenesis, or in the formation of the lymphatic vascular system. VEGF is a critical regulator in physiological angiogenesis and also plays a significant role in skeletal growth and repair.

VEGF's normal function creates new blood vessels during embryonic development, after injury, and to bypass blocked vessels. In the mature established vasculature, the endothelium plays an important role in the maintenance of homeostasis of the surrounding tissue by providing the communicative network to neighboring tissues to respond to requirements as needed. Furthermore, the vasculature provides growth factors, hormones, cytokines, chemokines and metabolites, and the like, needed by the surrounding tissue and acts as a barrier to limit the movement of molecules and cells.

The term "hybridization" as used herein refers to the binding of two single stranded nucleic acid molecules to each other through base pairing. Nucleotides will bind to their complement under normal conditions, so two perfectly complementary strands will bind (or 'anneal') to each other readily. However, due to the different molecular geometries of the nucleotides, a single inconsistency between the two strands will make binding between them more energetically unfavorable. Measuring the effects of base incompatibility by quantifying the rate at which two strands anneal can provide information as to the similarity in base sequence between the two strands being annealed.

The term "inflammation" as used herein refers to the physiologic process by which vascularized tissues respond to injury. See, e.g., FUNDAMENTAL IMMUNOLOGY, 4th Ed., William E. Paul, ed. Lippincott-Raven Publishers, Philadelphia (1999) at 1051-1053, incorporated herein by reference. During the inflammatory process, cells involved in detoxification and repair are mobilized to the compromised site by inflammatory mediators. Inflammation is often characterized by a strong infiltration of leukocytes at the site of inflammation, particularly neutrophils (polymorphonuclear cells). These cells promote tissue damage by releasing toxic substances at the vascular wall or in uninjured tissue. Traditionally, inflammation has been divided into acute and chronic responses. The term "acute inflammation" as used herein refers to the rapid, short-lived (minutes to days), relatively uniform response to acute injury characterized by accumulations of fluid, plasma proteins, and neutrophilic leukocytes. Examples of injurious agents that cause acute inflammation include, but are not limited to, pathogens (e.g., bacteria, viruses, parasites), foreign bodies from exogenous (e.g. asbestos) or endogenous (e.g., urate crystals, immune complexes), sources, and physical (e.g., burns) or chemical (e.g., caustics) agents. The term "chronic inflammation" as used herein refers to inflammation that is of longer duration and which has a vague and indefinite termination. Chronic inflammation takes over when acute inflammation persists, either through incomplete clearance of the initial inflammatory agent or as a result of multiple acute events occurring in the same location. Chronic inflammation, which includes the influx of lymphocytes and macrophages and fibroblast growth, may result in tissue scarring at sites of prolonged or repeated inflammatory activity.

The term "infuse" and its other grammatical forms as used herein refers to introduction of a fluid other than blood into a vein.

The term "isolated" is used herein to refer to material, such as, but not limited to, a nucleic acid, peptide, polypeptide, or protein, which is: (1) substantially or essentially free from components that normally accompany or interact with it as found in its naturally occurring environment. The terms "substantially free" or "essentially free" are used herein to refer to considerably or significantly free of, or more than about 95%, 96%, 97%, 98%, 99% or 100% free. The isolated material optionally comprises material not found with the material in its natural environment; or (2) if the material is in its natural environment, the material has been synthetically (non-naturally) altered by deliberate human intervention to a composition and/or placed at a location in the cell (e.g., genome or subcellular organelle) not native to a material found in that environment. The alteration to yield the synthetic material may be performed on the material within, or removed, from its natural state.

The term "matrix metalloproteinases" as used herein refers to a collection of zinc-dependent proteases involved in the breakdown and the remodelling of extracellular matrix components (Guiot, J. et al, "Blood biomarkers in idiopathic pulmonary fibrosis," Lung (2017) 195(3): 273-280, citing Oikonomidi et al., "Matrix metalloproteinases in respiratory diseases: from pathogenesis to potential clinical implications," Curr Med Chem. 2009; 16(10): 1214-1228). MMP-1 and MMP-7 seem to be primarily overexpressed in plasma of IPF patients compared to hypersensitivity pneumonitis, sarcoidosis and COPD with a possible usefulness in differential diagnosis (Id., citing Rosas I O, et al., "MMP1 and MMP7 as potential peripheral blood biomarkers in idiopathic pulmonary fibrosis," PLoS Med. 2008; 5(4): e93). They are also involved in inflammation and seem to take part to the pathophysiological process of pulmonary fibrosis (Id., citing Vij R, Noth I. "Peripheral blood biomarkers in idiopathic pulmonary fibrosis," Transl Res. 2012; 159(4): 218-27; Dancer R C A, et al., "Metalloproteinases in idiopathic pulmonary fibrosis," Eur Respir J. 2011; 38(6): 1461-67). The most studied is MMP-7, which is known as being significantly increased in epithelial cells both at the gene and protein levels and is considered to be active in hyperplastic epithelial cells and alveolar macrophages in IPF (Id., citing Fujishima S, et al., "Production and activation of matrix metalloproteinase 7 (matrilysin 1) in the lungs of patients with idiopathic pulmonary fibrosis," Arch Pathol Lab Med. 2010; 134(8): 1136-42). There is also a significant correlation between higher MMP-7 concentrations and disease severity assessed by forced vital capacity (FVC) and DLCO (% pred) (Id., citing Rosas I O, et al., "MMP1 and MMP7 as potential peripheral blood biomarkers in idiopathic pulmonary fibrosis," PLoS Med. 2008; 5(4): e93). Higher levels associated to disease progression and worse survival (>4.3 ng/ml for MMP-7) (Id.). The MMP2 gene provides instructions for making matrix metallopeptidase 2. This enzyme is produced in cells throughout the body and becomes part of the extracellular matrix, which is an intricate lattice of proteins and other molecules that forms in the spaces between cells. One of the major known functions of MMP-2 is to cleave type IV collagen, which is a major structural component of basement membranes, the thin, sheet-like structures that separate and support cells as part of the extracellular matrix.

The term "microneedling" as used herein refers to a cosmetic procedure where very fine needles puncture the skin to cause a controlled injury and induce the skin to make more collagen, resulting in an improved complexion. Microneedling relies on collagenesis and neovascularisation that occurs as a result of the release of growth factors following needle piercing of the stratum corneum (the outer layer of the skin). The procedure is often used in the treatment of scars and photoageing.

The term "nucleic acid" is used herein to refer to a deoxyribonucleotide or ribonucleotide polymer in either single- or double-stranded form, and, unless otherwise limited, encompasses known analogues having the essential nature of natural nucleotides in that they hybridize to single-stranded nucleic acids in a manner similar to naturally occurring nucleotides (e.g., peptide nucleic acids).

The term "nucleotide" is used herein to refer to a chemical compound that consists of a heterocyclic base, a sugar, and one or more phosphate groups. In the most common nucleotides, the base is a derivative of purine or pyrimidine, and the sugar is the pentose deoxyribose or ribose. Nucleotides are the monomers of nucleic acids, with three or more bonding together in order to form a nucleic acid. Nucleotides are the structural units of RNA, DNA, and several cofactors, including, but not limited to, CoA, FAD, DMN, NAD, and NADP. Purines include adenine (A), and guanine (G); pyrimidines include cytosine (C), thymine (T), and uracil (U).

As used herein, the term "paracrine signaling" refers to short range cell-cell communication via secreted signal molecules that act on adjacent cells.

The term "pharmaceutical composition" is used herein to refer to a composition that is employed to prevent, reduce in intensity, cure or otherwise treat a target condition or disease. The terms "formulation" and "composition" are used interchangeably herein to refer to a product of the described invention that comprises all active and inert ingredients.

The term "pharmaceutically acceptable," is used to refer to the carrier, diluent or excipient being compatible with the other ingredients of the formulation or composition and not deleterious to the recipient thereof. For example, the term "pharmaceutically acceptable" can mean approved by a regulatory agency of the Federal or a state government or listed in the U.S. Pharmacopeia or other generally recognized pharmacopeia for use in animals, and more particularly in humans.

The term "primer" refers to a nucleic acid which, when hybridized to a strand of DNA, is capable of initiating the synthesis of an extension product in the presence of a suitable polymerization agent. The primer is sufficiently long to uniquely hybridize to a specific region of the DNA strand. A primer also may be used on RNA, for example, to synthesize the first strand of cDNA.

The term "purification" and its various grammatical forms as used herein refers to the process of isolating or freeing from foreign, extraneous, or objectionable elements.

The term "regulating a skin condition" as used herein includes one or more of inducing increased skin integrity by cell renewal; enhancing water content or moisture of skin; reducing transepidermal water loss, skin flaking, and scaling; improving skin thickness; enhancing skin tensile properties; reducing the appearance of dermal fine lines and wrinkles; improving skin texture; reducing skin pores size; enhancing skin smoothness; improving skin age spots; improving skin tone; or improving the appearance of scars and skin abrasions.

The term "repair" as used herein as a noun refers to any correction, reinforcement, reconditioning, remedy, making up for, making sound, renewal, mending, patching, or the like that restores function. When used as a verb, it means to correct, to reinforce, to recondition, to remedy, to make up for, to make sound, to renew, to mend, to patch or to otherwise restore function.

The term "skin integrity" as used herein refers to intact skin, which is the body's first line of defense against the invasion of microorganisms, which provides a protective barrier from numerous environmental threats, and facilitates retention of moisture. The term "impaired skin integrity" as used herein refers to alteration in the epidermis and/or dermis so that the skin is damaged, vulnerable to injury or unable to heal normally.

The term "stem cells" refers to undifferentiated cells having high proliferative potential with the ability to self-renew that can generate daughter cells that can undergo terminal differentiation into more than one distinct cell phenotype. The term "renewal" or "self renewal" as used herein, refers to the process by which a stem cell divides to generate one (asymmetric division) or two (symmetric division) daughter cells having development potential indistinguishable from the mother cell. Self renewal involves both proliferation and the maintenance of an undifferentiated state.

The term "adult (somatic) stem cells" as used herein refers to undifferentiated cells found among differentiated cells in a tissue or organ. Their primary role in vivo is to maintain and repair the tissue in which they are found. Adult stem cells, which have been identified in many organs and tissues, including brain, bone marrow, peripheral blood, blood vessels, skeletal muscles, skin, teeth, gastrointestinal tract, liver, ovarian epithelium, and testis, are thought to reside in a specific area of each tissue, known as a stem cell niche, where they may remain quiescent (non-dividing) for long periods of time until they are activated by a normal need for more cells to maintain tissue, or by disease or tissue injury.

The term "symptom" as used herein refers to a sign or an indication of disorder or disease, especially when experienced by an individual as a change from normal function, sensation, or appearance.

As used herein, the term "therapeutic agent" or "active agent" refers to refers to the ingredient, component or constituent of the compositions of the described invention responsible for the intended therapeutic effect.

The term "therapeutic component" as used herein refers to a therapeutically effective dosage (i.e., dose and frequency of administration) that eliminates, reduces, or prevents the progression of a particular disease manifestation in a percentage of a population. An example of a commonly used therapeutic component is the ED50, which describes the dose in a particular dosage that is therapeutically effective for a particular disease manifestation in 50% of a population.

The term "therapeutic effect" as used herein refers to a consequence of treatment, the results of which are judged to be desirable and beneficial. A therapeutic effect may include, directly or indirectly, the arrest, reduction, or elimination of a disease manifestation. A therapeutic effect may also include, directly or indirectly, the arrest, reduction, or elimination of the progression of a disease manifestation.

As used herein, the term "tissue" refers to a collection of similar cells and the intercellular substances surrounding them. For example, adipose tissue is a connective tissue consisting chiefly of fat cells surrounded by reticular fibers and arranged in lobular groups or along the course of smaller blood vessels. Connective tissue is the supporting or framework tissue of the body formed of fibrous and ground substance with numerous cells of various kinds. It is derived from the mesenchyme, and this in turn from the mesoderm. The varieties of connective tissue include, without limitation, areolar or loose; adipose; sense, regular or irregular, white fibrous; elastic; mucous; lymphoid tissue; cartilage and bone.

The terms "treat," "treated," or "treating" as used herein refers to both therapeutic treatment and/or prophylactic or preventative measures, wherein the object is to prevent or slow down (lessen) an undesired physiological condition, disorder or disease, or to obtain beneficial or desired clinical results. For the purposes of this invention, beneficial or desired clinical results include, but are not limited to, alleviation of symptoms; diminishment of the extent of the condition, disorder or disease; stabilization (i.e., not worsening) of the state of the condition, disorder or disease; delay in onset or slowing of the progression of the condition, disorder or disease; amelioration of the condition, disorder or disease state; and remission (whether partial or total), whether detectable or undetectable, or enhancement or improvement of the condition, disorder or disease. Treatment includes eliciting a clinically significant response without excessive levels of side effects. Treatment also includes prolonging survival as compared to expected survival if not receiving treatment.

EVs and EV Preparations

According to some embodiments, the described invention provides compositions comprising a population of membrane (i.e., lipid bilayer) vesicles (EVs) derived from amniotic fluid. According to some embodiments, the EVs are derived from amniotic fluid mesenchymal stem cells (MSCs). When included in a pharmaceutical composition, the pharmaceutical composition contains the composition comprising a population of isolated EVs and a pharmaceutically acceptable carrier. According to some embodiments, the amniotic fluid is allogeneic to a subject for whom administration of the pharmaceutical composition is contemplated. According to some embodiments, the amniotic fluid is autologous to a subject for whom administration of the pharmaceutical composition is contemplated. According to some embodiments, the amniotic fluid is mammalian. According to some embodiments, the amniotic fluid is human.

Amniotic Fluid

Amniotic fluid samples are obtained by amniocentesis performed between 16 and 20 weeks of gestation for fetal karyotyping. A two-stage culture protocol can be used for isolating MSCs from amniotic fluid (Tsai M S, et al., Hum Reprod. 2004 June; 19(6): 1450-6). For culturing amniocytes (first stage), primary in situ cultures are set up in tissue culture-grade dishes using Chang medium (Irvine Scientific, Santa Ana, CA). Metaphase selection and colony definition is based on the basic requirements for prenatal cytogenetic diagnosis in amniocytes (Moertel C A, et al., 1992; *Prenat Diagn* 12, 671-683). For culturing MSCs (second stage), non-adhering amniotic fluid cells in the supernatant medium are collected on the fifth day after the primary amniocytes culture and kept until completion of fetal chromosome analysis. The cells are then centrifuged and plated in 5 ml of $\alpha$-modified minimum essential medium ($\alpha$-MEM; Gibco-BRL) supplemented with 20% fetal bovine serum (FBS; Hyclone, Logan, UT) and 4 ng/ml basic fibroblast growth factor (bFGF; R&D systems, Minneapolis, MN) in a 25 cm$^2$ flask and incubated at 37° C. with 5% humidified $CO_2$ for MSC culture. Similar to MSCs from umbilical cord blood and first-trimester fetal tissues, surface antigens such as SH3, SH4, CD29, CD44 and HLA-A,B,C (MHC class I) may be found, and CD10, CD11b, CD14, CD34, CD117, HLA-DR,DP,DQ (MHC class II) and EMA are absent (Tsai M S, et al., Hum Reprod. 2004 June; 19(6): 1450-6; Pittenger M F, et al., Science 284, 143-7; Colter D C, et al., Proc Natl Acad Sci USA 98, 78415; Young H Y, et al., Anat Rec 264, 51-62).

According to some embodiments, the EVs contain microvesicles, exosomes, or both. According to some embodiments, the EVs have a diameter ranging from about 30 nm to 200 nm, i.e., at least 30 nm, at least 31 nm, at least 32 nm, at least 33 nm, at least 34 nm, at least 35 nm, at least 36 nm, at least 37 nm, at least 38 nm, at least 39 nm, at least 40 nm, at least 41 nm, at least 42 nm, at least 43 nm, at least 44 nm, at least 45 nm, at least 46 nm, at least 47 nm, at least 48 nm, at least 49 nm, at least 50 nm, at least 51 nm, at least 52 nm, at least 53 nm, at least 54 nm, at least 55 nm, at least 56 nm, at least 57 nm, at least 58 nm, at least 59 nm, at least 60 nm, at least 61 nm, at least 62 nm, at least 63 nm, at least 64 nm, at least 65 nm, at least 66 nm, at least 67 nm, at least 68 nm, at least 69 nm, at least 70 nm, at least 71 nm, at least 72 nm, at least 73 nm, at least 74 nm, at least 75 nm, at least 76 nm, at least 77 nm, at least 78 nm, at least 79 nm, at least 80 nm, at least 81 nm, at least 82 nm, at least 83 nm, at least 84 nm, at least 85 nm, at least 86 nm, at least 87 nm, at least 88 nm, at least 89 nm, at least 90 nm, at least 91 nm, at least 92 nm, at least 93 nm, at least 94 nm, at least 95 nm, at least 96 nm, at least 97 nm, at least 98 nm, at least 99 nm, at least 100 nm, at least 101 nm, at least 102 nm, at least 103 nm, at least 104 nm, at least 105 nm, at least 106 nm, at least 107 nm, at least 108 nm, at last 109 nm, at least 110 nm, at least 120 nm, at least 121 nm, at least 122 nm, at least 123 nm, at least 124 nm, at least 125 nm, at least 126 nm, at least 127 nm, at least 128 nm, at least 129 nm, at least 130 nm, at least 131 nm, at least 132 nm, at least 133 nm, at least 134 nm, at least 135 nm, at least 136 nm, at least 137 nm, at least 138 nm, at least 139 nm, at least 140 nm, at least 141 nm, at least 142 nm, at least 143 nm, at least 144 nm, at least 145 nm, at least 146 nm, at least 147 nm, at least 148 nm, at least 149 nm, at least 150 nm, at least 151 nm, at least 152 nm, at least 153 nm, at least 154 nm, at least 155 nm, at least 156 nm, at least 157 nm, at least 158 nm, at least 159 nm, at least 160 nm, at least 161 nm, at least 162 nm, at least 163 nm, at least 164 nm, at least 165 nm, at least 166 nm, at least 167 nm, at least 168 nm, at least 169 nm, at least 170 nm, at least 171 nm, at least 172 nm, at least 173 nm, at least 174 nm, at least 175 nm, at least 176 nm, at least 177 nm, at least 178 nm, at least 179 nm, at least 180 nm, at least 181 nm, at least 182 nm, at least 183 nm, at least 184 nm, at least 185 nm, at least 186 nm, at least 187 nm, at least 188 nm, at least 189 nm, at least 190 nm, at least 191 nm, at least 192 nm, at least 193 nm, at least 194 nm, at least 195 nm, at least 196 nm, at least 197 nm, at least 198 nm, at least 199 nm, or at least 200 nm. According to some embodiments, the EVs are of a diameter ranging from about 50 nm to about 200 nm, i.e., at least 50 nm, at least 51 nm, at least 52 nm, at least 53 nm, at least 54 nm, at least 55 nm, at least 56 nm, at least 57 nm, at least 58 nm, at least 59 nm, at least 60 nm, at least 61 nm, at least 62 nm, at least 63 nm, at least 64 nm, at least 65 nm, at least 66 nm, at least 67 nm, at least 68 nm, at least 69 nm, at least 70 nm, at least 71 nm, at least 72 nm, at least 73 nm, at least 74 nm, at least 75 nm, at least 76 nm, at least 77 nm, at least 78 nm, at least 79 nm, at least 80 nm, at least 81 nm, at least 82 nm, at least 83 nm, at least 84 nm, at least 85 nm, at least 86 nm, at least 87 nm, at least 88 nm, at least 89 nm, at least 90 nm, at least 91 nm, at least 92 nm, at least 93 nm, at least 94 nm, at least 95 nm, at least 96 nm, at least 97 nm, at least 98 nm, at least 99 nm, at least 100 nm, at least 101 nm, at least 102 nm, at least 103 nm, at least 104 nm, at least 105 nm, at least 106 nm, at least 107 nm, at least 108 nm, at last 109 nm, at least 110 nm, at least 120 nm, at least 121 nm, at least 122 nm, at least 123 nm, at least 124 nm, at least 125 nm, at least 126 nm, at least 127 nm, at least 128 nm, at least 129 nm, at least 130 nm, at least 131 nm, at least 132 nm, at least 133 nm, at least 134 nm, at least 135 nm, at least 136 nm, at least 137 nm, at least 138 nm, at least 139 nm, at least 140 nm, at least 141 nm, at least 142 nm, at least 143 nm, at least 144 nm, at least 145 nm, at least 146 nm, at least 147 nm, at least 148 nm, at least 149 nm, at least 150 nm, at least 151 nm, at least 152 nm, at least 153 nm, at least 154 nm, at least 155 nm, at least 156 nm, at least 157 nm, at least 158 nm, at least 159 nm, at least 160 nm, at least 161 nm, at least 162 nm, at least 163 nm, at least 164 nm, at least 165 nm, at least 166 nm, at least 167 nm, at least 168 nm, at least 169 nm, at least 170 nm, at least 171 nm, at least 172 nm, at least 173 nm, at least 174 nm, at least 175 nm, at least 176 nm, at least 177 nm, at least 178 nm, at least 179 nm, at least 180 nm, at least 181 nm, at least 182 nm, at least 183 nm, at least 184 nm, at least 185 nm, at least 186 nm, at least 187 nm, at least 188 nm, at least 189 nm, at least 190 nm, at least 191 nm, at least 192 nm, at least 193 nm, at least 194 nm, at least 195 nm, at least 196 nm, at least 197 nm, at least 198 nm, at least 199 nm, or at least 200 nm. According to some embodiments, by electron microscopy, the EVs appear to have a cup-shaped morphology. According to some embodiments, the EVs sediment at about 100,000×g and have a buoyant density in sucrose of about 1.10 to about 1.21 g/ml.

According to some embodiments, the EVs comprise proteins, nucleic acids, or both, including RNA species, such as miRNAs.

According to some embodiments, the extracellular vesicles are isolated EVs. The term "an isolated population of EVs" as used herein refers to a population of EVs that is physically separated from its natural environment. According to some embodiments, isolated populations of EVs can be physically separated, in whole or in part, from tissue or cells with which the populations naturally exist. According to some embodiments, a composition comprising isolated EVs may be substantially free of cells or cell components, or it may be free of or substantially free of conditioned media. According to some embodiments, the concentration of isolated EVs may be higher than the concentration of EVs present in unmanipulated conditioned media. According to some embodiments, the population of EVs comprises an enriched subpopulation of EVs that is at least 75%, at least 76%, at least 77%, at least 78%, at least 79%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% pure.

According to some embodiments, the EVs can be isolated from conditioned media and harvested from cultured MSCs containing metabolites, growth factors, RNA and proteins released into the medium by the cultured MSCs.

According to some embodiments, a method for harvesting EVs from MSCs involves first culturing MSCs under standard conditions until they reach about 70% confluency, and then culturing the cells in a serum-free media for 24 hours. The conditioned media is then collected and subjected to differential centrifugation at 400×g for 10 minutes and 12000×g for 10 minutes in order to remove whole cells and cellular debris, producing a clarified conditioned media. The clarified conditioned media then is concentrated by ultrafiltration using a 100 kDa MWCO filter (Millipore), and then centrifuged again at 12000×g for 10 minutes. EVs then are isolated using size exclusion chromatography by loading the concentrated clarified conditioned media on a PBS-equilibrated Chroma S-200 column (Clontech), eluting with PBS, and collecting fractions of 350-550 microliters. Fractions containing EVs are identified and potentially pooled. Protein concentration is measured using a standard Bradford assay (Bio-Rad). Aliquots of the enriched extracellular vesicle preparations can be stored at −80° C.

According to some embodiments, EVs also can be purified by ultracentrifugation of the clarified conditioned media at 100,000×g. According to some embodiments, they also can be purified by ultracentrifugation into a sucrose cushion. GMP methods for EV purification from dendritic cells have been described in J Immunol Methods. 2002; 270: 211-226, which is incorporated by reference herein.

According to some embodiments, EVs can be purified by differential filtration through nylon membrane filters of defined pore size. For example, a first filtration though a large pore size will retain cellular fragments and debris; a subsequent filtration through a smaller pore size will retain EVs and purify them from smaller size contaminants.

Methods of Treatment

According to some embodiments, a method for promoting wound healing in a subject in need thereof comprises contacting a wounded tissue of the subject with a first composition comprising a therapeutic amount of extracellular vesicles (EVs) derived from human amniotic fluid (AF), wherein the therapeutic amount is effective to reduce wound area and to promote repair of the wounded tissue. According to some embodiments, the EVs are derived from amniotic fluid mesenchymal stem cells (MSCs).

A "therapeutically effective amount," "therapeutic amount" or "effective amount" of a pharmaceutical composition comprising the EVs of the described invention is a predetermined amount calculated to achieve the desired biological effect. The activity contemplated by the described methods includes both medical therapeutic and/or prophylactic treatment, as appropriate. The specific dose of a composition administered according to the described invention to obtain a therapeutic and/or prophylactic therapeutic effect will, of course, be determined by the particular circumstances surrounding the case, including, for example, the composition administered, the route of administration, and the condition being treated. According to some embodiments, a standard effective dose of the pharmaceutical composition contains EVs derived from about $1\times10^5$ to about $1\times10^9$ MSCs, i.e., $1\times10^5$, $2\times10^5$, $3\times10^5$, $4\times10^5$, $5\times10^5$, $6\times10^5$, $7\times10^5$, $8\times10^5$, $9\times10^5$, $1\times10^6$, $2\times10^6$, $3\times10^6$, $4\times10^6$, $5\times10^6$, $6\times10^6$, $7\times10^6$, $8\times10^6$, $9\times10^6$, $1\times10^7$, $2\times10^7$, $3\times10^7$, $4\times10^7$, $5\times10^7$, $6\times10^7$, $7\times10^7$, $8\times10^7$, $9\times10^7$, $1\times10^8$, $2\times10^8$, $3\times10^8$, $4\times10^8$, $5\times10^8$, $6\times10^8$, $7\times10^8$, $8\times10^8$, $9\times10^8$, or $1\times10^9$ whole MSCs. However, it will be understood that the effective amount administered will be determined by the physician in the light of the relevant circumstances including the condition to be treated, the choice of composition to be administered, and the chosen route of administration, and therefore the above dosage ranges are not intended to limit the scope of the invention in any way. A therapeutically effective amount of composition of embodiments of this invention is typically an amount such that when it is administered in a physiologically tolerable excipient composition, it is sufficient to achieve an effective systemic concentration or local concentration in the tissue.

According to some embodiments, the composition is effective to promote wound healing by activating epithelial cells to transition to a mesenchymal cell phenotype (EMT). According to some embodiments, the composition is effective to increase mRNA levels of one or more of Vimentin, N-cadherin, Colla1, Acta2, or TGFbr2. According to some embodiments, the method further comprises the step of measuring a level of one or more of Vimentin, N-cadherin, Colla1, Acta2, or TGFbr2.

According to some embodiments, the contacting occurs topically, subcutaneously, nasally, intratracheally, orally, parenterally, intravenously, or intraperitoneally. The term "parenteral" as used herein refers to introduction into the body by means other than through the digestive tract, for example, without limitation, by way of an injection (i.e., administration by injection), including, for example, subcutaneously (i.e., an injection beneath the skin), intramuscularly (i.e., an injection into a muscle), intravenously (i.e., an injection into a vein), or infusion techniques. According to some embodiments, the contacting occurs topically or subcutaneously.

According to some embodiments, the subject is a human patient that has been diagnosed with or demonstrates symptoms of a wound. According to some embodiments, the subject is a human patient that has been diagnosed with or demonstrates symptoms of a chronic wound. According to some embodiments, the subject is a human patient that has been diagnosed with or is at risk of a wound progressing to a chronic wound. According to some embodiments, the subject is a human patient that has been diagnosed with or demonstrates symptoms of a diabetic ulcer, a pressure ulcer, or a venous ulcer. According to some embodiments, the subject is a human patient that has been diagnosed with or demonstrates symptoms of a burn.

According to some embodiments, the method further comprises the step of contacting the wounded tissue of the subject with a second composition comprising a therapeutic amount of EV-depleted AF, wherein the therapeutic amount of the second composition is effective to activate mesenchymal-to-epithelial transition (MET) and to promote repair of the wounded tissue. According to some embodiments, a length of time between contacting the tissue with the first composition and the second composition is from about 4 to about 24 hours, i.e. about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours. According to some embodiments, a length of time between contacting the tissue with the first composition and the second composition is greater than 24 hours. According to some embodiments, the second composition is effective to increase levels of Stat3 mRNA. STAT3 (signal transducer and activator of transcription 3) is a transcription factor that regulates expression of genes involved in late-stage wound healing such as epithelial cell proliferation, remodeling of the extracellular matrix, angiogenesis, and suppression of inflammation). According to some embodiments, the method further comprises the step of measuring a level of Stat3 mRNA.

According to some embodiments, the EVs are purified from amniotic fluid by one or more of: a) ultracentrifugation; b) sucrose density gradient centrifugation; c) column chromatography; d) size exclusion; or e) filtration through a device containing an affinity matrix selective towards the EVs. According to some embodiments, the EVs are further filtered by size. According to some embodiments, the EVs are characterized by an average diameter of from about 50 nm to about 200 nm. According to some embodiments, the EVs are characterized by an average diameter of from about 50 nm to about 1000 nm.

According to some embodiments, a two-stage method of promoting wound healing in a subject in need thereof comprises, in order: a. contacting the wound with a composition comprising extracellular vesicles (EVs) derived from amniotic fluid (AF) to promote early-stage wound healing in the subject; and b. contacting the wound with a composition comprising EV-depleted AF to promote late-stage wound healing in the subject. According to some embodiments, the early stage wound healing is characterized by activating epithelial-to-mesenchymal transition (EMT) and inducing cell migration, and the late stage wound healing is characterized by activating mesenchymal-to-epithelial transition (MET) and re-epithelialization of the wound. According to some embodiments, the EVs are derived from amniotic fluid mesenchymal stem cells (MSCs). According to some embodiments, the EVs are characterized by sedimentation at about 100,000×g, a buoyant density in sucrose of about 1.10-1.21 g/ml, and an average diameter of from about 50 nm to about 200 nm. According to some embodiments, the contacting is topically or subcutaneously.

According to some embodiments, a method for regulating a skin condition in a subject in need thereof comprises contacting skin of the subject with a composition comprising a therapeutic amount of extracellular vesicles (EVs) derived from human amniotic fluid (AF), wherein the therapeutic amount is effective to improve skin texture, reduce wrinkles, or both, thereby regulating the skin condition. According to some embodiments, the method further comprises microneedling of the skin prior to contacting with the composition. According to some embodiments, the composition is effective to regulate the skin condition by activating epithelial-to-mesenchymal transition (EMT).

Formulations

According to some embodiments, the composition further comprises a pharmaceutically acceptable carrier. The phrase "pharmaceutically acceptable carrier" is art recognized. It is used to mean any substantially non-toxic carrier conventionally useable for administration of pharmaceuticals in which the isolated exosomes of the present invention will remain stable and bioavailable. The pharmaceutically acceptable carrier must be of sufficiently high purity and of sufficiently low toxicity to render it suitable for administration to the mammal being treated. It further should maintain the stability and bioavailability of an active agent. The pharmaceutically acceptable carrier can be liquid or solid and is selected, with the planned manner of administration in mind, to provide for the desired bulk, consistency, etc., when combined with an active agent and other components of a given composition. Exemplary carriers include liquid or solid filler, diluent, excipient, solvent or encapsulating material, involved in carrying or transporting the subject agent from one organ, or portion of the body, to another organ, or portion of the body. Each carrier must be "acceptable" in the sense of being compatible with the other ingredients of the formulation and not injurious to the patient. Some examples of materials which can serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations. Suitable pharmaceutical carriers are described in "Remington's Pharmaceutical Sciences" by E. W. Martin, which is incorporated herein by reference in its entirety. According to some embodiments, the pharmaceutically acceptable carrier is sterile and pyrogen-free water. According to some embodiments, the pharmaceutically acceptable carrier is Ringer's Lactate, sometimes known as lactated Ringer's solution.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include: water soluble antioxidants, such as ascorbic acid, cysteine hydrochloride, sodium bisulfate, sodium metabisulfite, sodium sulfite and the like; oil-soluble antioxidants, such as ascorbyl palmitate, butylated hydroxyanisole (BHA), butylated hydroxytoluene (BHT), lecithin, propyl gallate, .alpha.-tocopherol, and the like; and metal chelating agents, such as citric acid, ethylenediamine tetraacetic acid (EDTA), sorbitol, tartaric acid, phosphoric acid, and the like.

Some examples of suitable carriers, excipients, and diluents include lactose, dextrose, sucrose, sorbitol, mannitol, starches, gum acacia, calcium phosphate alginates, calcium salicate, microcrystalline cellulose, polyvinylpyrrolidone, cellulose, tragacanth, gelatin, syrup, methyl cellulose, methyl- and propylhydroxybenzoates, talc, magnesium stearate, water, and mineral oil. The formulations can additionally include lubricating agents, wetting agents, emulsifying and suspending agents, preserving agents, sweetening agents or flavoring agents. The compositions may be formulated so as to provide quick, sustained, or delayed release of the active ingredient after administration to the patient by employing procedures well known in the art.

The local delivery of therapeutic amounts of a composition for the treatment of a lung injury or fibrotic lung disease can be by a variety of techniques that administer the compound at or near the targeted site. Examples of local delivery techniques are not intended to be limiting but to be illustrative of the techniques available. Examples include local delivery catheters, site specific carriers, implants, direct injection, or direct applications, such as topical application and, for the lungs, administration by inhalation.

Local delivery by an implant describes the surgical placement of a matrix that contains the pharmaceutical agent into the affected site. The implanted matrix releases the pharmaceutical agent by diffusion, chemical reaction, or solvent activators.

Specific modes of administration will depend on the indication. The selection of the specific route of administration and the dose regimen is to be adjusted or titrated by the clinician according to methods known to the clinician in order to obtain the optimal clinical response. The amount of active agent to be administered is that amount sufficient to provide the intended benefit of treatment. The dosage to be administered will depend on the characteristics of the subject being treated, e.g., the particular mammal or human treated, age, weight, health, types of concurrent treatment, if any, and frequency of treatments, and can be easily determined by one of skill in the art (e.g., by the clinician).

Pharmaceutical formulations containing the active agents of the described invention and a suitable carrier can be solid dosage forms which include, but are not limited to, tablets, capsules, cachets, pellets, pills, powders and granules; topical dosage forms which include, but are not limited to, solutions, powders, fluid emulsions, fluid suspensions, semi-solids, ointments, pastes, creams, gels, jellies, and foams; and parenteral dosage forms which include, but are not limited to, solutions, suspensions, emulsions, and dry powder; comprising an effective amount of a polymer or copolymer of the described invention. It is also known in the art that the active ingredients can be contained in such formulations with pharmaceutically acceptable diluents, fillers, disintegrants, binders, lubricants, surfactants, hydrophobic vehicles, water soluble vehicles, emulsifiers, buffers, humectants, moisturizers, solubilizers, preservatives and the like. The means and methods for administration are known in the art and an artisan can refer to various pharmacologic references for guidance. For example, *Modern Pharmaceu-*

*tics,* Banker & Rhodes, Marcel Dekker, Inc. (1979); and *Goodman & Gilman's The Pharmaceutical Basis of Therapeutics,* 6th Edition, MacMillan Publishing Co., New York (1980) can be consulted.

The pharmaceutical compositions of the described invention can be formulated for parenteral administration, for example, by injection, such as by bolus injection or continuous infusion. The pharmaceutical compositions can be administered by continuous infusion subcutaneously over a predetermined period of time. Formulations for injection can be presented in unit dosage form, e.g., in ampoules or in multi-dose containers, with an added preservative. The pharmaceutical compositions can take such forms as suspensions, solutions or emulsions in oily or aqueous vehicles, and can contain formulatory agents such as suspending, stabilizing and/or dispersing agents.

For oral administration, the pharmaceutical compostions can be formulated readily by combining the active agent(s) with pharmaceutically acceptable carriers well known in the art. Such carriers enable the actives of the disclosure to be formulated as tablets, pills, dragees, capsules, liquids, gels, syrups, slurries, suspensions and the like, for oral ingestion by a patient to be treated. Pharmaceutical preparations for oral use can be obtained by adding a solid excipient, optionally grinding the resulting mixture, and processing the mixture of granules, alter adding suitable auxiliaries, if desired, to obtain tablets or dragee cores. Suitable excipients include, but are not limited to, fillers such as sugars, including, but not limited to, lactose, sucrose, mannitol, and sorbitol; cellulose preparations such as, but not limited to, maize starch, wheat starch, rice starch, potato starch, gelatin, gum tragecanth, methyl cellulose, hydroxypropylmethylcellulose, sodium carboxymethylcellulose, and polyvinylpyrrolidone (PVP). If desired, disintegrating agents can be added, such as, but not limited to, the cross-linked polyvinyl pyrrolidone, agar, or alginic acid or a salt thereof such as sodium alginate.

Dragee cores can be provided with suitable coatings. For this purpose, concentrated sugar solutions can be used, which can optionally contain gum arabic, talc, polyvinyl pyrrolidone, carbopol gel, polyethylene glycol, and/or titanium dioxide, lacquer solutions, and suitable organic solvents or solvent mixtures. Dyestuffs or pigments can be added to the tablets or dragee coatings for identification or to characterize different combinations of active compound doses.

Pharmaceutical preparations that can be used orally include, but are not limited to, push-fit capsules made of gelatin, as well as soft, scaled capsules made of gelatin and a plasticizer, such as glycerol or sorbitol. The push-fit capsules can contain the active ingredients in admixture with filler such as, e.g., lactose, binders such as, e.g., starches, and/or lubricants such as, e.g., talc or magnesium stearate and, optionally, stabilizers. In soft capsules, the active compounds can be dissolved or suspended in suitable liquids, such as fatty oils, liquid paraffin, or liquid polyethylene glycols. In addition, stabilizers can be added. All formulations for oral administration should be in dosages suitable for such administration.

For buccal administration, the compositions can take the form of, e.g., tablets or lozenges formulated in a conventional manner.

For administration by inhalation, the compositions for use according to the described invention can be conveniently delivered in the form of an aerosol spray presentation from pressurized packs or a nebulizer, with the use of a suitable propellant, e.g., dichlorodifluoromethane, trichlorofluoromethane, dichlorotetrafluoroethane, carbon dioxide or other suitable gas. In the case of a pressurized aerosol, the dosage unit can be determined by providing a valve to deliver a metered amount. Capsules and cartridges of, e.g., gelatin for use in an inhaler or insufflator can be formulated containing a powder mix of the compound and a suitable powder base such as lactose or starch.

In addition to the formulations described previously, the compositions of the described invention can also be formulated as a depot preparation. Such long acting formulations can be administered by implantation (for example subcutaneously or intramuscularly) or by intramuscular injection.

Depot injections can be administered at about 1 to about 6 months or longer intervals. Thus, for example, the compositions can be formulated with suitable polymeric or hydrophobic materials (for example as an emulsion in an acceptable oil) or ion exchange resins, or as sparingly soluble derivatives, for example, as a sparingly soluble salt.

Pharmaceutical compositions comprising any one or plurality of the active agents disclosed herein also can comprise suitable solid or gel phase carriers or excipients. Examples of such carriers or excipients include but are not limited to calcium carbonate, calcium phosphate, various sugars, starches, cellulose derivatives, gelatin, and polymers such as, e.g., polyethylene glycols.

For parenteral administration, a pharmaceutical composition can be, for example, formulated as a solution, suspension, emulsion or lyophilized powder in association with a pharmaceutically acceptable parenteral vehicle. Examples of such vehicles are water, saline, Ringer's solution, dextrose solution, and 5% human serum albumin. Liposomes and nonaqueous vehicles such as fixed oils may also be used. The vehicle or lyophilized powder may contain additives that maintain isotonicity (e.g., sodium chloride, mannitol) and chemical stability (e.g., buffers and preservatives). The formulation is sterilized by commonly used techniques.

The described invention relates to all routes of administration including subcutaneous, topical, intramuscular, sublingual, intravenous, intraperitoneal, intranasal, intratracheal, intradermal, intramucosal, intracavernous, intrarectal, into a sinus, gastrointestinal, intraductal, intrathecal, intraventricular, intrapulmonary, into an abscess, intraarticular, subpericardial, into an axilla, into the pleural space, intradermal, intrabuccal, transmucosal, transdermal, via inhalation, and via nebulizer. Alternatively, the pharmaceutical composition may be introduced by various means into cells that are removed from the individual. Such means include, for example, microprojectile bombardment, via liposomes or via other nanoparticle device.

According to some embodiments, the pharmaceutical compositions of the claimed invention comprises one or more therapeutic agent other than the EVs as described. Examples of such additional active therapeutic agents include one or more analgesics, anti-inflammatory agents, or antimicrobial agents.

Examples of analgesics include codeine, hydrocodone, oxycodone, methadone, hydromorphone, morphine, and fentanyl.

Examples of anti-inflammatory agents include aspirin, celecoxib, diclofenac, diflunisal, etodolac, ibuprofen, indomethacin, ketoprofen, ketorolac nabumetone, naproxen, nintedanib, oxaprozin, pirfenidone, piroxicam, salsalate, sulindac, and tolmetin.

Examples of antimicrobial agents include, without limitation, antibiotics, such as, for example, bacitracin, mafenide, mupirocin, neomycin, silver sulfadiazine, curcumin, and honey; and antiseptics, such as, for example, biguanide, silver, iodine, and chlorine compounds.

According to the foregoing embodiments, the pharmaceutical composition may be administered once, for a limited period of time or as a maintenance therapy over an extended period of time, for example until the condition is ameliorated, cured or for the life of the subject. A limited period of time may be for 1 week, 2 weeks, 3 weeks, 4 weeks and up to one year, including any period of time between such values, including endpoints. According to some embodiments, the pharmaceutical composition may be administered for about 1 day, for about 3 days, for about 1 week, for about 10 days, for about 2 weeks, for about 18 days, for about 3 weeks, or for any range between any of these values, including endpoints. According to some embodiments, the pharmaceutical composition may be administered for more than one year, for about 2 years, for about 3 years, for about 4 years, or longer.

According to the foregoing embodiments, the composition or pharmaceutical composition may be administered less than once daily (e.g., on alternate days), once daily, twice daily, three times daily, four times daily or more.

All referenced journal articles, patents, and other publications are incorporated by reference herein in their entirety.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials have been described. All publications mentioned herein are incorporated herein by reference to disclose and described the methods and/or materials in connection with which the publications are cited.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed.

Example 1: Amniotic Fluid Derived Exosomes Promote Wound Healing by Activating Epithelial to Mesenchymal Transition Both extracellular vesicle (EV)/exosome-based products and human amniotic fluid (AF) receive significant attention for potential regenerative medicine applications. However, the mechanism of action through which any beneficial effects on target cell types are exerted is unknown. Here, we tested the hypothesis that amniotic fluid exosomes are required to promote wound healing modeled in vitro.

An epithelial-mesenchymal transition (EMT) is a biologic process that allows a polarized epithelial cell, which normally interacts with basement membrane via its basal surface, to undergo multiple biochemical changes that enable it to assume a mesenchymal cell phenotype, which includes enhanced migratory capacity, invasiveness, elevated resistance to apoptosis, and greatly increased production of ECM components (Kalluri, R. and Weinberg, R A, J. Clin. Invest. (2009) 119: 1420-1428, citing Kalluri R., Neilson E. G. J. Clin. Invest. 2003; 112:1776-1784). The completion of an EMT is signaled by the degradation of underlying basement membrane and the formation of a mesenchymal cell that can migrate away from the epithelial layer in which it originated (Id.).

The EMTs that are associated with implantation, embryo formation, and organ development are organized to generate diverse cell types that share common mesenchymal phenotypes. This class of EMTs ("type 1 EMTs") neither causes fibrosis nor induces an invasive phenotype resulting in systemic spread via the circulation (Id., citing Zeisberg M., Neilson E. G. J. Clin. Invest. 2009; 119: 1429-1437). Among other outcomes, these type 1 EMTs can generate mesenchymal cells (primary mesenchyme) that have the potential to subsequently undergo a mesenchymal-epithelial transition (MET), which involves the conversion of mesenchymal cells to epithelial derivatives to generate secondary epithelia) (Id.).

Type 2 EMTs are associated with wound healing, tissue regeneration, and organ fibrosis (Id.). In type 2 EMTs, the program begins as part of a repair-associated event that normally generates fibroblasts and other related cells in order to reconstruct tissues following trauma and inflammatory injury. However, in contrast to type 1 EMTs, these type 2 EMTs are associated with inflammation and cease once inflammation is attenuated, as is seen during wound healing and tissue regeneration. In the setting of organ fibrosis, type 2 EMTs can continue to respond to ongoing inflammation, leading eventually to organ destruction. Tissue fibrosis is in essence an unabated form of wound healing due to persistent inflammation (Id.).

Type 3 EMTs occur in neoplastic cells that have previously undergone genetic and epigenetic changes, specifically in genes that favor clonal outgrowth and the development of localized tumors. These changes, notably affecting oncogenes and tumor suppressor genes, conspire with the EMT regulatory circuitry to produce outcomes far different from those observed in the other two types of EMT. Carcinoma cells undergoing a type 3 EMT may invade and metastasize and thereby generate the final, life-threatening manifestations of cancer progression. Importantly, cancer cells may pass through EMTs to differing extents, with some cells retaining many epithelial traits while acquiring some mesenchymal ones and other cells shedding all vestiges of their epithelial origin and becoming fully mesenchymal. It is still unclear what specific signals induce type 3 EMTs in carcinoma cells (Id.).

A number of distinct molecular processes are engaged in order to initiate an EMT and enable it to reach completion. These include activation of transcription factors, expression of specific cell-surface proteins, reorganization and expression of cytoskeletal proteins, production of ECM-degrading enzymes, and changes in the expression of specific microRNAs. In many cases, the involved factors are also used as biomarkers to demonstrate the passage of a cell through an EMT (Id.).

The reverse process, mesenchymal—epithelial transition (MET), can similarly generate epithelial cells. MET events are defined as those in which mesenchymal cells lose their motile, migratory properties and acquire cell polarity and adhesion to epithelia. MET and EMT both occur in normal tissue, including gastrulating and regenerating tissue, as well as in abnormal tissues of fibrotic organs or tumors (Li B, et al. PLoS One. 2011; 6(2): e17092, citing Kalluri R, Weinberg R A. The Journal of clinical investigation. 2009; 119: 1420; Polyak K, Weinberg R A. Nat Rev Cancer. 2009; 9: 265-273). Thus, there is a strong relationship between EMT/MET and stem cells. Indeed, EMT drives mammary epithelial cells to de-differentiate into mammary stem cells and cancer stem cells which are mesenchymal-like (Id., citing Mani S A, et al. Cell. 2008; 133: 704-715). Moreover, induced pluripotent stem cells (iPSCs) are derived from mouse embryonic fibroblasts (MEF) by MET at the early stage of reprogramming (Id., citing Polo J M, Hochedlinger K. Cell Stem Cell. 2010; 7: 5-6; Li R, et al. Cell Stem Cell. 2010; 7: 51-63; Samavarchi-Tehrani P, et al. Cell Stem Cell. 2010; 7: 64-77). These results suggest the possibility that MET is associated with stem cell activities.

In order to identify EMT/MET, vimentin is widely applied as a mesenchymal indicator (Id., citing Kalluri R, Weinberg R A. The Journal of clinical investigation. 2009; 119: 1420; Mani S A, et al. Cell. 2008; 133: 704-715; Arias A M. Cell. 2001; 105: 425-431; Thiery J P, et al. Cell. 2009; 139: 871-890; Gershengorn M C, et al. Science. 2004; 306: 2261-2264; Thiery J P. Nature Reviews Cancer. 2002; 2: 442-454). Vimentin is an intermediate filament protein functionally involved in maintaining the structure of mesenchymal cells (Id., citing Stenger A M, et al. Molecular Brain Research. 1992; 13: 273-275). In addition to being associated with migration and proliferation of mesenchymal cells, vimentin is an indicator of cell morphology transformation or cytoskeleton reorganization (Id., citing Venetianer A, et al. Nature. 1983; 305: 730-733; Hedberg K K, Chen L B. Experimental cell research. 1986; 163: 509-517). In mouse embryonic gastrulation, vimentin increases in fibroblasts that delaminate through the primitive streak to become mesoderm (Id., citing Eckes B, et al. J Cell Sci. 2000; 113 (Pt 13): 2455-2462; Lane E B, et al. Nature. 1983; 303: 701-704; Franke W W, et al. Differentiation. 1982; 23: 43-59), indicating that vimentin plays a role in cell transformation and tissue construction. Moreover, vimentin is closely related to loss of polarity of the plasma membrane in fiber cells (Id., citing Oriolo A S, et al. Experimental cell research. 2007; 313: 2255-2264), and cell adhesion and polarization are associated with decreasing vimentin (Id., citing Nieminen M, et al. Nature cell biology. 2006; 8: 156-162).

Whereas EMT is associated with reactivation or reprogramming of epithelial cells, MET appears to drive stem cells into a quiescent state (Id., citing Mani S A, et al. Cell. 2008; 133: 704-715; Spaderna S, et al. Verh Dtsch Ges Pathol. 2007; 91: 21-28). MET is also involved in other cell inactivation, for example, in wound healing, activated fibroblasts lose cell polarity, migrate into the wound site and differentiate into keratinocytes (Id., citing Eckes B, et al. J Cell Sci. 2000; 113 (Pt 13): 2455-2462), a process driven by MET.

Methods

Amniotic Fluid (AF) Procurement and Processing.

AF was donated from full-term, elective caesarean deliveries screened and determined to be negative for infectious disease, or Dermacyte™ (purified AF) was donated for study by Merakris Therapeutics. Donor AF was then subject to serial centrifugation at 4° C., passed through a 0.2 µm filter, and either used immediately or stored at −80° C. AF exosomes were purified using the ExoQuick TC-ULTRA kit (SBI Biosciences) according to the manufacturer's specifications, filtered within a 50-200 nm size range from Dermacyte Liquid, then quantitative and qualitative analysis was performed with the ZetaSizer (Malvern Panalytical).

Cell Culture and Scratch Test Assays.

Mouse C2C12 myoblasts and MMM fibroblasts were routinely cultured in DMEM+10% FBS with 1% penicillin/streptomycin (complete media) in standard TC-treated Corning plasticware. Scratch test assays were performed by expanding C2C12 or MMM cells to approximately 70-90% confluence in complete media, then adding media type of interest, such as serum-free media (SFM; consisting of 50% IMDM (Gibco), 50% F12 (Gibco), 1 mg/ml polyvinyl alcohol (Sigma), 1% chemically-defined lipid concentrate (Gibco), 450 04 monothioglycerol (Sigma)) alone, SFM+10% AF, SFM+AF extracellular vesicles (EVs)/exosomes, or SFM+10% EV/exosome-depleted AF. The cells were allowed to equilibrate in each media type of interest for 2 h, then a vertical scratch was made with 200 µl sized standard micropipette tip. Detached cells were aspirated from the well and media replaced. A horizontal line was drawn on the bottom of each well as a reference point and brightfield microscopy using a 20× objective was used to record photographs at each timepoint by taking a picture of the scratch either above or below (or both) the horizontal line consistently throughout the timecourse. The area of the scratches was determined by measuring pixel counts in ImageJ software, and plotted as mean measurement of absolute pixel counts or area relative to scratch at time zero with error bars denoting standard deviation. Statistical significance was tested using the student's t-test.

RNA Extraction and RT-qPCR.

Twenty four hours after scratch test assays were performed on C2C12 myoblasts, the cells were lysed and RNA extracted (ReliaPrep, Promega) and quantitated using a NanoDrop (ThermoScientific). 100 ng total RNA was used for reverse transcription with SuperScript III enzyme (ThermoScientific), then resulting cDNAs were diluted 5-10× and 2 µl used as input in 20 µl qPCR reactions using 2×SYBR Power MasterMix (Applied Biosystems) run for 40 cycles on the ABI StepOnePlus qPCR Thermal Cycler (Applied Biosystems). The $2^{\Delta\Delta Ct}$ method was used to determine RNA abundances relative to Hmbs, a housekeeping gene. Product specificity was confirmed with melt curve analysis. Primer sequences are as follows:

```
mHmbs_qF
                                              (SEQ ID NO: 1)
5'-CAGAGAAAGTTCCCCCACCT-3' mHmbs_qR
                                              (SEQ ID NO: 2)
5'-AATTCCTGCAGCTCATCCAG-3' mVimentin_qF
                                              (SEQ ID NO: 3)
5'-AAACGAGTACCGGAGACAGGT-3' mVimentin_qR
                                              (SEQ ID NO: 4)
5'-TCTCTTCCATCTCACGCATCT-3' mCol1a1_qF
                                              (SEQ ID NO: 5)
5'-GCCAAGAAGACATCCCTGAA-3'
```

-continued

```
mCol1a1_qR
                                        (SEQ ID NO: 6)
5'-CAGATCAAGCATACCTCGGG-3' mTgfbr2_qF
                                        (SEQ ID NO: 7)
5'-TGGACCCTACTCTGTCTGTGG-3' mTgfbr2_qR
                                        (SEQ ID NO: 8)
5'-ACTCCACGTTTTCCAGATTCA-3' mActa2_qF
                                        (SEQ ID NO: 9)
5'-ACTGGGACGACATGGAAAAG-3' mActa2_qR
                                        (SEQ ID NO: 10)
5'-GTTCAGTGGTGCCTCTGTCA-3' mN-Cad_qF
                                        (SEQ ID NO: 11)
5'-GGACATCATCACTGTGGCAG-3' mN-Cad_qR
                                        (SEQ ID NO: 12)
5'-TTCCATGTCTGTGGCTTGAA-3' mE-Cad_qF
                                        (SEQ ID NO: 13)
5'-CCGGGACTCCAGTCATAGG-3' mE-Cad_qR
                                        (SEQ ID NO: 14)
5'-CAGCTCTGGGTTGGATTCAG-3'
```

Results

FIG. 1 shows representative brightfield microscopy images of C2C12 myoblasts during the scratch test wound healing assay at time 0, 12, 18, and 24 hours, incubated with unconditioned serum-free media+10% amniotic fluid (uncSFM+AF), uncSFM with an equal amount of exosomes derived from amniotic fluid as that in uncSFM+10% AF (uncSFM+AFexos), or uncSFM plus 10% exosome-depleted amniotic fluid (uncSFM+exo(-)AF). Results from this assay are quantified in FIG. 2. uncSFM with 10% exosome/EV-depleted AF exhibited little decrease in scratch area percentage over 24 hours. However, both uncSFM with 10% AF and uncSFM with 10% AF exosomes/EVs showed significantly increased closure of scratch area over 24 hours, as compared to exosome/EV-depleted AF results.

Figure 3:
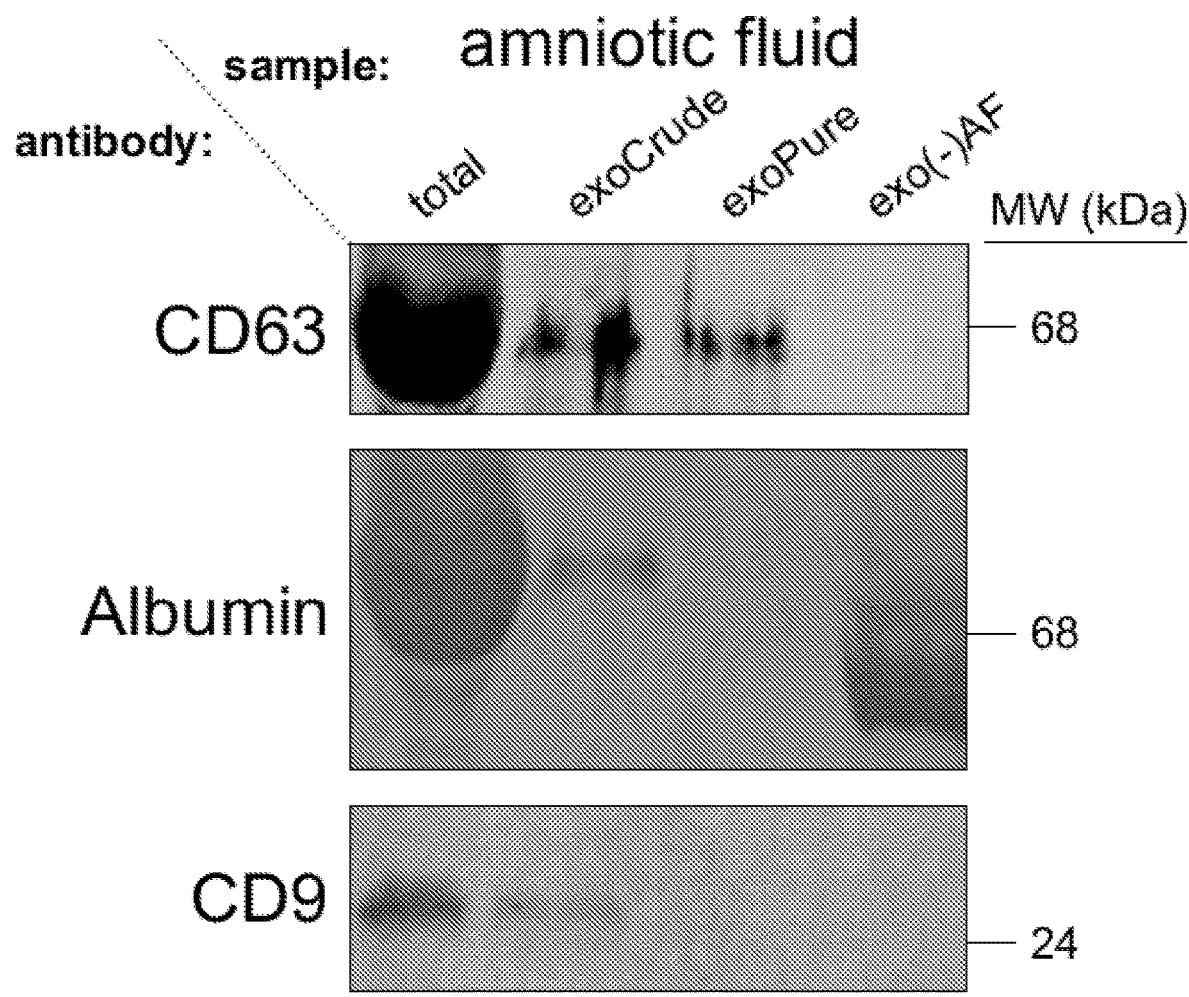
FIG. 3 is a picture showing Western blot analysis of total amniotic fluid (AF; total), crude fraction of exosome purification from amniotic fluid using ExoQuick TC-ULTRA kit (SBI Biosciences; exoCrude), purified fraction/eluate from ExoQuick TC-ULTRA kit (SBI Biosciences; exoPure), or exosome-depleted AF (exo(−)AF). Antibodies used to probed for CD63, Albumin, and CD9 are denoted on left, and molecular weight in kilodaltons (kDa) are shown on the right.

FIG. 3 shows a Western blot analysis comparing levels of CD63 and CD9 (markers for exosomes/EVs) in total amniotic fluid (AF; total), a fraction of exosomes purified from AF using ExoQuick TC-ULTRA kit (SBI Biosciences; exoCrude), a purified fraction/eluate from ExoQuick TC-ULTRA kit (SBI Biosciences; exoPure), and exosome-depleted AF (exo(-)AF). CD63, and to a lesser extent CD9, were present in all fractions except exosome-depleted AF. Albumin is abundant in AF, so it is used as a marker to indicate the removal of contaminants from purified exosomes.

Figure 2:
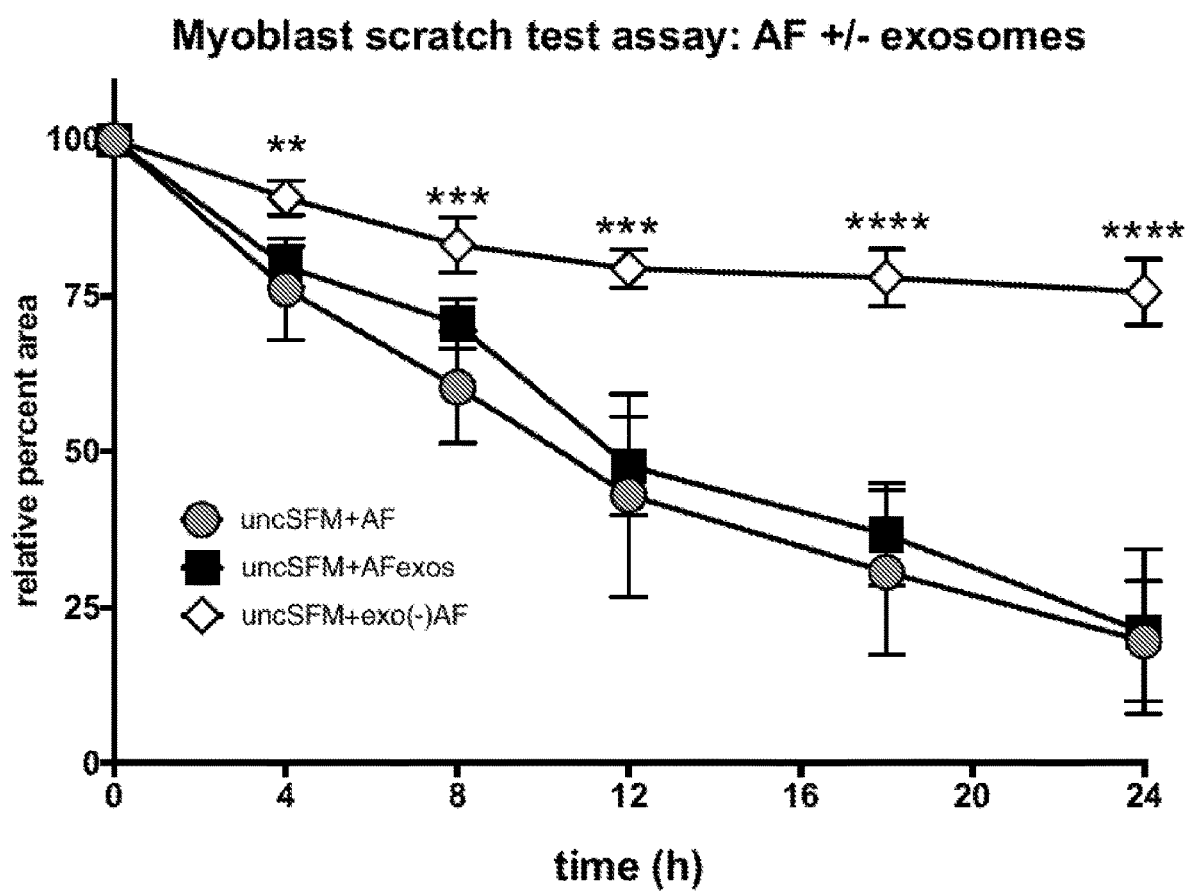
FIG. 2 is a graph showing quantitation of scratch area (in percent area relative to total scratch at time zero) in conditions described in FIG. 1. Area was calculated using ImageJ software and six independent replicates for each condition and timepoint were measured. Each datapoint shows the mean area percent relative to that at time zero, +/−standard deviation (*$P\leq 0.05$, $P<0.01$, *$P<0.001$, ****$P<0.0001$ by student's t-test, relative to uncSFM+AF or uncSFM+AFexos).
Figure 4:
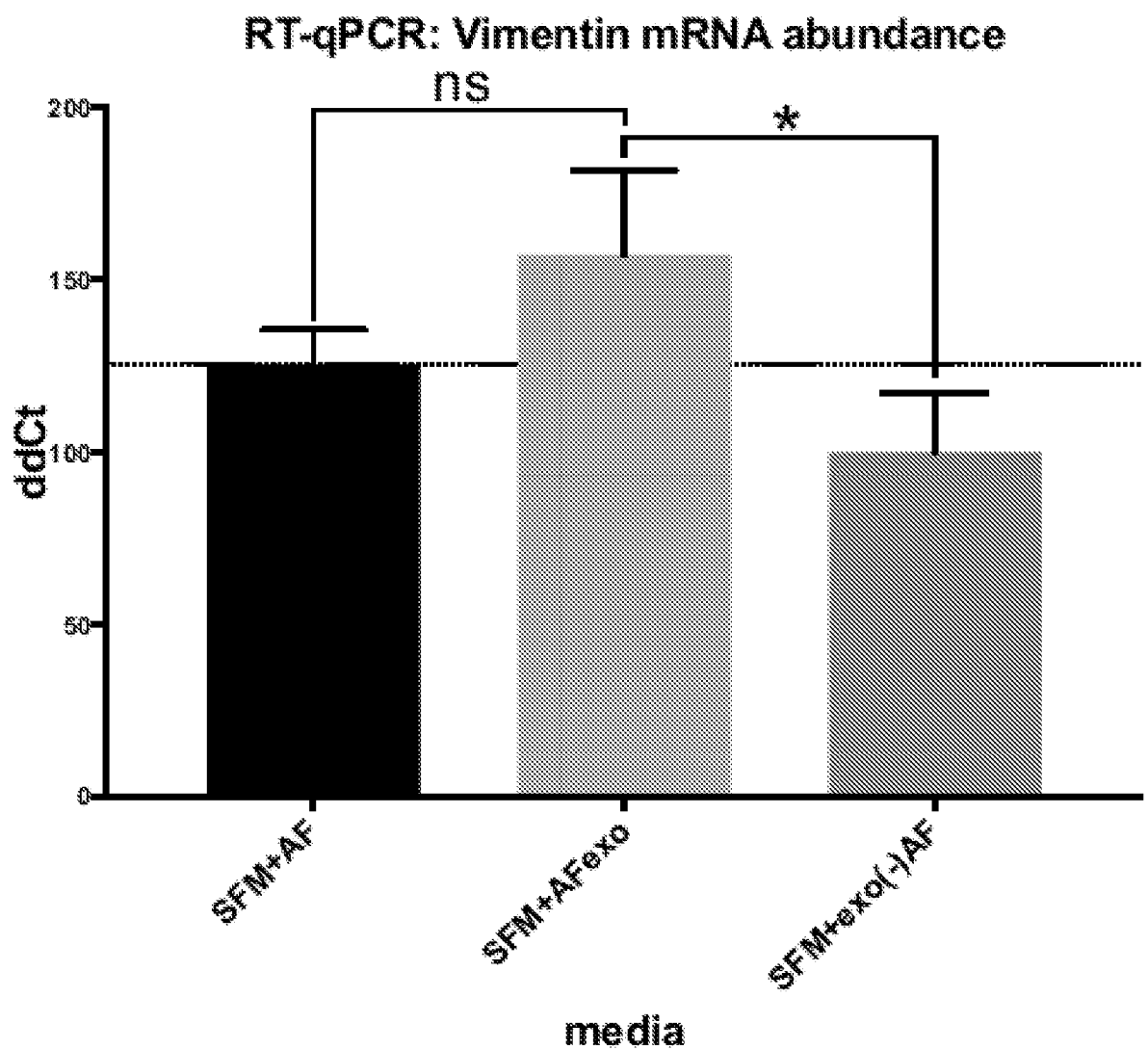
FIG. 4 is a graph showing the relative abundance of Vimentin mRNA in conditioned media from amniotic fluid fractions in the myoblast scratch test assay.

These experiments show that purified AF-EVs are necessary and sufficient for the wound area closure/migration effect observed in FIGS. 1 and 2. The migration is important for early stage healing events such as cell mobilization and activation that initiates wound tissue remodeling. Depleting EVs from AF inhibits migration and the epithelial-to-mesenchymal transition (EMT), as indicated by the decreased level of vimentin mRNA in exosome-depleted AF (FIG. 4). EV-depleted AF instead promotes re-epithelialization, a required "late stage" event in wound healing, which serves to revert the mobilized/activated cells back to their normal quiescent state.

Figure 5:
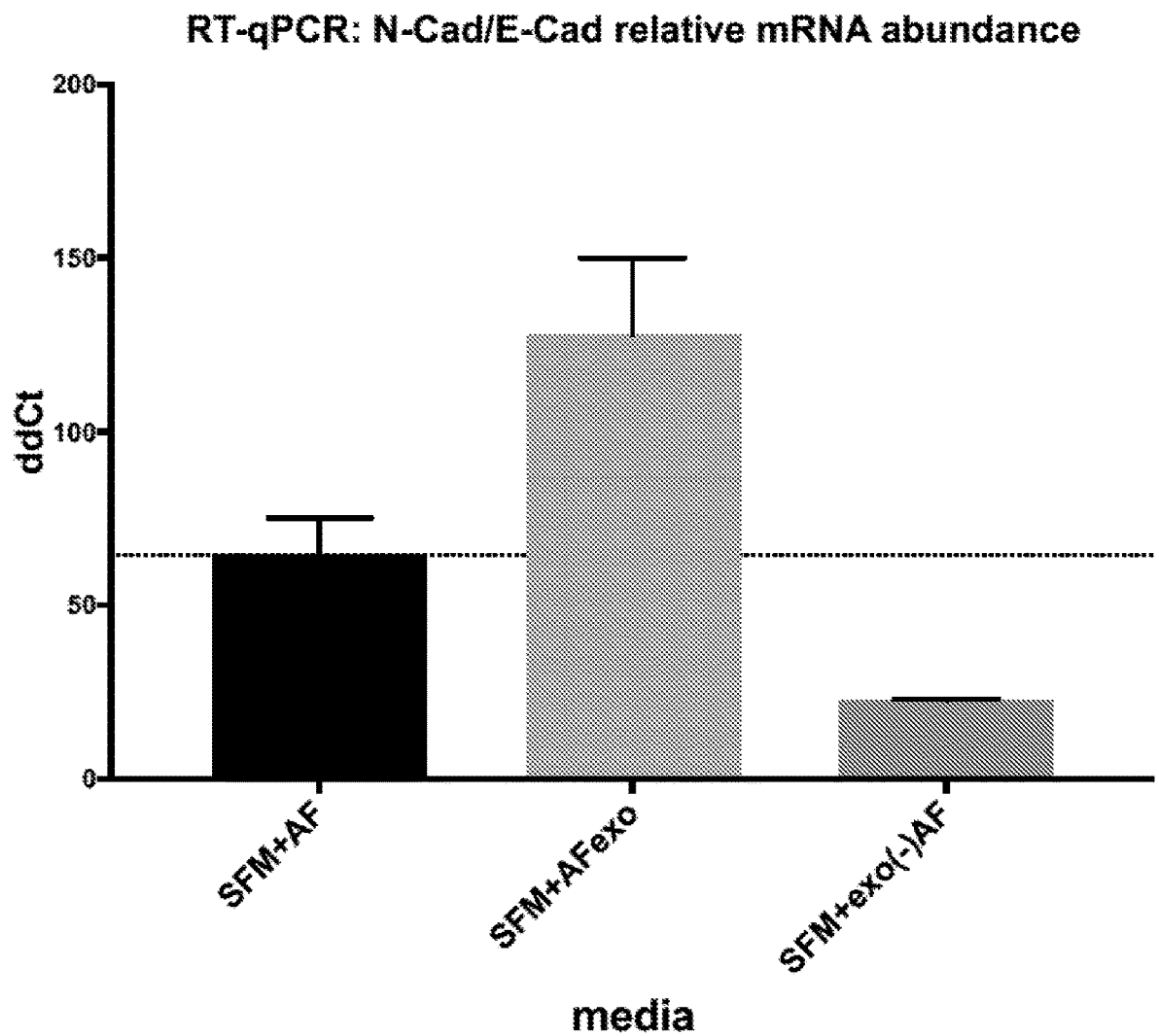
FIG. 5 is a graph showing the relative abundance of N-Cad/E-Cad mRNA ratio in conditioned media from amniotic fluid fractions in the myoblast scratch test assay.
Figure 6:
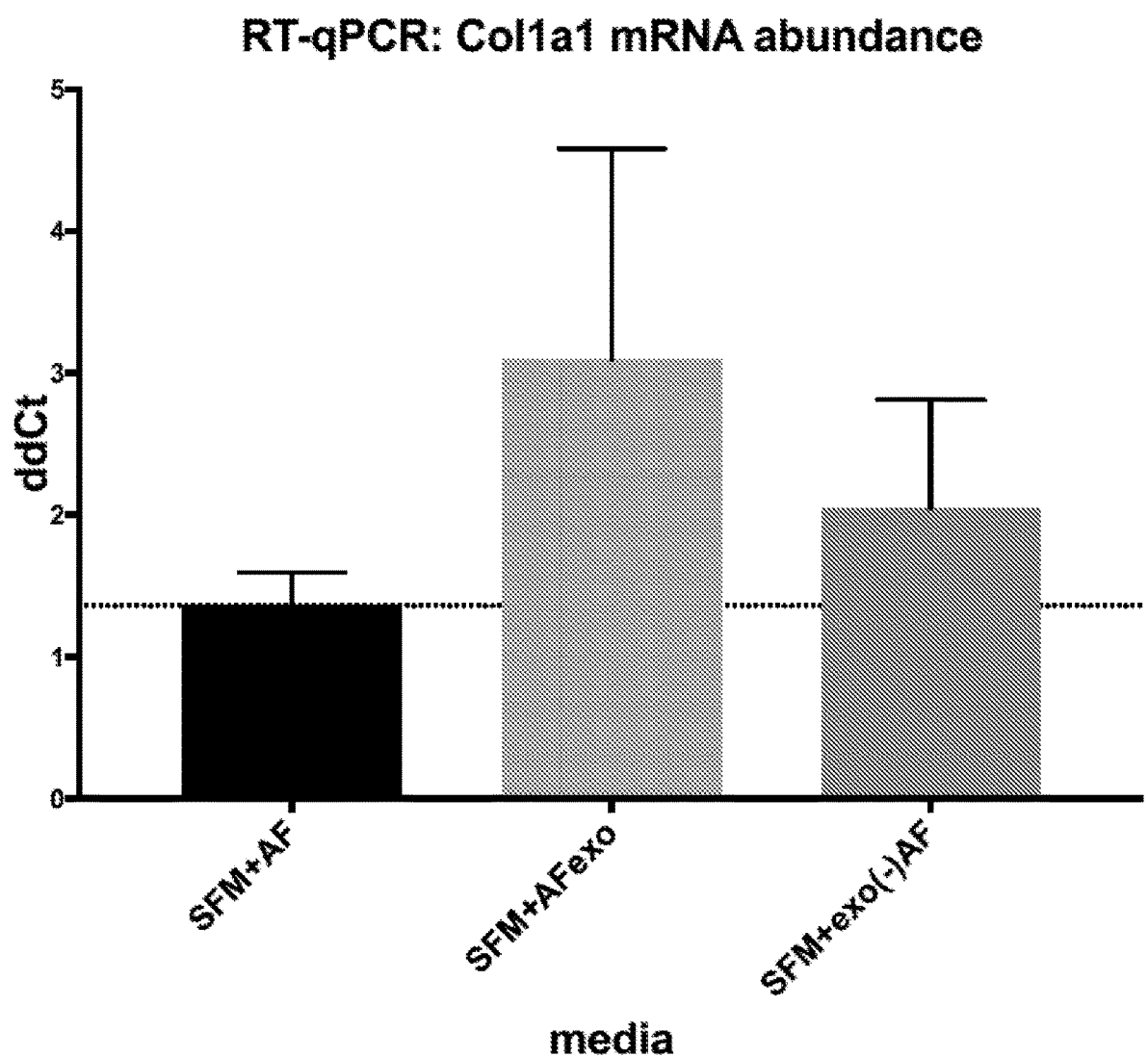
FIG. 6 is a graph showing the relative abundance of Col1a1 mRNA in conditioned media from amniotic fluid fractions in the myoblast scratch test assay.
Figure 7:
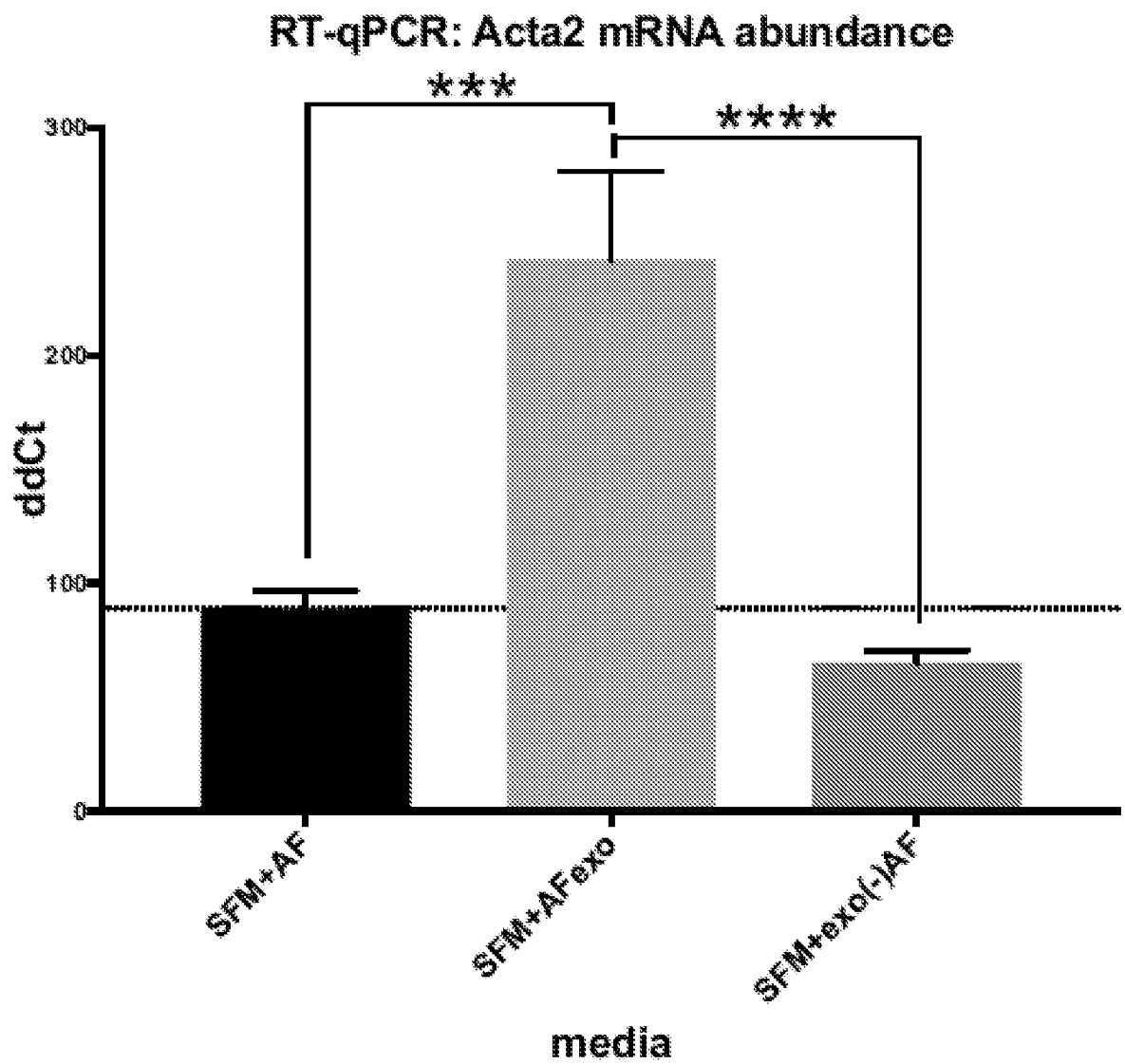
FIG. 7 is a graph showing the relative abundance of Acta2 mRNA in conditioned media from amniotic fluid fractions in the myoblast scratch test assay.
Figure 8:
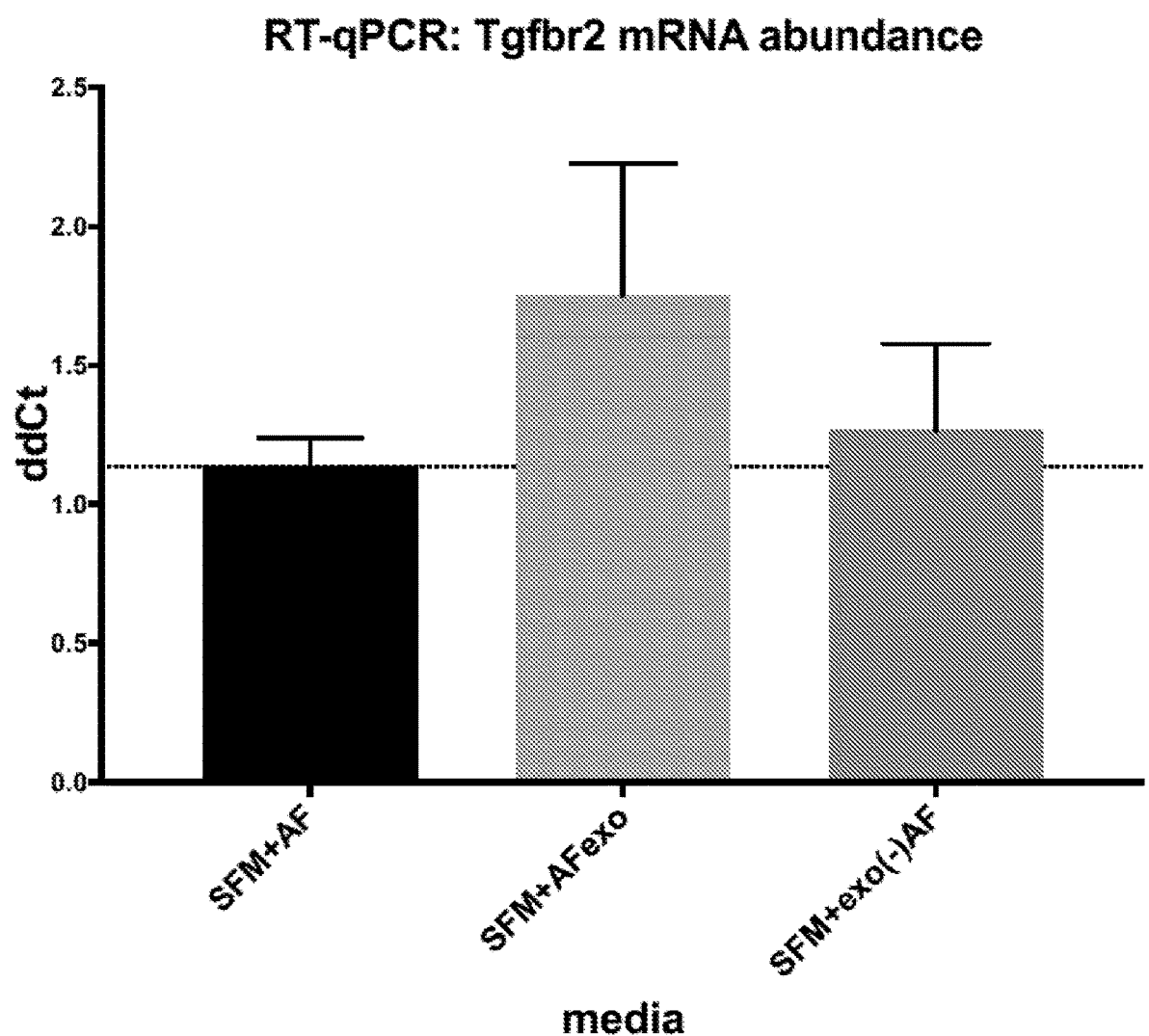
FIG. 8 is a graph showing the relative abundance of Tgfbr2 mRNA in conditioned media from amniotic fluid fractions in the myoblast scratch test assay.
Figure 9:
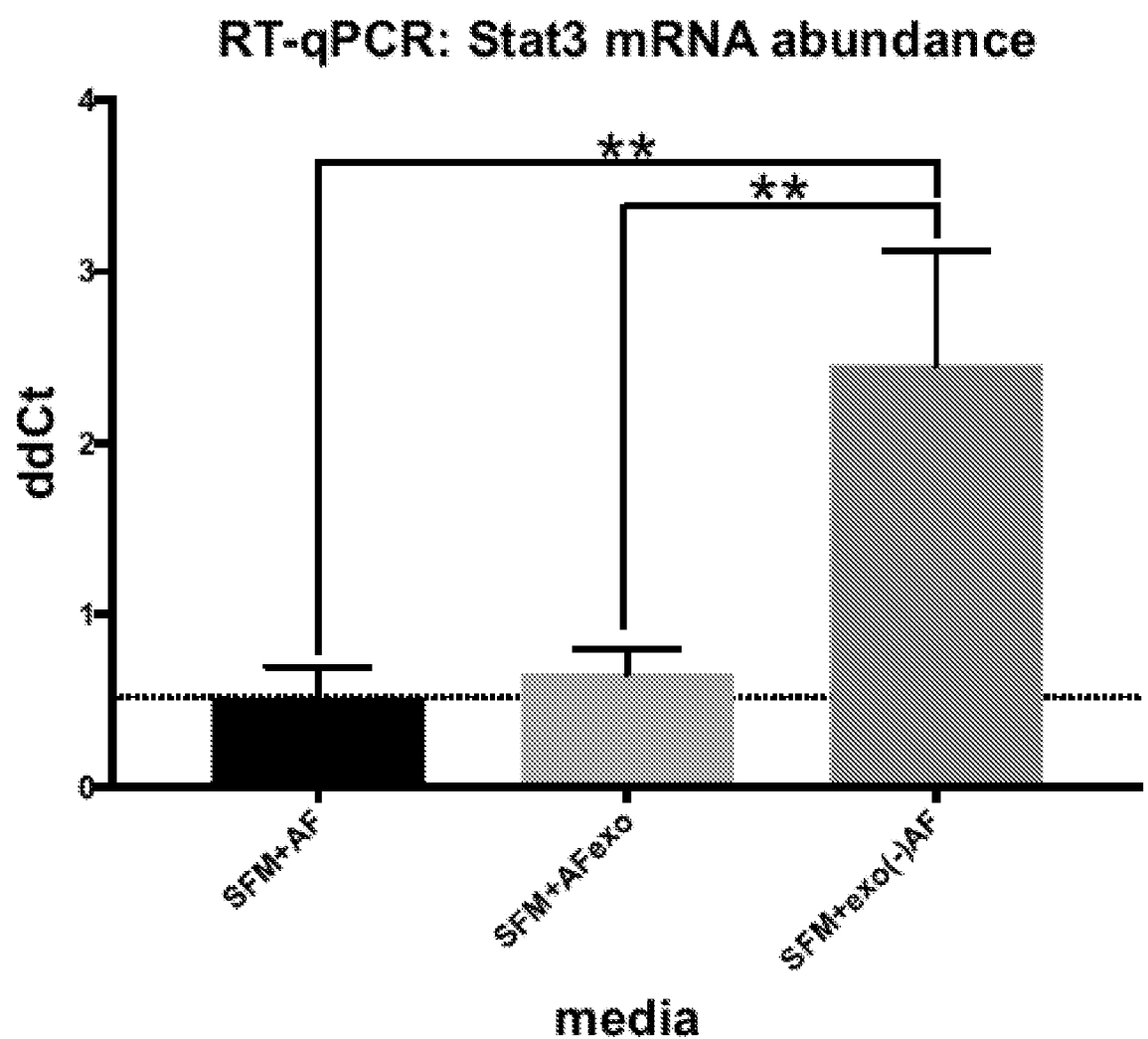
FIG. 9 is a graph showing the relative abundance of Stat3 mRNA in conditioned media from amniotic fluid fractions in the myoblast scratch test assay.

These opposite effects are mediated through EMT with the AF-EVs, but through MET with the EV-depleted AF. This is supported by the observation that Vimentin mRNA (FIG. 4; although not significant) and the N-Cadherin/E-Cadherin mRNA ratio (FIG. 5; indicates increased EMT) increased in AF-EV treated myoblasts but were reduced in EV-depleted AF cultured cells. Evidence of "mobilization/activation" that can initiate cell/tissue remodeling derive from the observation that Col1a1 (collagen, type I, alpha1; an abundant collagen present in repaired tissue) (FIG. 6) and Acta2 (alpha-actin-2; a protein involved in cell motility and marker of myofibroblast formation) (FIG. 7) levels are up in AF-EV treated cells but down or unchanged in EV-depleted AF treated cells. This effect may be mediated by an increase in TGFβ signaling, as TGFbr2 (transforming growth factor, beta receptor II; a marker for cell proliferation) expression (FIG. 8) is up in AF-EV treated cells but unchanged in EV-depleted AF treated cells. Conversely, EV-depleted AF showed increased levels of STAT3 (signal transducer and activator of transcription 3; a transcription factor that regulates expression of genes involved in late-stage wound healing such as epithelial cell proliferation, remodeling of the extracellular matrix, angiogenesis, and suppression of inflammation), while AF-EV treated cell levels were unchanged (FIG. 9).

Figure 10:
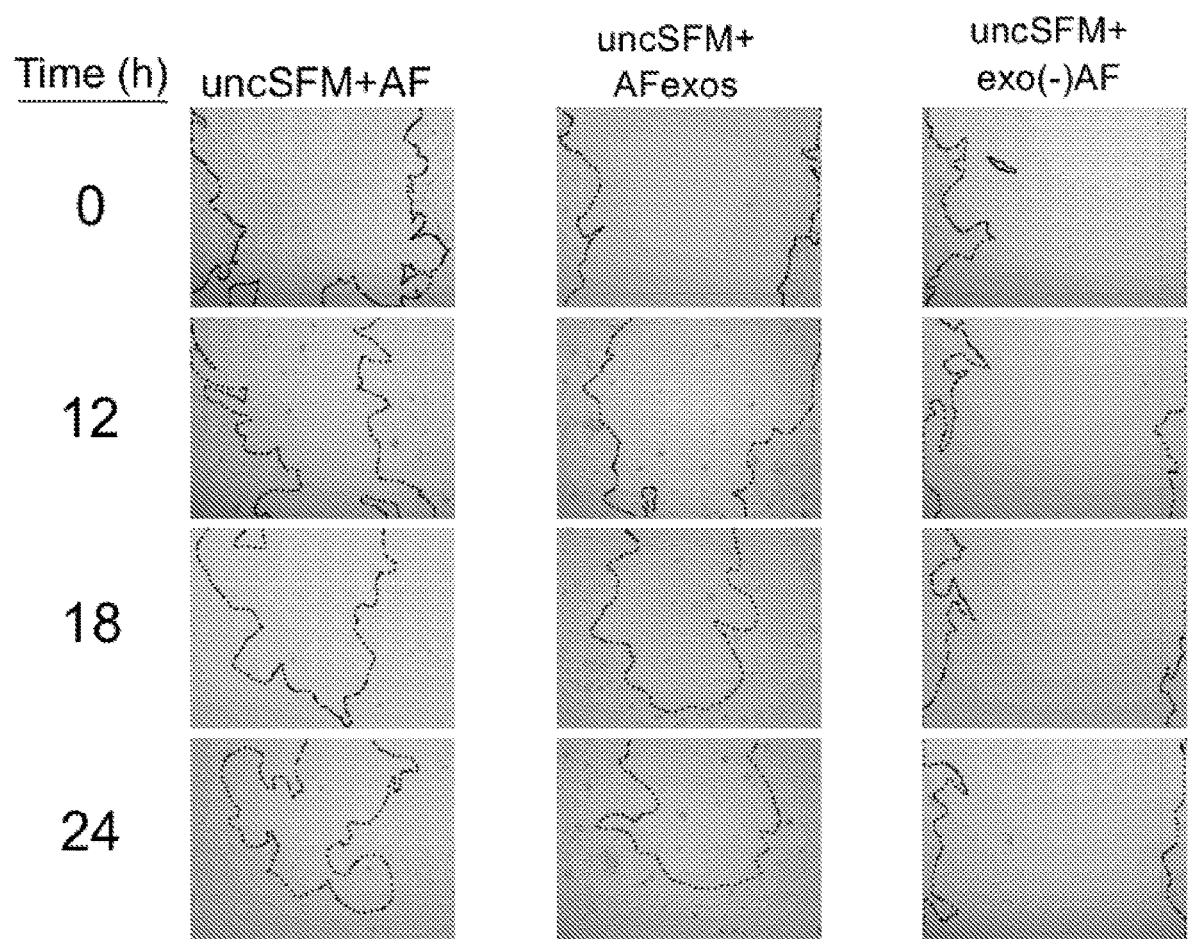
FIG. 10 is a series of representative images showing brightfield microscopy (20× objective) of MMM fibroblasts during scratch test wound healing assay at time 0, 12, 18, and 24 hours incubated with unconditioned serum-free media+10% amniotic fluid (uncSFM+AF), uncSFM with an equal amount of exosomes derived from amniotic fluid as that in uncSFM+10% AF (uncSFM+AFexos), or uncSFM plus 10% exosome-depleted amniotic fluid (uncSFM+exo (−)AF). Dotted lines outline area not occupied by cells; scale bar denotes 50 μm.
Figure 11:
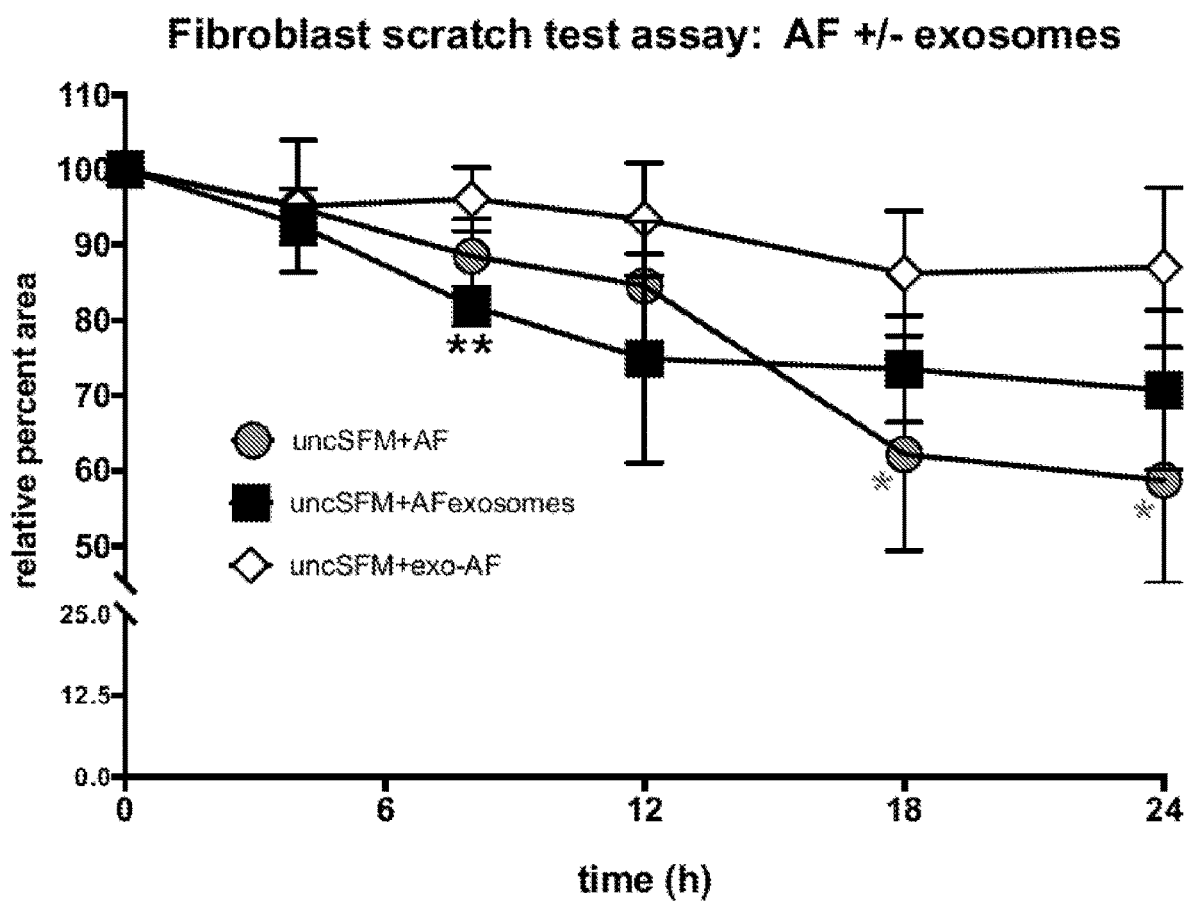
FIG. 11 is a graph showing quantitation of scratch area (in percent area relative to total scratch at time zero) in conditions described in FIG. 10. Area was calculated using ImageJ software and six independent replicates for each condition and timepoint were measured. Each datapoint shows the mean area percent relative to that at time zero, +/−standard deviation (*P≤0.05 and **P≤0.01 by student's t-test, relative to uncSFM+AF or uncSFM+AFexos).

Similar results were seen when the scratch test wound healing assay was repeated using MMM fibroblasts. FIG. 10 shows representative brightfield microscopy images at time 0, 12, 18, and 24 hours, with results quantified in FIG. 11. uncSFM with 10% exosome/EV-depleted AF exhibited little decrease in scratch area percentage over 24 hours. However, both uncSFM with 10% AF and uncSFM with 10% AF exosomes/EVs showed increased closure of the scratch area over 24 hours, as compared to exosome/EV-depleted AF.

Conclusions.

AF-EVs promote wound healing in an in vitro model by activating EMT. Conversely, AF that is depleted of EVs potently represses cell migration and EMT. These findings suggest a two-phase approach to wound treatment, in which AF-EVs are delivered early to induce cell migration, and then late events like re-epithelialization/MET are activated using AF depleted of EVs, could provide superior outcomes.

Example 2: Topical Bioactive Cosmetic

Introduction

Current regenerative cosmetic therapies use exfoliation techniques such as microderm abrasion or microneedling to transdermally deliver bioactive preparations. Delivery of large biologic molecules into the dermis is limited, and partially dependent on exfoliation and other mechanical disruptive forces. Bioactive preparations historically include autologous platelet rich plasma (PRP) and growth factor serums, however, they require lengthy (and potentially painful) preparation time, have inconsistent formulations, and uncertain safety profiles.

To bypass these issues, a treatment was developed and optimized that combines exfoliation and microneedling to disrupt the dermis with generous application of an amniotic fluid-based bioactive preparation (commercially available as Celexoderm™ Skin Rejuvenation Serum). Based on the presence of the AF components and the body of literature indicating AF can safely promote skin regeneration, we hypothesized that transdermal delivery of amniotic proteins and other biomolecules via this preparation would result in wrinkle reduction and tighter skin.

The primary objective was to evaluate the wrinkle-smoothing properties of a bioactive hydrogel system (Celexoderm™ Skin Rejuvenation Serum, Merakris Therapeutics, LLC, Research Triangle Park, NC) as an adjunctive treatment in subjects undergoing professional facial exfoliation. Secondary objectives were to assess skin sensitivity and tolerability to the formulation.

Methods

Cosmetic Product Formulation.

Carbomer polymer is added to ~600 rpm stirring sterile distilled water with paddle shaft positioned at ~25° angle until completely wetted (~45 min). Stir speed is reduced to ~300 rpm then 1N NaOH is slowly added until a pH of 6.8-7.0 is reached. Spectrastat™ is then added slowly (1.8% v:v), then AF is added slowly to obtain a 20% final concentration (v:v).

Subjects (n=3) provided informed consent to undergo a professional facial cleanse followed by a 1 mm microneedle roller exfoliation. Microneedling exfoliates the stratum corneum, resulting in formation of small microchannels in the dermis, mediating access to the living layers of the skin to larger topically-applied biomolecules. 5 grams of Celexoderm™ was then liberally applied to the face in the professional setting. Subjects continued at-home topical application of Celexoderm™ twice daily over a 14-day period by applying product liberally to target wrinkled areas.

Data were collected in the form of photographs prior to and 14 days after beginning the procedure to assess overall visual changes to the skin. Subjects also reported qualitative feedback on skin sensitivity and product satisfaction to the treating esthetician. Practitioner feedback on professional application was obtained.

Results

Figure 12:
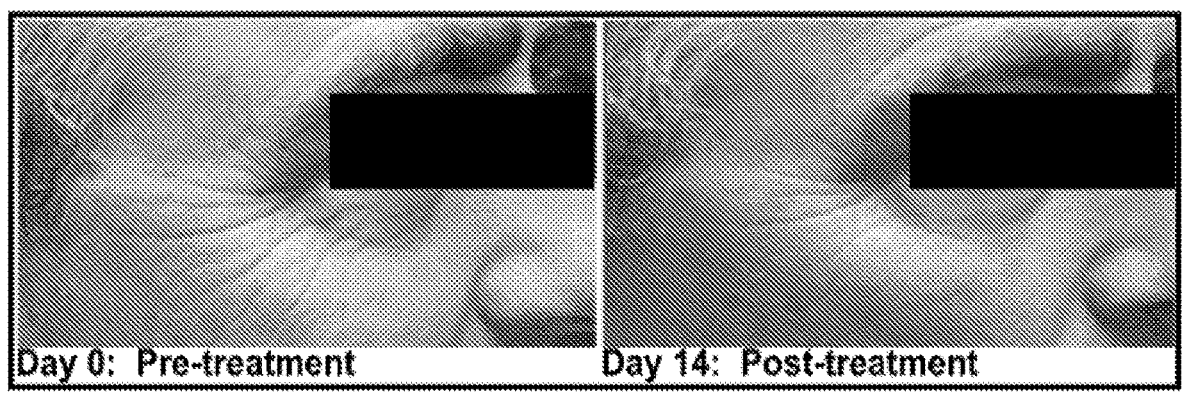
FIG. 12 is a picture showing pretreatment and 14 day post-treatment with Celexoderm™ in a subject.

Three subjects received treatment at a single cosmetic medical center and reported qualitative improvements in skin texture and wrinkle reduction. Photographs for one subject are shown in FIG. 12, which indicate significant wrinkle reduction and partial ablation of "crows feet". Two of the three subjects reported a mild burning sensation with Celexoderm™ application following the microneedle exfoliation procedure, however, no reports were received of a burning sensation during or following at-home application (in the absence of microneedling). There were no other patient reports of adverse skin sensitivity or other issues. All subjects reported Celexoderm™ had a desirable feel and texture when applied to the skin. The practitioner reported the product was easy to apply and the product quantity was sufficient for liberal application to the face and neck area. Further practitioner feedback included a suggestion to change preservation agents in an effort to minimize the burning sensation with application, possibly from the use of an alcohol-based preservative.

Conclusions

The results shown here indicate that Celexoderm™ combined with exfoliative procedures promotes wrinkle reduction. Reports of a burning sensation immediately following treatment with exfoliation (but not in-home use without exfoliation), prompted replacement of the alcohol-based preservative with an alcohol-free preservation system that has passed USP <61>testing (Spectrastat™, Inolex Inc., Philadelphia, PA). As compared to other bioactive preparations such as platelet-rich plasma (PRP), utilization of Celexoderm™ reduces the safety risks, (with zero user discomfort) associated with blood draws, reduces procedure time in medical spas, and allows for a more consistent batch-to-batch protein/macromolecular formulation. Delivery of Celexoderm™ may be improved using mechanical forces, such as iontophoresis or sonophoresis, that further aid in skin penetration of large molecules.

We conclude that Celexoderm™ Skin Rejuvenation Serum is a safe and potentially effective off-the-shelf alternative to PRP and other bioactive preparations processed at the point of care that are delivered topically and/or subcutaneously.

Example 3

Figure 13:
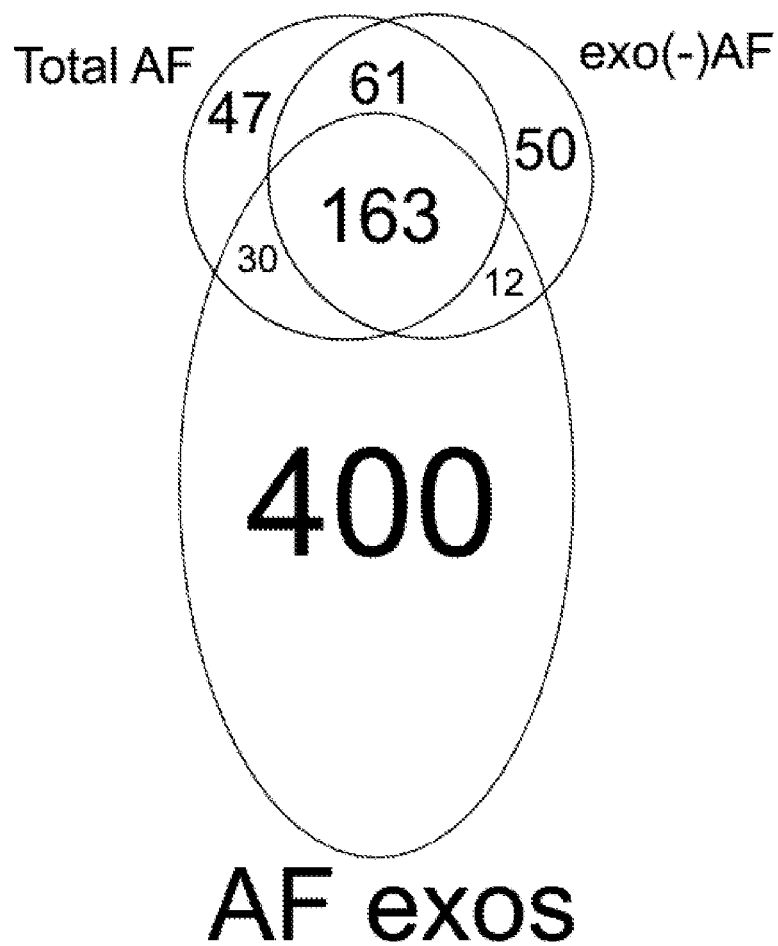
FIG. 13 is a Venn Diagram showing the degree of overlap (or non-overlap) of biological tripicatesamples analyzed by liquid chromatography coupled to tandem mass spectrometry (LC/MS-MS) of total amniotic fluid (Total AF), exosome-depleted AF (exo(−) AF), and the exosome-enriched fraction of AF (AF exos). The analysis was performed to generate peptide enrichment relative to total spectra, and then the degree of overlap of peptides that uniquely mapped to proteins was determined. The resulting Venn Diagram shows the degrees of overlap (or non-overlap) of the samples analyzed.

Liquid chromatography coupled to tandem mass spectrometry (LC/MS-MS) was performed on biological triplicate samples of total amniotic fluid (Total AF), exosome-depleted AF (exo(−)AF), and the exosome-enriched fraction of AF (AF exos). Analysis was performed to generate peptide enrichment relative to total spectra then the degree of overlap of peptides that uniquely mapped to proteins was determined. FIG. 13 shows the resulting Venn Diagram showing the degrees of overlap (or non-overlap) of the samples analyzed.

Using the same "depth" of protein sequencing, the exosome fraction of amniotic fluid contains a more complex proteome (at the depth of sequencing performed). The highly abundant proteins in AF (like albumin and transferrin, for example) are primarily found outside of the exosomal fraction.

Figure 14:
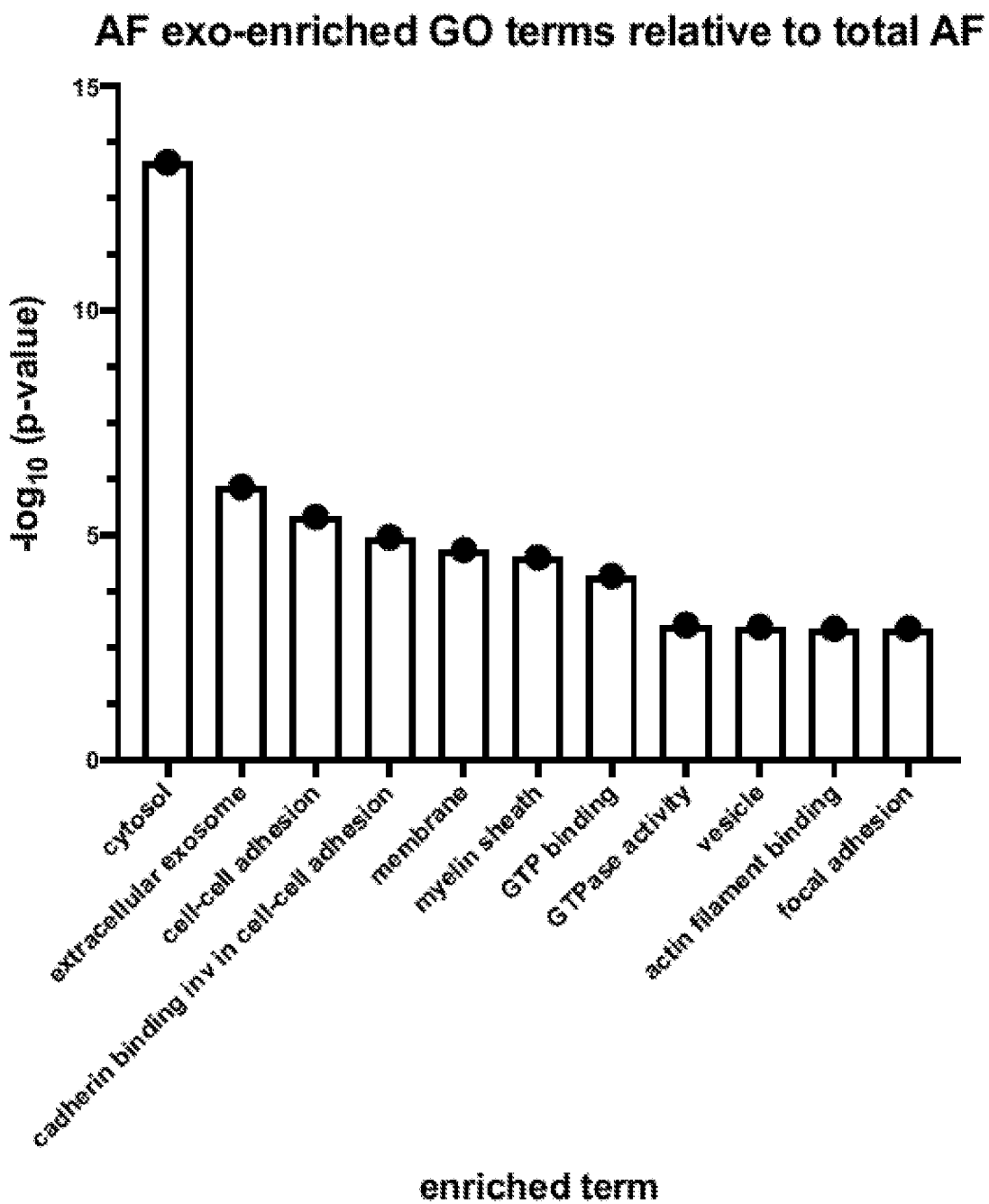
FIG. 14 shows the results of gene ontology analysis using the DAVID Bioinformatics database to determine biological terms, functions, and processes significantly associated with proteins identified by LC/MS-MS to be present at a higher level in the exosome-enriched fraction of AF than those found in total AF.
Figure 15:
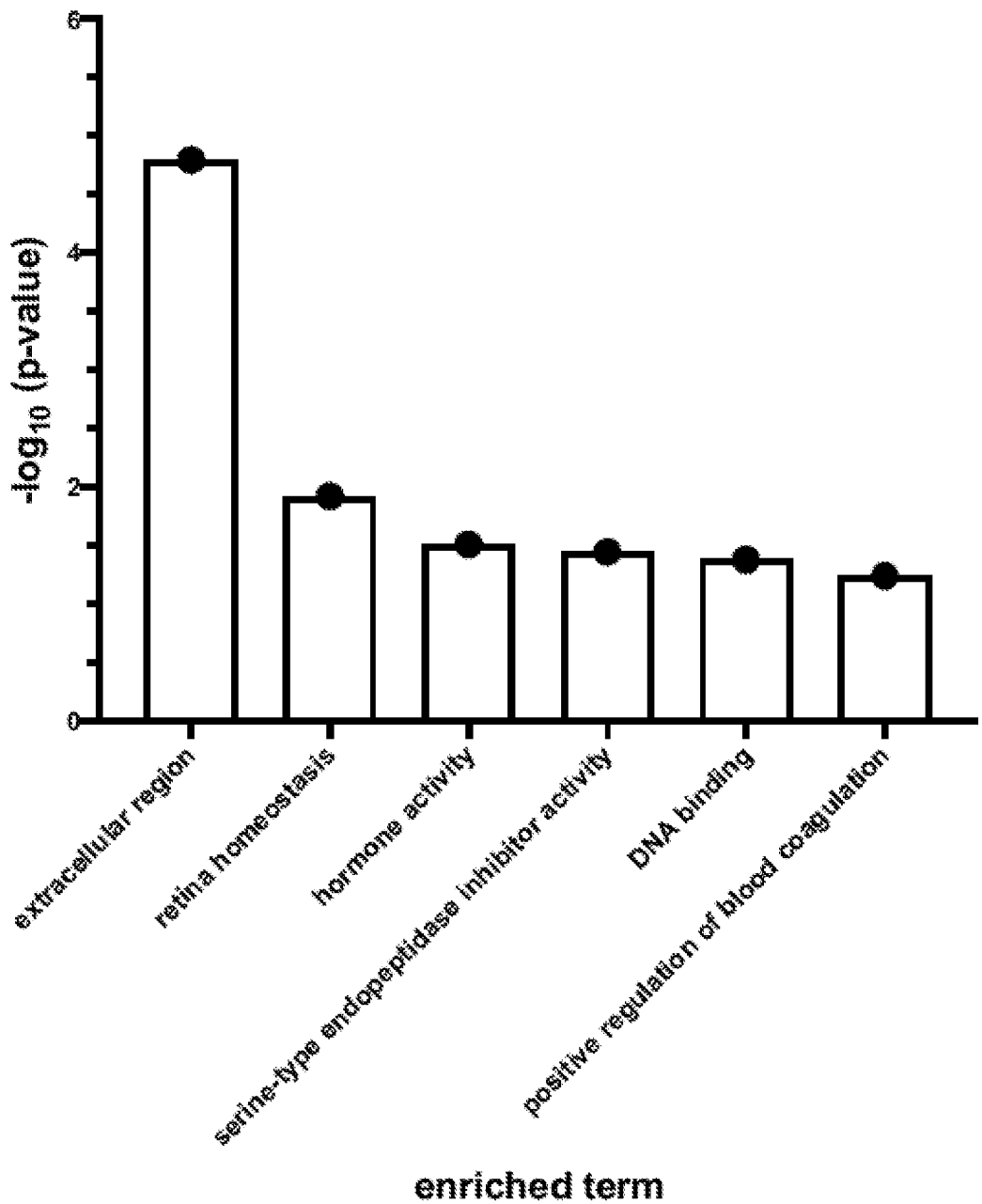
FIG. 15 shows the results of gene ontology analysis using the DAVID Bioinformatics database to determine biological terms, functions, and processes significantly associated with proteins identified by LC/MS-MS to be present at a higher level in the exosome-depleted fraction of AF than those found in total AF.

Gene ontology analysis using the DAVID Bioinformatics database was used to determine biological terms, functions, and processes significantly associated with proteins identified by LC/MS-MS to be present at a higher level in the exosome-enriched fraction of AF than those found in total AF. FIG. 14 is a plot of log 10 (p-value) on the y-axis versus enriched terms on the x-axis. Identified enriched terms from left to right were cytosol; extracellular exosome, cell-cell adhesion; involved in cell-cell adhesion; membrane; myelin sheath; GTP binding; GTPase activity; vesicle; actin filament binding and focal adhesion. Extracellular exosomes (especially) and terms associated with it (e.g., cytosol, membrane, vesicle, actin binding, focal adhesion, cell-cell adhesion, and cadherin binding, etc.) were found. GTP binding/GTPase may relate to some GTP-dependent signaling processes. Gene ontology analysis using the DAVID Bioinformatics database also was used to determine biological terms, functions, and processes significantly associated with proteins identified by LC/MS-MS to be present at a higher level in the exosome-depleted fraction of AF than those found in total AF. FIG. 15 is a plot of log 10 (p-value) on the y-axis versus enriched terms on the x-axis. Identified enriched terms from left to right are extracellular region, retina homeostasis, hormone activity, serine-type endopeptidase inhibitor activity, DNA binding and positive regulation of blood coagulation. There were a lower number of terms and lower enrichment values than in FIG. 14.

Example 4: Tissue Damage

Degenerative disorders of joints, such as osteoarthritis, rheumatoid arthritis, and psoriatic arthritis, result in persistent pain and disability.

OA is characterized by destruction of cartilage and loss of extracellular matrix. Articular cartilage is a tensile load-bearing connective tissue that covers the surface of joints. It does not contain blood vessels, nervous tissue, or lymphatic vessels. Chondrocytes, which are spatially isolated by the large quantity of ECM, are responsible for the synthesis and maintenance of ECM. The ability of cartilage repair declines with age, manifested by a decline in chondrocyte number.

These changes result in degeneration of the cartilage and limit its ability of repair. Catabolic and proinflammatory factors produced by the inflamed synovium alter the balance of cartilage matrix anabolism and catabolism, giving rise to cartilage breakdown. The changes in cartilage and subchondral bone cause further synovitis; progressive synovitis aggravates clinical symptoms and stimulates further joint degeneration. (Zhang, R. et al., Am. J. Trans. Res. (2019) 11(10): 6275-89).

The degeneration of cartilage tissue during OA progression is caused by chronic inflammation. It is generally agreed that there is an association between pro-inflammatory cytokines and the development of OA. There is increased expression of matrix metalloproteinase (MMP) and a disintegrin and metalloproteinase with thrombospondin motifs (ADAMTS). It has been suggested that the paracrine secretion of exosomes may play a role in the repair of joint tissue. (Mianehsaz, E. et al., Stem Cell Res. & Therapy (2019) 10: 340).

Preclinical studies have indicated that the cartilage of the joint can be protected from degeneration, and the development of OA can be delayed, through intra-articular injection of MSCs isolated from either adipose tissue or from bone marrow (Id., citing ter Huurne, M I et al, Arthritis Rheumatism (2012) 64 (11): 3604-13; Toupet, K. et al., PLoS One (2015) 10(1): e0114962; Murphy, J M, et all, Arthritis Rheumatism (2003) 48 (12): 3464-74); Desando, G. et al., Arthritis Res. Ther. (2013) 15(1): R22).

Numerous investigations have been carried out to evaluate the various effects of exosomes on different cells involved in joint diseases (Id., citing Anderson, H C et al., Lab Investig. (2010) 90 (11): 1549; Chang, Y-H, Wu, K-C, et al., Cell Transplant. (2018) 27(3): 349-63; Li, J J et al., Nanomaterials (Basel) (2019) 9(2): https://doi.org/103390/nano9020261; Withrow, J. et al., Arthritis Res. Ther. (2016) 18(1): 286). Cell-derived EVs have been isolated from synovial fibroblasts (SF) extracted from the inflamed joints of OA and RA patients and used to investigate their role in cellular processes, such as inflammation and cartilage degeneration, which are implicated in disease progression (Id., citing Withrow, J. et al., Arthritis Res. Thera. (2016) 18(1): 286; Li, Z. et al, Cell Physiol. Biochem. (2018) 47 (5): 2008-17; Maumus, M. et al., Biochimie (2013) 95 (12): 2229-34).

Domenis et al. explored the immune regulatory properties of SF-derived exosomes from end-stage OA patients on macrophages differentiated from human peripheral blood mononuclear cells (PBMCs) (Id., citing (Mediators Inflamm. (2017) 2017: 481-498). When patient cells were treated with exosomes, it was demonstrated that the macrophages generated a spectrum of chemokines and pro-inflammatory cytokines, such as CCL8, IL-1 beta, MMP12, CCL15, MMP7, and CCL20, which would result in cartilage degradation and inflammation in joints.

Kolhe, et al performed similar experiments and showed a significant decrease in cell survival and the expression of anabolic genes (COL2A1, ACAN), and an increase in the expression of catabolic and inflammatory genes (IL-6, TNF-α) using articular chondrocytes treated with exosomes derived from SF from OA patients. (Id. Citing Kolhe, R. et al., Sci Rep. (2017) 7(1): 2029)

Kato et al investigated whether exosomes mediated the interaction between articular chondrocytes and inflammatory synovial fibroblasts (SFBs). Exosomes were isolated from untreated similar fragment pairs (SFBs) and from similar fragment blocks (SFPs) that had been treated or not with IL-1 beta, and were then added to normal articular chondrocytes. They showed upregulation of the expression of MMP-13 and ADAMTS-5, and downregulation of ACAN and COL2A1 in articular chondrocytes when treated with IL-1 beta-treated SFB-derived exosomes, compared to exosomes from untreated SFBs. Additionally, exosomes from IL-1 beta-treated SFBs produced OA like changes in both in vitro and in vivo models. (Id. citing Kato, T. et al, Arthritis Res. Ther. (2014) 16(4): 8163).

There has been ever-increasing interest in the clinical application of MSCs for a variety of disease, including their potential to treat joint damage and OA (Id., citing Toh, W S, et al., Semin. Cell Dev. Biol. (2017) 67: 56-64; Davatchi, F. et al., Intl J. Rheum Dis. (2016) 19(3): 219-25); Lamo-Espinosa, J M et al., J. Transl. med. (2016) 14(1): 246; Vega, A., et al., Transplantation (2015) 99(8): 1681-90; Ham, O. et al, Intl J. Mol. Sci. (2015) 16(7): 14961-78; Qi, Y. and Qi, Y. et al, Mol. Biol. Rep (2012) 39(5): 5683-89). The MSCs have usually been isolated from synovium (Id., citing Koizumi, K. et al, Osteoarthr. Cartil. (2016) 24(8): 1413-22), bone marrow (Id., citing Van Buul, G. et al, Osteoarthr. Cartil. (2012) 20(10): 1186-96) and adipose tissue (Id., citing Manferdini, C. et al., Arthritis Rheumatism (2013) 65(5): 1271-81). Researchers have assessed the effectiveness of MSCs in restoration of damaged tissue function or in alleviating disease symptoms in OA or cartilage damage (Id., citing Mendicino, M. et al, Cell Stem Cell (2014) 14(2): 141-45; Lee, WY-W, Wang, B, J. Orthop. Trans. (2017) 9: 76-88). In spite of the functional enhancement (or even the regeneration of joint tissue) which was observed following transplantation of MSCs into diseased joints, their engraftment and subsequent differentiation into the desirable cell types only occurred rarely (Id., citing Wyles, C C, et al, Stem Cells Cloning (2015) 8: 117).

There are several problems with the direct cell transplantation approach, such as the poor survival of the cells after injection, the inability to predict lasting improvements in cell behavior and cell-cell interactions, and problems in maintaining an adequate storage bank of cells to allow off-the-shelf treatment (Id., citing Heldring, N. et al, Hum. Gene Ther. (2015) 26(8): 506-17). The suitability of donors is another issue, since it was found that MSCs isolated from old or otherwise unhealthy donors led to creased performance and proliferation (Id., citing Siddappa, R. et al., J. Orthop. Res. (2007) 25(8): 1029-41). Moreover, the induction of senescence, loss of proliferative potential, and reduced capacity for differentiation (particularly beyond 10-20 population doublings) have been attributed to prolonged ex vivo cell expansion of MSCs before transplantation (Id., citing Siddappa, R. et al., J. Orthop. Res. (2007) 25(8): 1029-41). There are also problems in maintaining the cartilage phenotype in differentiated MSCs and preventing them from expanding towards the osteogenic phenotype because of their genetic programming to undergo calcification after chondrogenic induction as part of the normal process of endochondral ossification (Id., citing Dickhut, A. et al., J. Cell Physiol. (2009) 219 (1): 219-26). Moreover, MSCs are sensitive to certain environmentally responsive factors, which can have a negative impact on the MSC response in a diseased joint environment. For example, reports have demonstrated that human adipose tissue-derive MSCs can switch to a pro-inflammatory secretome, when treated with TNF, and can then play a role in augmenting the inflammatory response (Id., citing Lee, M J et al, J. Proeome Res. (2010) 9(4): 1754-62).

Recent studies have shown that MSC exosomes can promote the repair of heart, liver and skin tissue. (Zhang, R. et al., Am. J. Trans. Res. (2019) 11(10): 6275-89). MSC exosomes have also been reported to mediate cartilage repair and regeneration. For example, Zhang et al first demonstrated the effects of human embryonic MSC exosomes on cartilage repair; cartilage defects were induced on the trochlear grooves of distal femurs of 12 adult rats; after 12 weeks, the exosome treated defects showed complete cartilage and subchondral bone recovery and other characteristic features, including hyaline cartilage with regular surface, complete adherence to the adjacent cartilage, and ECM deposition that closely resembled that of age-matched controls. (Id). Cosenza et al found that exosomes derived from allogeneic BMSCs protected mice from developing OA by protecting cartilage and bone from degradation (Id. Citing 92). The mechanisms underlying cartilage regeneration by MSC exosomes and other therapeutic efficacies reported for MSC exosomes have not been elucidated. (Id., citing Cosenza, S. et al., Sci. Rep. (2017) 7: 16214).

The articular ends of limb bones are covered with hyaline cartilage, consisting of chondrocytes surrounded by ECM rich in collagen and proteoglycans. The cartilage is bathed in synovial fluid, which is secreted by fibroblast-like synoviocytes (FLS) surrounding the joint. The chronic inflammation of the joints that accompanies RA and the mechanical degradation of articular cartilage that accompanies OA each appear to involve changes in the EVs circulating within the joint space. Murphy, C. et al., Mol. Aspects. Med. (2018) 60: 123-28).

Various miRNAs appear to mediate a number of key pathological processes.

In RA, miR-155 and miR146a are known to be involved in disease development; both of these miRNAs are stimulated by TNF-alpha and indirectly affect the inflammatory response, with miR-155 increasing inflammation and miR-146a decreasing inflammation. (Id., citing Withrow, J. et al., Arthritis Res. Ther. (2016) 18(1): 286).

In OA, when FLS cells are treated with IL-1 beta, EVs are secreted that show elevated levels of miR-500B, miR-4454, miR-720, miR-199b, and miR-3154 (Id., citing Kato, T. et al., Arthritis Res. Ther. (2014) 16(4): 163). MicroRNAs detected in EVs in synovial fluid of patients with OA differ between men and women, and are secreted by the FLS. In particular, women with OA show a marked downregulation of miR-26a, which is known to target toll-like receptors, such as TLR3, in articular chondrocytes. Estrogen is known to stimulate miR-26a production, whereas estrogen inhibitors suppress miR-23a expression (Id., citing Kolhe, R. et al. Sci. Rep. (2017) 7(1): 20-29).

While the healing process for various joint/orthopedic degenerative and physical overuse conditions is complex, there are several underlying cellular states and pathways upon which regeneration converges. These are: reduction of inflammation, re-initiation of cellular homeostasis, and recruitment/activation of various immune/progenitor cell types that act in concert to reverse orthopedic pathological states. In vitro modeling of such states is widely used, in various contexts, including, but not limited to, various types of arthritis and physical joint damage (See Blom et al. Arthritis and Rheumatism (2009) 60(2):501-12; Johnson et al., In vitro models for the study of osteoarthritis, The Veterinary Journal 209 (2016) 40-49). For example, the use of cytokine induction, via IL-1B or TNF-A, is a widely used method to mimic these states in mouse models, and in vitro models using fibroblasts, chondrocytes, myoblasts, synoviocytes, or osteoclasts/blast/cytes (Id).

Additionally, assays to test a return to homeostasis of these cells may be employed by serum withdrawal and replacement thereof with active ingredients/test reagents.

According to some embodiments, measurements that can be assayed for reversal of such a state may include, without limitation, RT-qPCR, immunofluorescence, immunohistochemistry, ELISA, western blot, or other cell-based or immuno-assay to measure target biomarker(s), including those described by Johnson et al 2016, or other anti-inflammatory markers encoding such proteins as TIMP proteins, which are natural inhibitors of the matrix metalloproteinases (MMPs, a group of peptidases involved in degradation of the extracellular matrix), for example, tissue inhibitor of metalloproteinases 1 (TIMP1), tissue inhibitor of metalloproteinase 2 (TIMP2), tissue inhibitor of metalloproteinase 3 (TIMP3), nuclear factor kappa B subunit 1, (NFKB1), transforming growth factor beta receptor 1 (TGFBR1), transforming growth factor beta receptor 2(TGFBR2), Signal Transducer And Activator Of Transcription 3 (STAT3), collagen type 1 alpha 1 chain (COL1A1), collagen type I alpha 2 chain (COL1A2), fibronectin 1 (FN1), ACTA2 (actin alpha 2, smooth muscle), and other collagens/ECM proteins.

According to some embodiments, an in vitro model using fibroblasts, chondrocytes, myoblasts, synoviocytes, or osteoclasts/blast/cytes may serve as a proxy for tissue injury. According to some embodiments, total AF, exo(-)AF, and AF exos may be administered to the in vitro model, and may treat inflammatory states induced by one or more of the above mentioned agents, reverse the inflammatory state induced by the above mentioned agents, or promote homeostasis (measured by promoting cell division/proliferation or inhibition of apoptosis in vitro) in the absence of serum or other anti-inflammatory ingredient. According to some embodiments, the in vitro model may be sustained in a state that precludes inflammation or injury.

Example 5: Degenerative Ophthalmic Conditions, Reduction of Scarring

Definitions

The term "angiogenesis" as used herein refers to the growth of new blood vessels from preexisting ones. Angiogenesis, under physiologic conditions, can be activated by specific angiogenic molecules, such as basic and acidic FGF, VEGF, angiogenin, TGFβ, IFNβ, TNFα, and PDGF. Angiogenesis also can be suppressed by inhibitory molecules, such as IFNa, thalidomide, thrombospondin-1, angiostatin, endostatin, a naturally occurring form of the carboxyterminal, noncatalytic domain of MMP-2 (PEX), transfer RNA (tRNA) synthetases, and pigment epithelium-derived factor (PEDF). The normally quiescent capillary vasculature is thought to be tightly controlled by the balance of these naturally occurring stimulators and inhibitors of angiogenesis. When this balance is upset (e.g., diabetic retinopathy (DR)), capillary endothelial cells are induced to proliferate, migrate, and differentiate.

The term "fibrosis" is used to describe fibroblast-mediated wound healing processes in non CNS tissue. It refers to the formation or development of excess fibrous connective tissue as a result of injury or inflammation or of interference with its blood supply. It may be a consequence of the normal healing response leading to a scar, an abnormal reactive process, or without known or understood causation.

The term "gliosis" as used herein refers to the glial cell mediated wound healing response observed in the CNS, much as fibrosis is used to describe similar processes in non-CNS tissues. (Friedlander, M., J. Clin. Invest. (2007) 117 (3): 576-86). The ocular response to hypoxia and inflammatory insults typically leads to retinal or choroidal neovascuareization. During development, this process is highly regulated and leads to the establishment of a well-organized, matetture vasculature. In the adult, this is often not the case, and associated glial cells (e.g., astrocytes, microglia, and Müller-glial cells) proliferate with the endothelial cells, leading to fibrosis and scar formation. (Id.)

The term "retinal gliosis" as used herein refers to the proliferation of astrocytes, Müller cells, and/or microglia, which can occur in various retinal layers with focal to diffuse distribution. It is characterized by increased numbers of glial cells in the retina. Retinal gliosis can occur as a primary change (generally of uncertain etiology) or as a feature to other retinal lesions (e.g., degeneration).

The term "Müller (or Mueller) cells" as used herein refer to radial glial cells in the inner vertebrate retina, which have a cylindrical, fiber-like shape, and that span the entire retinal thickness. Müller cells have a higher refractive index than their surrounding tissue, and are oriented along the direction of light propagation, i.e., in the path of light through the retina from the vitreous, where light enters the tissue, to the outer limiting membrane, where the inner segments of the photoreceptor cells receive the incident light. Transmission and reflection confocal microscopy of retinal tissue in vitro and in vivo have shown that these cells provide a low-scattering passage for light from the retinal surface to the photoreceptor cells. Individual Müller cells act as optical fibers, and seem to mediate image transfer through the vertebrate retina with minimal distortion and low loss. See Franze, K. et al, "Müller cells are living optical fibers in the vertebrate retina," Proc. Natl Acad. Sci. USA (2017) 104 (20): 8287-92

The term "neovascularization" as used herein refers to development of new blood vessels, especially in tissues where circulation has been impaired by disease or trauma. For example, corneal neovascularization is characterized by the invasion of new blood vessels into the cornea, and is caused by a disruption of the balance between angiogenic and antiangiogenic factors that preserves corneal transparency. Neovascularization of the iris (NVI), also known as rubeosis iridis, occurs when small fine, blood vessels develop on the anterior surface of the iris in response to retinal ischemia. The term "rRetinal neovascularization" refers to abnormal blood vessel growth in the retina.

The term "scar tissue" as used herein refers to fibrous tissue that, as a result of the biological process of wound repair, replaces normal tissue destroyed by injury or disease.

Fibrotic Diseases of the Eye

Fibrosis in the eye can have disastrous consequences for vision by mechanically disrupting the visual axis or sufficiently disturbing the tissue microenvironment such that proper cellular functioning is no longer possible. (Friedlander, M. "Fibrosis and diseases of the eye," J. Clin. Invest. (2007) 117(3): 576-86).

Anterior Segment Fibrotic Disease Of The Eye

The response of the anterior segment of the eye to wound healing more closely resembles the response of non-CNS tissues. Two major diseases of the anterior segment of the eye leading to visual loss are corneal opacification and glaucoma. (Id.)

The cornea is covered externally by a stratified nonkeratinizing epithelium and internally by a single layer of transporting endothelium with multiple orthogonal arrays of collagen in between. It is normally avascular due to the high concentration of soluble VEGFR-1, and is surrounded by a transitional margin, the corneal limbus, within which resides nascent endothelium and corneal epithelial stem cells. (Id.)

Diseases of the cornea can be genetic (e.g., inherited dystrophies) or acquired secondary to infection (e.g., herpetic heratitis) or inflammation (e.g., pterygia). (Id). Elastoid degeneration of the conjunctiva, resulting in pingueculae and pterygia (fibrovascular growths on the surface of the cornea) can lead to visual loss secondary to induced astigmatism and/or obstruction of the visual axis. (Id). The final common events in all of these diseases are often inflammatory changes associated with neovascularization, tissue edema, and ultimately fibrosis of the corneal stroma, which leads to opacification and decreased vision. (Id.)

Corneal wound repair is a complex, multiphase process that involves apoptosis (Klingeborn, M. et al., Prog. Retin. Eye Res. (2017) 59: 158-77, citing Netto, M V,et al., Cornea (2005) 24: 5009-22); proliferation (Id., citing Cursiefen, C. et al. Cornea (2006) 25: 443-47); cellular transformation (Id., citing Mimura, T. et al., J. Vasc. Res. (2009) 46: 541-550); migration (Id., citing Cornea (2006) 25: 443-47); and ECM remodeling (Id., citing Mimura, T. et al., J. Vasc. Res. (2009) 46: 541-550). A critical component throughout this process is the transmembrane matrix metalloproteinase-14 (MMP-14). Corneal fibroblasts release exosomes with MMP-14, which are taken up by endothelial cells (Id., citing Han, K Y, et al. Invest. Ophthalmol. Vis. Sci (2015) 56: 5323-5329). Exosomal MMP-14 activity is critical for the accumulation and activation of MMP-2 in the exosomes (Id., citing Han, K Y, et al. Invest. Ophthalmol. Vis. Sci (2015) 56: 5323-5329).

While corneal transplants have hanged the uniformly dismal prognosis for patients with opacified or failed corneas, there is a substantial failure rate, typically due to recurrent opacification. Id.

Although glaucoma is typically associated with increased intraocular pressure, either from increased production of intraocular fluid or increased resistance to outflow, it is more commonly believed that progressive fibrosis of the tracts through which the intraocular fluid leaves the eye (the trabecular meshwork) accounts for most of the damage that causes glaucoma.

Posterior Segment Fibrotic Diseases of the Eye.

The posterior segment of the eye consists of structures behind the lens; the interior of the back of the eye is filled with vitreous, a viscoelastic material consisting largely of water, collagen and hyaluronic acid. The vitreous serves as a shock absorber for the retina (the most posterior tissue in the eye), and can provide a scaffolding over which glial and endothelial cells migrate from their normal intraretinal position anteriorly over the retinal surface and/or into the vitreous in certain disease states (e.g., diabetic retinopathy, proliferative vitreoretinopathy, retinopathy of prematurity (ROP)).

The diseases that lead to vision loss as a result of abnormalities in the retinal or choroidal vasculature (e.g., age-related macular degeneration (AMD), diabetic retinopathy (DR), retinopathy of prematurity (ROP), and neovascular glaucoma) are characterized by macula edema, retinal and vitrous hemorrhage, and fibrovascular scarring. The final common pathophysiological denominator in all of these diseases is the retinal response to injury, with chronic wound healing leading to fibrosis. When abnormal blood vessels form in response to inflammatory or hypoxic stimuli, they can leak fluid, causing retinal thickening and edema and/or bleed, leading to fibrovascular proliferation and tractional retinal detachment.

Fibrovascular Scarring And Gliosis In The Retina

Fibrovascular scarring is a consequence of the underlying inflammatory or hypoxia-driven neovascularization and its associated fibrosis. Glial cells are the primary participants in the formation of fibrotic scars in response to retinal injury and disease. In the retina, certain glia are intimately associated with the vascular endothelium in both developing and mature tissue. For example, activated astrocytes form the template over which retinal vascular endothelial cells migrate during formation of the superficial vascular plexus; disturbances in the number or distribution of these cells disrupts the normal development of the retinal vasculature. Inflammatory disease (e.g., AMD and ischemic diseases (e.g. DR) account for most of the conditions that lead to fibrovascular scarring in the retina and its associated vision loss.

Subretinal Fibrosis: AMD

As the retinal pigmented epithelium (RPE) ages or becomes diseased, it can function improperly, and a build-up of subretinal deposits, called drusen, which contain angiogenic lipids and damaged proteins, accumulate. RPE dysfunction and the accumulation of drusen can lead to thickening of Bruch membrane (a shiny, homogeneous membrane that lies between the layer of capillaries lined by fenestrated type II endothelium that supplies nutrition to the outer portion of the retina (the choriocapillaris) and retina, and the accumulation of angiogenic drusen associated with this fibrosis can lead to decreased diffusion of oxygen from choriocapillaries to the photoreceptors, further exacerbating conditions that can lead to choroidal neovascularization. Once these new abnormal blood vessels begin to grow in the subretinal space, they often hemorrhage, leading to further wound-healing responses, and, ultimately to subretinal fibrosis. Local destruction of photoreceptors, the RPE and choroidal blood vessels leads to permanent reduction in macular function and vision. Rodents do not seem to faithfully mimic the human disease, although transgenic mice have provided some use. (Pennesi, M E, et al., Mol. Aspects Med. (212) 33(40: 487-509).

Current therapies for treating AMD-associated choroidal neovascularization and DR are directed at inhibiting cytokines that mediate the vasoproliferative response or to destroy the tissue that is creating the increased metabolic demand, but inhibiting angiogenic cytokines does not address the ischemia and inflammatory stimuli that underlie the pathophysiology.

Epiretinal Fibrosis: DR

In DR, ischemia occurs as a result of a diabetic microvasculopathy that includes pericyte cell death, microaneurysms, intraretinal microvascular abnormalities, altered vascular permeability and macular edema. As the hypoxia increases, neovascularization can occur, leading to intraretinal, subhyaloid (between the retinal surface and posterior vitreous base) and vitreous hemorrhage. These proliferating blood vessels are accompanied by gliosis. As abnormal vessels continue to proliferate on the retinal surface, they can extend into the vitreous and contract, causing traction on the retinal surface, leading to retinal detachment.

Although animal models of ischemic retinopathy have been useful in developing a better understanding of factors that control retinal vascular proliferation, no model completely recapitulates the full pathophysiology of neuronal and vascular changes that occur at each stage of diabetic retinopathy. (Olivares, A M, et al., Curr. Diab. Rep. (2017) 17 (10): 93)

Efforts to minimize sub- and epiretinal fibrosis have met with limited success and are a therapeutic intervention occurring too late to rescue vision, since scarring would already have led to photoreceptor death.

Retinal neovascularization and associated gliosis and fibrosis also are observed in ROP and as a complication of surgery to treat retinal detachment.

9. Retinal Injury, Detachment, and PVR

Eye trauma is the second most common cause of impaired vision in the United States, with approximately 2.4 million injuries occurring annually, 10-20% of which result in vision loss, either temporary or permanent (US Eye Injury Registry. 2016; American Academy of Ophthalmology. 2016). Many forms of traumatic injury to the eye, such as a penetrating wound or a concussive injury to the head, result in a tearing of the retina, with subsequent detachment from its primary source of metabolic support, the underlying retinal pigment epithelium (RPE) and choroidal vasculature. Retinal detachment inevitably leads to photoreceptor cell degeneration and some loss of visual acuity. While small detachments may resolve on their own, minimization of visual loss is best ensured by timely surgical repair. In addition to the loss of vision associated with the initial insult, 15.7% of retinal injuries can lead to a secondary blinding condition caused by the growth of scar tissue, consisting primarily of RPE and glial cells, on the subretinal and/or epiretinal surface of the retina (Miura, M. et al. Retina (2000) 20(5): 456-58). Scar tissue formation on either surface is considered part of the spectrum of the neoplastic fibrocontractive retinal disorder termed proliferative vitreoretinopathy or PVR (Machemer, R. et al., Arch. Ophthalmol. (1991) 109 (11): 1492-93). Subretinal scars disrupt retinal function and vision by acting as a barrier between the RPE and retina following reattachment surgery, thus preventing photoreceptor outer segment phagocytosis, completion of the retinoid cycle, and retinal-RPE-choroid transport. Epiretinal membranes obscure light and can contract, causing retinal folds and re-detachment of the retina. Epiretinal membrane formation and subsequent contraction detachment remains the most common failure of retinal reattachment surgery (Speicher, M A et al. Retina (2000) 20(5): 459-64; Duquesne, N. et al., Graefes Arch. Clin. Exp. Ophthalmol. (1996) 234 (11): 677-82; Girard, P., et al., Retina (1994) 14(5): 417-24; Gartry, D S, et al, Br. J. Ophthalmol (1993) 77 (4): 199-203; Greven, C M et al, Ophthalmology (1992) 99 (2): 257-62). Although advances in surgical management have improved the ability to ultimately re-attach the retina after the occurrence of a contraction detachment, the visual prognosis remains poor.

Early Cellular Events in Retinal Detachment and PVR

Although PVR-induced scarring in the retina is associated with the greatest loss of vision after retinal detachment, significant and often irreversible changes in the retina and RPE begin immediately following injury. Within hours of detachment, there is increased Müller cell expression of transcription factors involved in both proliferation and cell growth (Geller, S F et al., Invest. Ophthalmol. Vis. Sci. (2001) 42 (6): 1363-69). This is followed by a burst of glial proliferation during the first three days after injury, with subsequent scar formation (Lewis, G P et al., Mol. Vis. (2010) 16: 1361-72; Fisher, S K et al., Invest. Ophthalmol. Vis. Sci. (1991) 32 (6): 1739-48). Likewise, RPE proliferation has been observed as soon as 24 hours after injury, even in the case of experimental induced detachment, where there is minimal physical trauma (Anderson, D H et al., Invest. Ophthalmol. Vis. Sci. (1981) 21 (1 Pt 1): 10-16). Accompanying these proliferative events is photoreceptor apoptosis and, in the absence of reattachment, an eventual remodeling of neuronal cells throughout the region of injury (Cook, B. et al., Invest. Ohthalmol. Vis. Sci. (1995) 36(6): 990-96; Fisher, S K et al., In: Kolb H, Fernandez E, Nelson R, editors. Webvision: The Organization of the Retina and Visual System [Internet]. Salt Lake City (Utah): University of Utah Health Sciences Center; 1995-.). While retinal reattachment effectively stops Müller cells from growing into the subretinal space, there can be a continued low-level of Müller cell proliferation and a redirection of their growth onto the epiretinal surface (Lewis, G P et al., MOl. Neurobiol. (2003) 28(2): 159-75. The low level of proliferation observed in surgically reattached retinas may explain why PVR scar formation in the vitreous is usually not observed in patients until months after reattachment surgery. Blocking early cellular events, with their potential for creating negative impacts on the retina, therefore is essential to maximizing visual recovery after injury.

Early Molecular Signals

Within minutes of detachment, there is evidence for a fibroblast growth-factor (FGF)-mediated activation of the Mitogen Activated Protein Kinase (MAPK) pathway in Müller cells and RPE (Geller, S F et al., Invest. Ophthalmol. Vis. Sci. (2001) 42 (6): 1363-69). By day one, phosphorylated Signal Transducers and Activators of Transcription 3 (STAT3) upregulation is seen in some inner nuclear layer and ganglion cells and, by day 3, it is detected in some RPE cells, as well. When cultured Müller cells are stretched, there is an induction of expression of genes associated with proliferation of interleukin 6 (IL6), which stimulates STAT3 phosphorylation via the IL6 receptor and Janus kinase (JAK) (Wang, X. et al. PLoS One (2013), 8(5) e63467), suggesting that deformation of the retina during injury may be the trigger that initiates many of the events associated with injury Similarly, physical disruption of the epithelial monolayer is likely to be involved in the activation of RPE proliferation. While FGF is a mitotic for subconfluent RPE in culture, it actually promotes differentiation in intact RPE monolayers, and differentiated RPE cells exposed to FGF do not enter the cell cycle (Radeke, M J et al., Genome Med. (2015) 7(1): 58). Normal RPE cells have tight junctions that sequester cyclin-dependent kinase 4 (CDK4) and Y-Box Binding Protein 3 (YBX3), thus preventing them from entering the cell cycle. Trauma-induced disruption of these tight junctions leads to release and nuclear re-localization of CDK4 and YBX3, and G1/S phase transition.

Therapies for Scarring PVR

PVR is a complex disease involving multiple cell types, undesirable cell proliferation, cell spreading and contractility. Dividing cells have been observed in membranes removed from patients with PVR (Tsanou, E. et al., Intl J. Clin. Pract. (2005) 59 (10): 1157-61; Zhang, X et al. Curr. Eye Res. (2005) 30(5): 395-403; Lesnik Oberstein, S Y et al., Br. J. Ophthalmol. (2011) 95 (2): 266-72). Data from animal models, as well as the membranes removed from human patients, show a critical role for Müller cell growth as part of the response; because the outgrowth of Müller cell processes onto the retinal surface is routinely observed as one of the earliest events after detachment, these processes may provide a cellular scaffold upon which more complex cellular membranes can form.

Studies of retinal detachment in animal models suggest a sequence of events that ultimately leads to PVR. Retinal detachment leads to 1) intraretinal proliferation and hypertrophy of Müller cells 2) the "expansion" of Müller cells to the subretinal space, forming extensive glial scarring 3) the eventual migration of retinal pigment epithelial cells into the membrane and 4) integration of immune cells within the membrane and retina (Fisher, S K et al., In: Kolb H, Fernandez E, Nelson R, editors. Webvision: The Organization of the Retina and Visual System [Internet]. Salt Lake City (Utah): University of Utah Health Sciences Center; 1995-2005; Fisher, S K, Lewis, G P, Vision Res. (2003) 43(8): 887-97).

The pathophysiologic fibrotic response in retinal detachment is mediated in large measure by RPE cells following exposure to numerous growth factors and cytokines found in the vitreous (Sadaka A & Giuliari G., Cllin. Ophthalmol. (2012) 6: 1325-33; Moysidis S, et al. Mediators Inflamm. (2012) 2012.815937). These factors promote an environment of cell migration, proliferation, survival and formation of extracellular proteins.

The Role of Extracellular Vesicles In Vivo

Infiltrating and/or local monocytes have been implicated in a wide range of eye diseases, such as choroidal neovascularization ((Klingeborn, M. et al., Prog. Retin. Eye Res. (2017) 59: 158-77, citing Espinosa-Heidmann, D G, et al. Invest. Ophthalmol. Vis. Sci. (2003) 44: 3586-92); uveitis (Lee, R W., et al., Semin. Immunopathol. (2014) 36: 581-94); corneal inflammation (Id., citing Cursiefen, C., et al., J. Clin. Invest. (2004) 113: 1040-50; Cursiefen, C., et al., J. Exp. Med. (2011) 208: 1083-92; Koch, A E., et al., Science (1992) 258: 1798-1801); diabetic retinopathy (Id., citing McLeod, D S., et al., Am. J. Pathol. (1995) 147: 642-53; Schroder,S., et al Am. J. Pathol. (1991) 139: 81-100; Serra, A M., et al., Am. J. Pathol. (2012) 181: 719-27), and glaucoma (Id., citing Alvarado, J A., et al., Arch. Ophthalmol. (2010) 128: 731-37; Howell, G R., et al., J. Clin. Invest. (2012) 122: 1246-61. It has been suggested that extracellular vesicles (EVs) derived from RPEs under homeostatic conditions may downregulate immune activity in the immediate vicinity of retinal pigmented epithelial cells. (Klingeborn, M. et al., Prog. Retin. Eye Res. (2017) 59: 158-77).

Very little research has been done to study the role of exosomes in the development and disease process of AMD including choroidal neovascularization (CNV), or other diseases with aberrant retinal angiogenesis, such as DR. (Klingeborn, M., et al., Progr. Eye Res. (2017) 59: 158-77). There is a delicate balance of pro- and anti-angiogenic signaling in the retina, RPE and choroid. (Id.) The role of exosomes in this signaling balance was highlighted by a study demonstrating that exosomes released from retinal astrocytes contain anti-angiogenic components that inhibit laser-induced CNV in a mouse model (Id., citing Hajrasouliha, A R., et al J. Biol. Chem. (2013) 288: 28058-067).

Although aqueous humor (AH) has been used for protein, nucleic acid, and lipid biomarker analyses in eye diseases such as glaucoma (Id., citing Agnifili, L. et al., Progr. Brain Res. (2015) 221: 1-32; Goyal, A., et al., Current Eye Res. (2014) 39: 823-29); neovascular AMD (Id., citing Kang, G Y et al., J. Proteome Res. (2014) 13: 581-95; Liu, F. et al., Mol. Vis. (2016) 22: 352-61; Park, K H, et al., Invest, Ophthalmol. Vis. Sci. (2014) 55: 5522-30 (2014); diabetes induced eye diseases (Id., citing Vijosevic, S. et al., Invest. Ophthalmol. Vis. Sci. (2015) 56: 1913-18; Vijosevic, S. et al., Acta Ophthalmol. (2016) 94: 56-64, and uveitis (Id., citing Haasnoot, A M et al., Arthritis Rheumatol. (2016) 68: 1769-79; Kalinina Ayuso, V. et al., Invest. Ophthalmol. Vis. Sci. (2013) 54: 3709-20), and although the vast majority of nucleic acid and lipid biomarkers, and some of the protein biomarkers identified in AH were most likely exosome-associated, very little attention has been directed to exosome-specific biomarkers, because of uncertainty regarding the bona fides of the exosome preparations. Id.

MSC Cell Therapy and Exosome Therapy in Animal Models

MSCs transplanted into the vitreous after optic nerve crush were reported to promote significant neuroprotection of retinal ganglion cells and moderate regeneration of their axons. (Mead, B., Tomarev, S. Stem Cell Translational Med. (2017) 6: 1273-85), citing Levkovitch-Verbin, H., et al. (Invest. Ophthalmol. Vis. Sci. (2010 51: 6394-6400; Mead, B., et al., Invest. Ophthalmol. Vis. Sci. (2013) 54: 7544-56; Tan, H. B., et al., Clin. Interv. Aging (2015) 10: 487-90; Zwart, I., et al., Exp. Neurol. (2009) 216: 439-448). It also has been reported that MSCs promote the survival of retinal ganglion cells and their axons and preserve their function in animal models of glaucoma. (Id., citing Mead, B. et al, Cytotherapy (2016) 18: 487-96; Emre, E. et al., Cytotherapy (2015) 17: 543-59; Johnson, T V, et al., Invest. Ophthalmol. Vis. Sci. (2010) 51: 2051-59; Yu, S. et al., Biochem. Biophys. Res. Commun. (2006) 344: 1071-79). Such studies strongly implicate a paracrine mechanism over cell replacement as the dominant mechanism for such effects. There is accumulating data to support the notion that MSC-derived exosomes can mediate the biological functions of MSCs.

For example, exosomes derived from bone marrow-derived MSCs cultured under hypoxic conditions that contain proteins and growth factors that promote angiogenesis were used to determine the effect of their intravitreal administration on retinal ischemia in a murine model. Oxygen-induced retinopathy was induced in C57BL/6J mice. The right eye of each mouse was injected intravitreally with 1 µl saline or exosomes derived from human MSCs and compared to control mice. Two weeks post-injection, retinal perfusion was assessed. The intravitreal exosome treatment partially preserved retinal vascular flow in vivo and reduced associated retinal thinning. Retinal neovascularization was reduced when compared to saline-treated eyes. No immunogenicity or ocular/systemic adverse effects were associated with this treatment. Moisseiev, E. et al., Current Eye Res. (2017) 42 (10): 1358-67.

Exosomes derived from pooled human bone marrow derived MSCs also were tested by another group in an in vitro model of retinal ganglion cell (RGC) death and abortive axonal regeneration and in a rat optic nerve crush model to test their neuroprotective and axogenic potential and to determine if the effect is protein or miRNA-mediated. (Mead, B., Tomarev, S., Stem Cell Translational Med. (2017) 6: 1273-85). Treatment of primary retinal cultures were reported to demonstrate significant neuroprotective and neuritogenic effects. Twenty-one days after optic nerve crush and weekly intravitreal exosome injections optical coherence tomography, electroretinography and immunohistochemstry showed that the exosomes promoted statistically significant survival of RGCs and regeneration of their axons while partially preventing RGC axonal loss and RGC dysfunction. As shown by the diminished therapeutic effects after knockdown of Aragonaute-2, a key miRNA effector model, the effects were reliant on miRNA-dependent mechanisms. (Id.).

A rat retinal detachment (RD) model developed using a subretinal injection of 1% hyaluronic acid in male Sprague-Dawley rats also has been used to investigate the therapeutic effects of exosomes derived from rat bone marrow MSCs. (Ma, M. et al., Exp. Eye Res. (2020) 191: 107899). For treatment, MSC exosomes (5 µL) at various concentrations were injected into the subretinal space right after surgical retina-RPE separation, and compared to a 5 µL PBS control. Three days after retinal detachment and MSC-exosome treatment, retinas were dissected, immediately frozen in liquid nitrogen and total RNA was extracted using Trizol (Invitrogen, USA). cDNA was synthesized using a Revertaid kit (Thermo, USA) for first strand cDNA synthesis and qRT-PCR performed. Retinal expression levels of inflammatory cytokines TNF-α, IL-1β, and monocyte chemotactic protein-1 (MCP-1) were detected by RT-PCR, the autophagy-related protein 5 (Atg5) and microtubule-associated protein 1 light chain 3 beta (LC3) were detected by Western blot, and apoptosis was examined using TUNEL assays at 3 days following RD. Retinal structure was observed at 7 days post-RD. Proteomic analysis was also performed to detect proteins carried by the MSC-derived exosomes using iTRAQ-based technology combined with one-dimensional nano LC-nano-ESI-MS/MS. After MSC-derived exosome treatment, expression of TNF-α and IL-β were found to be significantly reduced, the LC3-II (active form) to LC3-I (inactive form) ratio indicative of autophagy, which exhibits protective effects against cell damage, was enhanced and cleavage of Atg5 was decreased. Treatment with the MSC-derived exosomes also suppressed photoreceptor cell apoptosis and maintained normal retinal structure when compared to control groups. Proteomic analysis revealed that the MSC-derived exosomes contained 683 candidate proteins from 3 biological replicates, that might contribute to the MSC-derived exosomes therapeutic efficacy in ameliorating photoreceptor cell degeneration, which clustered into 43 biological processes, including cell adhesion, immune response, cytoskeleton remodeling, and development, and cell proliferation and differentiation. Nine out of 193 proteins had anti-inflammatory, neuroprotective and anti-apoptotic effects, which were hypothesized to play a key role in the therapeutic effect of retinal detachment.

In short, various specific and generalized pathologies can lead to opthalamic dysfunction. A number of in vitro models exist in which ocular dysfunction and its reversal can be tested. Measures include reversal of inflammation, prevention of apoptosis, promotion of cell proliferation, or other type of related read-out. In vitro models using corneal fibroblasts (see, e.g., Karamichos et al Invest Opthalamol Vis Sci (2010) 51(1382-88) and corneal keratocytes (see, e.g., Chawla and Ghosh J Cell Phys (2018) 233; 3817-30) are available in which degenerative, fibrotic, and irrative conditions can be tested. Furthermore, pluripotent- or embryo-derived retina pigmented epithelial cells (Forrest et al Dis Models Mech (2015) 8, 421-7) can be used to model age-related macular degenerative (AMD) conditions.

One commonality between these disease states/models is that measurements of cell viability/proliferation can be used as a proxy for cell homeostasis in the absence of serum/sustaining media reagents by their replacement with AF, AFexos, or exo(-)AF. If cell viability/proliferation is maintained one would conclude that the test reagent maintains cellular homeostasis, and may be effective to reverse degeneration, fibrosis, irritation and/or other conditions that lead to AMD.

According to some embodiments, an exemplary test reagent for inducing degeneration, fibrosis, irritation, etc. may be an irrative or pro-inflammatory agent, such as, without limitation, IL-1, TNF-alpha, Vitamin C, TGFB1, IL-6, or IL-8.

Reversal of conditions comprising degeneration, fibrosis, or irritation can be measured following incubation of in vitro cellular models with test reagents, such as those listed above, and cell viability or apoptosis can be measured. Measures at the molecular or cellular level include RT-qPCR, ELISA, immunofluorescence, immunohistochemistry, western blot, or other assay to measure reduction of markers and/or modulation of other downstream biomarkers such as TIMP1, TIMP2, TIMP3, NFKB1, TGBFR1, TGBFR2, STAT3, COL1A1, COL1A2, FN1, ACTA2, other collagens/ECM proteins various collagens, smooth muscle actin, TGF-beta, SMADs (a group of related intracellular proteins critical for transmitting to the nucleus signals from the transforming growth factor-β (TGFβ) superfamily at the cell surface; see, e.g., Attisano, L., Lee-Hoeflich, ST, Genome Biol. (2001) 2(8): PMC138956), fibronectin, and E-cad/N-cad.

According to some embodiments, modulation of one or more biomarkers in the presence of the test agent(s) may indicate that the test agent may reverse the modeled opthalamic pathological state.

While the present invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the claims appended hereto.

What is claimed is:

1. A method for promoting wound healing in a subject in need thereof comprising
   (a) isolating extracellular vesicles (EVs) directly from human amniotic fluid (AF);
      wherein the EVs are derived from a heterogenous population of human amniotic fluid stem cells (hAFSCs); and
      wherein the hAFSCs actively secrete the EVs;
   (b) purifying the isolated EVs by centrifugation, filtration, and chromatography techniques; (c)
   (c) contacting a wounded tissue of the subject with a first composition comprising a therapeutic amount of the purified EVs;
      wherein the therapeutic amount of the first composition reduces wound area and promotes repair of the wounded tissue; and
      wherein the first composition promotes wound healing by activating epithelial cells to transition to a mesenchymal cell phenotype (EMT); and
   (d) contacting the wounded tissue of the subject with a second composition comprising a therapeutic amount of EV-depleted AF after contacting the wounded tissue with the first composition;
      wherein the therapeutic amount of the second composition is effective to activate mesenchymal-to-epithelial transition (MET) and to promote repair of the wounded tissue; and
      wherein a length of time between contacting the tissue with the first composition and contacting the tissue with the second composition is from about 4 hours to about 24 hours.

2. The method of claim 1, wherein
   the heterogenous population of hAFSCs comprises amniotic fluid mesenchymal stem cells (MSCs); and
   the EVs are identified by positive expression of markers including one or more of TSG101, ALIX, CD81, CD9, AnnV, or CD63.

3. The method according to claim 1, wherein the EVs are characterized by: sedimentation at about 100,000×g, a buoyant density in sucrose of about 1.10-1.21 g/mL, and an average diameter of from about 50 nm to about 200 nm.

4. The method according to claim 1, wherein the contacting is topically or subcutaneously.

5. The method according to claim 1, wherein the first composition is effective to increase mRNA levels of one or more of Vimentin, N-cadherin, Colla1, Acta2, or TGFbr2 in the wounded tissue.

6. The method of claim 1, wherein the second composition is effective to increase mRNA levels of Stat3.

7. The method according to claim 1, wherein the wounded tissue is a chronic wound.

8. The method according to claim 7, wherein the chronic wound is a diabetic ulcer, a pressure ulcer, or a venous ulcer.

9. The method according to claim 1, wherein the wounded tissue is a burn.

10. The method according to claim 1, wherein the composition further comprises a pharmaceutically acceptable carrier.

11. The method according to claim 1, wherein the centrifugation techniques comprise ultracentrifugation or sucrose density gradient centrifugation; the filtering comprises differential filtration through nylon membrane filters of defined pore size; and the chromatography technique is selected from the group consisting of column chromatography; size exclusion chromatography; and affinity chromatography comprising filtration through a device containing an affinity matrix selective towards the EVs.

12. A two-stage method of promoting wound healing in a subject in need thereof comprising, in order:
   (a) isolating EVs directly from human amniotic fluid (AF);
      wherein the EVs are derived from a heterogenous population of human amniotic fluid stem cells (hAFSCs); and wherein the hAFSCs actively secrete EVs;
   (b) purifying the isolated EVs by centrifugation, filtration, and chromatographic techniques;
   (c) contacting a wound with a first composition comprising the purified EVs, to promote early-stage wound healing in the subject; and
   (d) contacting the wound with a second composition comprising EV-depleted AF after contacting the wound with the first composition to promote late-stage wound healing in the subject;
      wherein a length of time between contacting the wound with the first composition and contacting the wound with the second composition is from about 4 hours to about 24 hours.

13. The two-stage method according to claim 12, wherein early stage wound healing is characterized by activating epithelial-to-mesenchymal transition (EMT) and inducing cell migration, and
   wherein late stage wound healing is characterized by activating mesenchymal-to-epithelial transition (MET) and re-epithelialization of the wound.

14. The method according to claim 12, wherein the heterogenous population of amniotic fluid cells comprises amniotic fluid mesenchymal stem cells (MSCs).

15. The method according to claim 12, wherein the EVs are characterized by: sedimentation at about 100,000×g, a buoyant density in sucrose of about 1.10-1.21 g/mL, and an average diameter of from about 50 nm to about 200 nm.

16. The method according to claim 12, wherein the contacting is topically or subcutaneously.

17. The method according to claim 1, wherein the amniotic fluid stem cells comprise epithelioid cells; amniotic fluid cells originating from fetal membranes; and fibroblastic cells.

* * * * *

SEQUENCE LISTING

```
<160> NUMBER OF SEQ ID NOS: 14

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 1
cagagaaagt tcccccacct                                                     20

<210> SEQ ID NO 2
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2
aattcctgca gctcatccag                                                     20

<210> SEQ ID NO 3
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 3
aaacgagtac cggagacagg t                                                   21

<210> SEQ ID NO 4
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 4
tctcttccat ctcacgcatc t                                                   21

<210> SEQ ID NO 5
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 5
gccaagaaga catccctgaa                                                     20
```

```
<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 6
cagatcaagc atacctcggg                                                     20

<210> SEQ ID NO 7
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 7
tggaccctac tctgtctgtg g                                                   21

<210> SEQ ID NO 8
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
actccacgtt ttccagattc a                                                   21

<210> SEQ ID NO 9
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 9
actgggacga catggaaaag                                                     20

<210> SEQ ID NO 10
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 10
gttcagtggt gcctctgtca                                                     20

<210> SEQ ID NO 11
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 11
ggacatcatc actgtggcag                                                     20
```

```
<210> SEQ ID NO 12
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 12
ttccatgtct gtggcttgaa                                              20

<210> SEQ ID NO 13
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 13
ccgggactcc agtcatagg                                               19

<210> SEQ ID NO 14
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 14
cagctctggg ttggattcag                                              20
```